United States Patent [19]

Cisneros et al.

[11] Patent Number: 5,166,926
[45] Date of Patent: Nov. 24, 1992

[54] PACKET ADDRESS LOOK-AHEAD TECHNIQUE FOR USE IN IMPLEMENTING A HIGH SPEED PACKET SWITCH

[75] Inventors: Arturo Cisneros, Lincroft; Gary A. Hayward; Ivan P. Auer, both of Middletown, all of N.J.

[73] Assignee: Bell Communications Research, Inc., Livingston, N.J.

[21] Appl. No.: 629,604

[22] Filed: Dec. 18, 1990

[51] Int. Cl.$^5$ .............................................. H04Q 11/04
[52] U.S. Cl. ...................................... 370/60; 370/94.1
[58] Field of Search ................. 370/60, 54, 94.1, 58.1, 370/110.1, 91; 379/113

[56] References Cited

U.S. PATENT DOCUMENTS

| | | | |
|---|---|---|---|
| 3,916,124 | 10/1975 | Joel | 379/274 |
| 4,516,238 | 5/1985 | Huang et al. | 370/60 |
| 4,550,397 | 10/1985 | Turner et al. | 370/60 |
| 4,630,260 | 12/1986 | Toy et al. | 370/60 |
| 4,656,622 | 4/1987 | Lea | 370/60 |
| 4,656,627 | 4/1987 | Hasley et al. | 370/85 |
| 4,661,947 | 4/1987 | Lea et al. | 370/60 |
| 4,692,917 | 9/1987 | Fujioka | 370/60 |
| 4,696,000 | 9/1987 | Payne, III | 370/60 |
| 4,751,697 | 6/1988 | Hunter et al. | 370/60 |
| 4,761,780 | 8/1988 | Bingham et al. | 370/60 |
| 4,780,870 | 10/1988 | McHarg et al. | 370/60 |
| 4,797,880 | 1/1989 | Bussy et al. | 370/60 |
| 4,817,084 | 3/1989 | Arthurs et al. | 370/60 |
| 4,864,558 | 9/1989 | Imagawa et al. | 370/60 |
| 4,866,701 | 12/1989 | Giacopelli et al. | 370/60 |
| 4,893,304 | 1/1990 | Giacopelli et al. | 370/60 |
| 4,899,334 | 2/1990 | Shimizu | 370/60 |
| 4,899,335 | 2/1990 | Johnson et al. | 370/60 |
| 4,910,730 | 3/1990 | Day et al. | 370/60 |
| 4,922,487 | 5/1990 | Eilenberger et al. | 370/60 |
| 4,947,388 | 8/1990 | Kuwahara et al. | 370/60 |
| 4,991,172 | 2/1991 | Cidon | 370/94.1 |
| 5,016,245 | 5/1991 | Lobjinski et al. | 370/60 |
| 5,029,164 | 7/1991 | Goldestein et al. | 370/79 |
| 5,038,343 | 8/1991 | Lebizay et al. | 370/60 |

OTHER PUBLICATIONS

A. Cisneros, "Large Packet Switch and Contention Resolution Device", Proceedings of the XIII International Switching Symposium 1990, Stockholm, Sweden, May 27–Jun. 1, 1990, Paper 14, vol. III, pp. 77–83.

K. Y. Eng et al, "A Modular Broadband (ATM) Switch Architecture with Optimum Performance", Proceedings of the XIII International Symposium 1990, Stockholm, Sweden, May 27–Jun. 1, 1990, vol. IV, pp. 1–6.

J. N. Giacopelli et al, "Sunshine: A High Performance Self-Routing Broadband Packet Switch Architecture", Proceedings of the XIII International Switching Symposium 1990, Stockholm, Sweden, May 27–Jun. 1, 1990, Paper 21, vol. III, pp. 123–129.

T. T. Lee et al, "A Broadband Optical Multicast Switch", Proceedings of the XIII International Switching Symposium 1990, Stockholm, Sweden, May 27–Jun. 1, 1990, vol. III, pp. 7–13.

Y. Sakurai et al, "Large Scale ATM Multi-Stage Switching Network with Shared Buffer Memory Switches", Proceedings of the XIII International Switching Symposium 1990, Stockholm, Sweden, May 27–Jun. 1, 1990, vol. IV, pp. 121–126.

H. Obara et al, "Self-Routing Space Switch Network Comprising Fast and Uniform Switch Elements", Electronics Letters, Mar. 15, 1990, vol. 26, No. 6, pp. 352–353.

M. Akata et al, "A 250Mb/s 32×32 CMOS Crosspoint LSI for ATM Switching Systems", Digest of Technical Papers for the 1990 IEEE International Solid State Circuits Conference, Feb. 1990, pp. 30–31.

T. T. Lee, "A Modular Architecture for Very Large Packet Switches", Proceedings of IEEE Globecom '89, Dallas, Tex., Nov. 1989, pp. 1801–1809.

H. Ahmadi et al, "A Survey of Modern High-Performance Switching Techniques", IEEE Journal on Selected Areas in Communications, vol. 7, No. 7, Sep. 1989, pp. 1091–1103.

R. J. Baumert et al, "A Monolithic 50–200 MHz CMOS Clock Recovery and Retiming Circuit", Proceedings of the IEEE 1989 Custom Integrated Circuits Conference, pp. 14.5.1–14.5.4.

H. Kuwahara et al, "A Shared Buffer Memory Switch for an ATM Exchange", International Conference on Communications—ICC '89, Boston, 1989, pp. 4.4.1–4.4.5.

H. Uematsu et al, "A Cell-Base Cross-Connect Switch for ATM Broadband Networks", Singapore International Conference on Networks 1989, pp. 1-6.

P. Newman, "A Fast Packet Switch for the Integrated Services Backbone Network", IEEE Journal on Selected Areas in Communications, vol. 6, No. 9, Dec. 1988, pp. 1468-1479.

B. Bingham et al "Reservation-Based Contention Resolution Mechanism for Batcher-Banyan Packet Switches", Electronics Letters, Jun. 23, 1988, vol. 24, No. 13, pp. 772-773.

S. R. Li, "Theory of Periodic Contention and Its Application to Packet Switching", Proceedings of the Seventh Annual Joint Conference of the IEEE Computer and Communications Societies—Infocom '88, pp. 4A.1.1-4A.1.6.

J. Hui et al, "A Broadband Packet Switch for Integrated Transport", IEEE Journal on Selected Areas in Communications, vol. SAC-5, No. 8, Oct. 1987, pp. 1264-1273.

J. J. Kulzer et al, "Statistical Switching Architectures for Future Services", International Switching Symposium ISS '84, Florence, Italy, May 7-11, 1984, Session 43A, Paper 1, pp. 1-5.

*Primary Examiner*—Douglas W. Olms
*Assistant Examiner*—T. Samuel
*Attorney, Agent, or Firm*—Leonard Charles Suchyta; James W. Falk

[57] ABSTRACT

Apparatus, and accompanying methods for use therein, for a large (e.g. approximately 1 Terabit/second), fault tolerant packet switch (200), particularly suited for asynchronous mode transfer (ATM) communication, which utilizes cell address look-ahead in conjunction with parallel planes of self-routing cross-points (550), staggered time phased contention resolution and shared memory based input and output modules (260 and 270, respectively). Each incoming packet cell has added thereto an additional header field containing information identifying a particular output module and a particular output port of that module. An input module associated with the switching crosspoints changes the additional header information to identify the particular output module of the next subsequent packet cell.

14 Claims, 20 Drawing Sheets

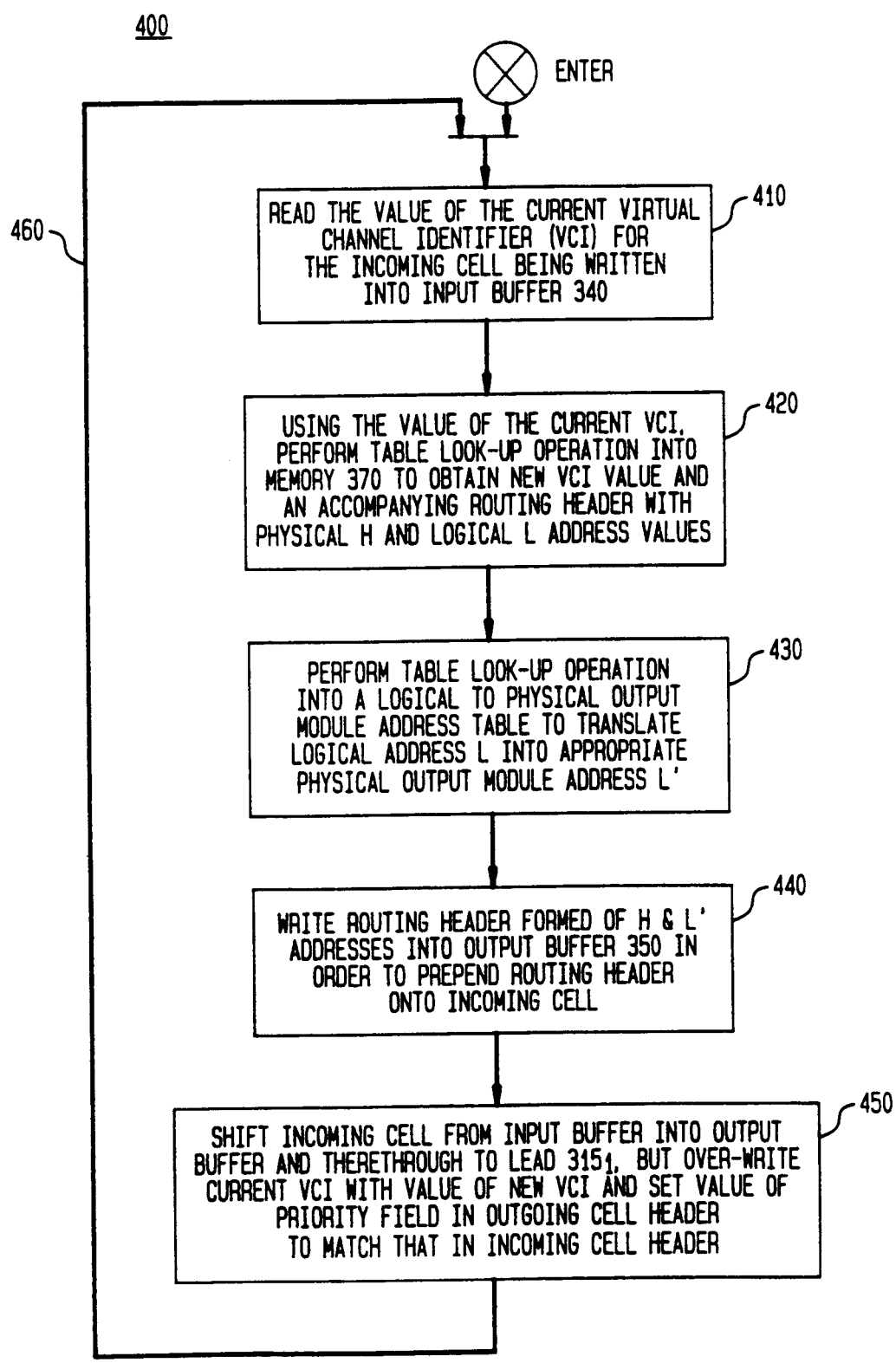

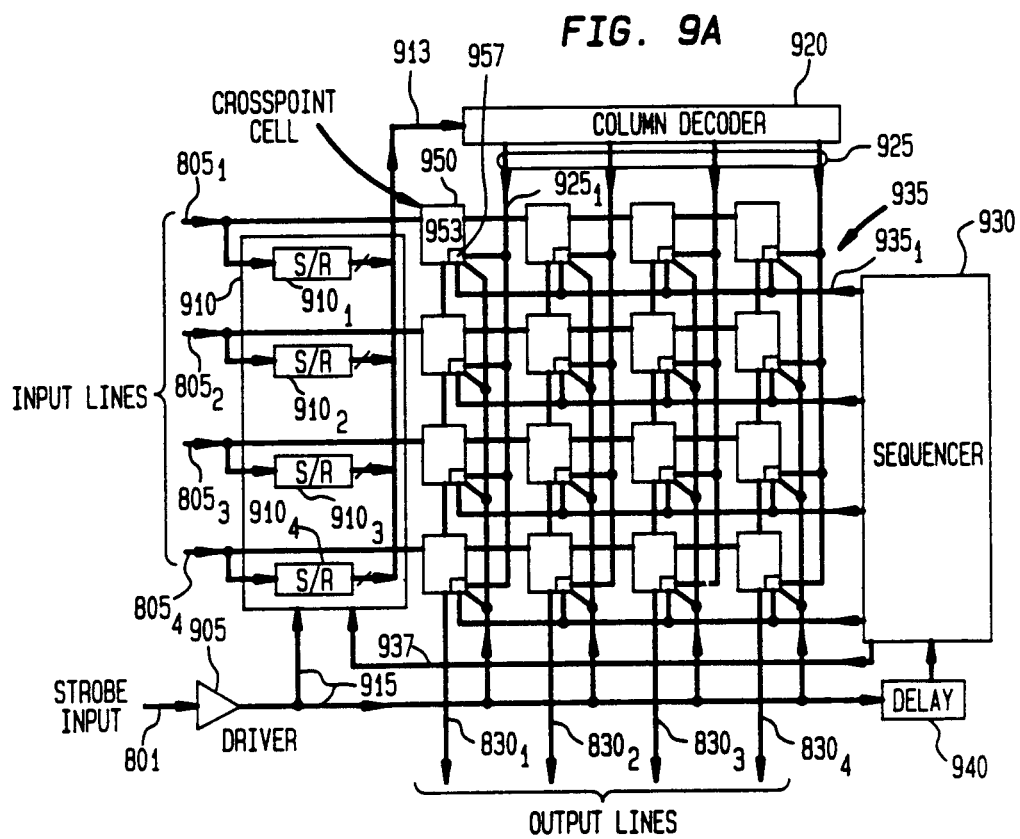
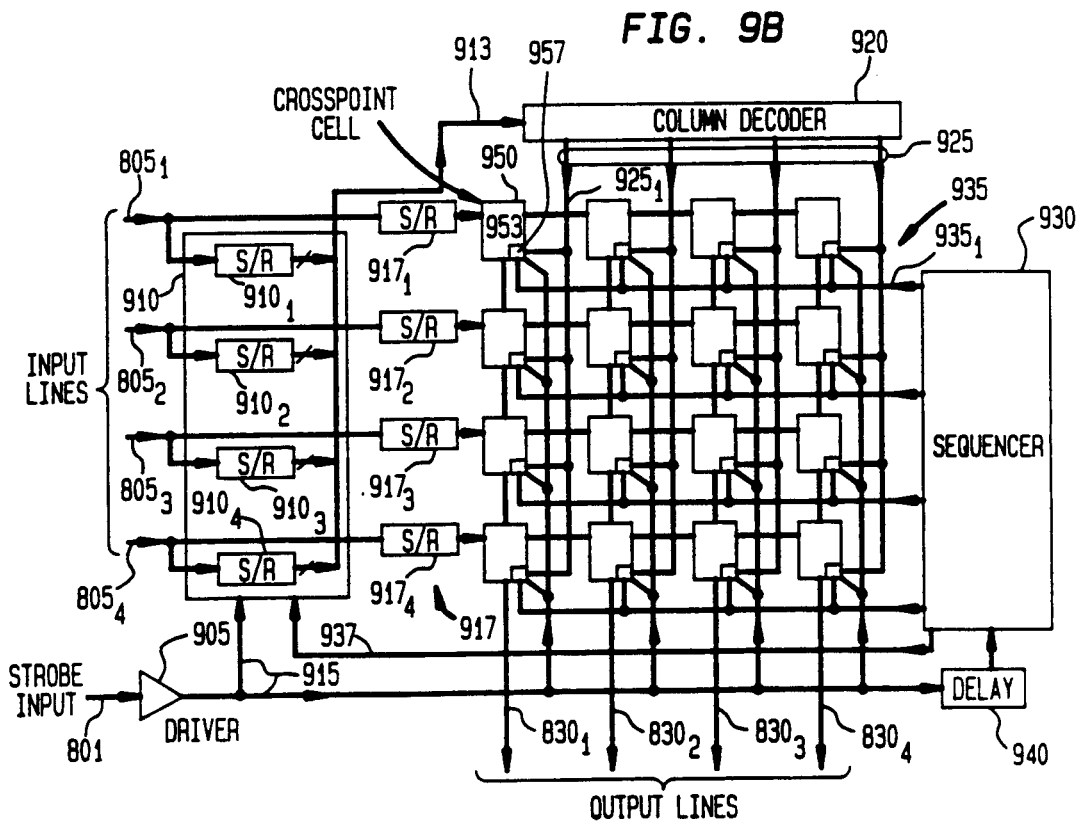

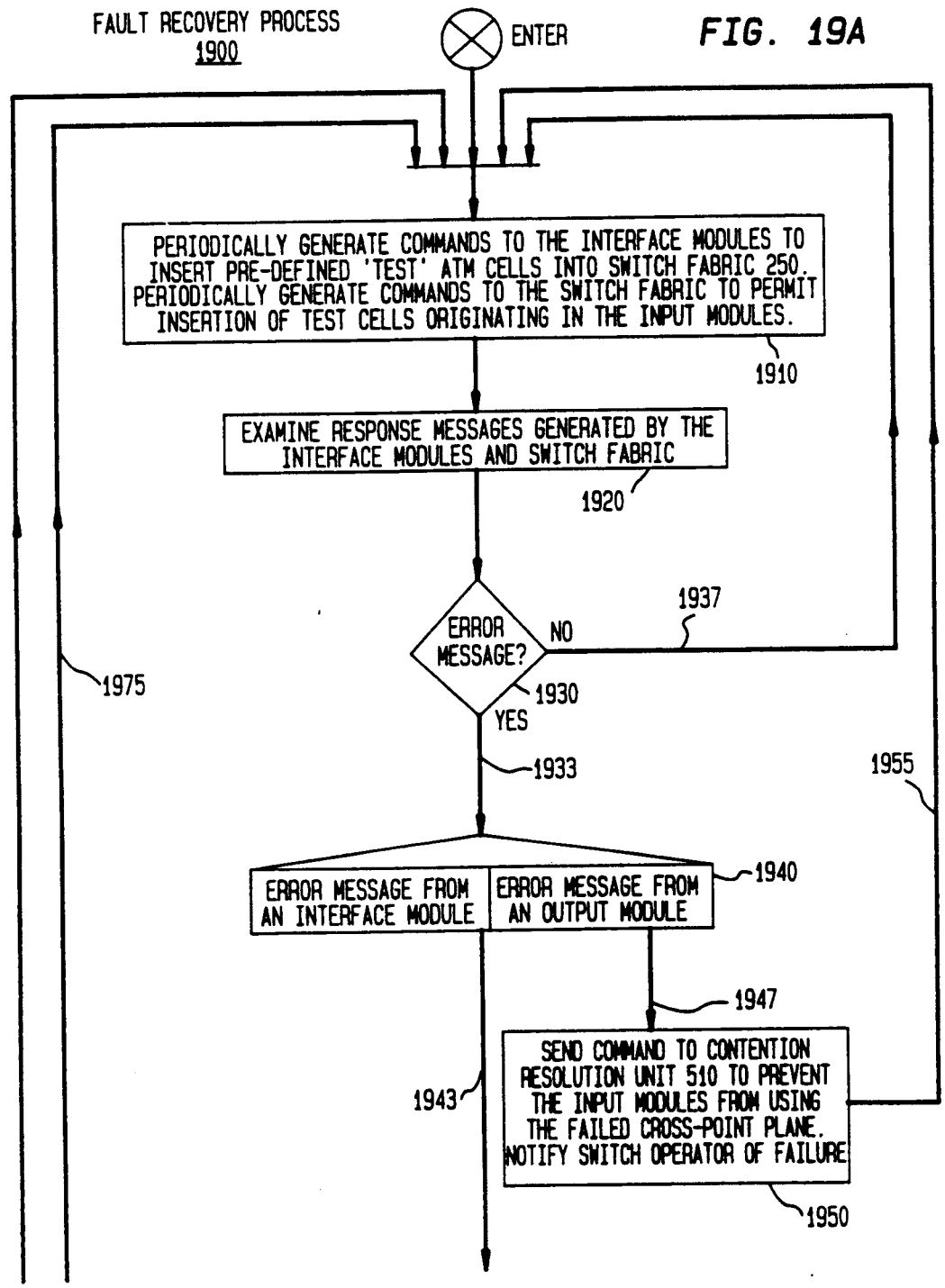

PACKET ADDRESS LOOK-AHEAD TECHNIQUE FOR USE IN IMPLEMENTING A HIGH SPEED PACKET SWITCH

CROSS REFERENCE TO RELATED APPLICATIONS

This application describes and claims subject matter that is also described in the following two co-pending United States patent applications also assigned to the present assignee hereof and filed simultaneously herewith: "A LARGE FAULT TOLERANT PACKET SWITCH PARTICULARLY SUITED FOR ASYNCHRONOUS TRANSFER MODE (ATM) COMMUNICATION", Ser. No. 629,584, now U.S. Pat. No. 5,130,984; issued Jul. 14, 1992; and "A TECHNIQUE FOR RESOLVING OUTPUT PORT CONTENTION IN A HIGH SPEED PACKET SWITCH", Ser. No. 629,576.

BACKGROUND OF THE DISCLOSURE

1. Field of the Invention

The invention relates to apparatus, as well as to accompanying methods for use therein, for a large (e.g. approximately 1 Terabit/second), fault tolerant packet switch, particularly suited for asynchronous transfer mode (ATM) communication, which utilizes cell address look-ahead in conjunction with parallel planes of self-routing cross-points, staggered time phased contention resolution and shared memory based input and output modules.

2. Description of the Prior Art

Presently, the growing deployment of the public integrated services digital network (ISDN) throughout the nationwide telephone system permits each ISDN subscriber to gain access to a communication channel that possesses a significantly increased bandwidth over that available through a conventional telephone (i.e. POTS—plain old telephone services) connection. Although the bandwidth provided by basic rate ISDN service has the potential to provide a wide variety of new communication services to each of its subscribers, in the coming years various communication technologies that are just now emerging, such as broadband video and very high speed data transmission, are expected to impose bandwidth requirements on subscriber ISDN channels that will far exceed the bandwidth obtainable at a basic rate ISDN interface. Such an interface consists of two 64 kbit/second "B" channels and one 16 kbit/second "D" channel, where the "D" channel is a packet channel which carries signalling information for communication occurring over each B channel.

For example, broadband video service offerings might include: desktop teleconferencing having voice-/video/data communication from a single terminal located at one's desk, distribution video, video-on-demand, videotelephone, still video picture services and high definition television. In terms of bandwidth, just one high definition television signal is expected to require, depending upon the manner in which it is encoded, at least 45 Mbit/second of channel bandwidth. Clearly, the bandwidth of such a signal far exceeds that furnished by a basic rate ISDN channel.

In an effort to provide sufficient channel bandwidth to meet expected subscriber demand in a public ISDN environment, the art has turned to implementing so-called broadband ISDN (B-ISDN). In B-ISDN, each subscriber channel is presently envisioned as providing an information transfer capacity of approximately 150 Mbit/second. This rate is chosen to provide a minimally sufficient bandwidth at a subscriber interface to simultaneously carry a broadband video service, such as high definition video, and various narrowband services, such as voice transmission. In addition, B-ISDN is also expected to serve as a high speed data transport facility for interconnecting separate local area networks (LANs). Presently, Ethernet based and many other types of LANs generally operate at a gross bit rate of approximately 10 Mbit/second. A proposed LAN, the Fiber Distributed Data Interface, is expected to operate at a gross bit rate of 125 Mbit/second. With this in mind, a bandwidth of 150 Mbit/second currently appears to be sufficiently fast to satisfactorily interconnect a wide variety of different LANs, encompassing those that are currently in use to many of those that are presently being proposed. Furthermore, B-ISDN must also fully accommodate relatively slow ISDN traffic, such as that which occurs at the basic rate.

ISDN involves a marriage of two different transport and switching technologies: circuit switching and packet switching. Circuit switching inherently involves continuously maintaining a real time communication channel at the full channel bandwidth between two points in order to continuously carry information therebetween throughout the duration of a call. Owing to this inherent characteristic, circuit switching can not efficiently accommodate bursty traffic and, for this reason, is generally viewed in the art as being ill suited for use in B-ISDN. Specifically, communication for many services that will occur at relatively low information transfer rates in a B-ISDN environment will appear as periodic bursts when transported over a B-ISDN subscriber channel. In addition, high speed data, such as that occurring over a LAN interconnection, will itself be bursty even apart from the channel. Bursty communications do not require full channel bandwidth at all times. Whenever a circuit switched connection is used to carry bursty traffic, available communication bandwidth that is dedicated to carrying data that occurs between successive bursts, i.e. whenever there is no information to be transferred, is simply wasted. Inasmuch as bursty communications, of one sort or another, are expected to constitute a significant portion of B-ISDN traffic, the significant inefficiencies that would otherwise result from using circuit switched connections to carry bursty traffic through a communication channel generally dictate against using circuit switched connections in a B-ISDN environment.

Despite the inherent limitation on carrying bursty traffic at high efficiencies over circuit switched connections, attempts are still being made in the art to adapt circuit switching to a B-ISDN environment. Nevertheless, while many advances have been and are continuing to be made in circuit switching technology, circuit switching still remains poorly adapted to supporting communication services that occur over widely diverse information transfer rates such as those which are expected to occur in B-ISDN. For example, one attempt advocates overlaying a number of circuit switching fabrics to form a network, with each different fabric operating at a transfer rate of a single prominent broad- or narrowband service. Unfortunately, if this attempt were to be implemented, then segregated switching fabrics would likely proliferate throughout the public telephone network which would disadvantageously and unnecessarily complicate the tasks of provisioning, maintaining and operating the network. Hence, this attempt is not favored in the art. Another attempt in the art aims at providing multi-rate switching. Here, a single group of allocated channels would provide information transport, with each channel providing information transport at a different multiple of a basic transfer rate. A switch would then be dynamically reconfigured, based upon each subscriber's needs, to support specific services therefor that occur at different transfer rates. Unfortunately and disadvantageously, the resulting switch would be considerably more complex than a single rate circuit switch. Furthermore, all channels in a group would need to be synchronized with respect to each other and with no differential delay occurring thereamong. Owing to the need from time to time to switch calls from one physical facility to another as required by network maintenance, maintaining the necessary intra-group synchronization is likely to be quite difficult. As such, this proposal is also not favored. In this regard, see, H. Ahmadi et al, "A Survey of Modern High-Performance Switching Techniques", *IEEE Journal on Selected Areas in Communications*, Vol. 7, No. 7, September 1989, pages 1091-1103 (hereinafter referred to as the Ahmadi et al publication); and J. J. Kulzer et al, "Statistical Switching Architectures for Future Services", *International Switching Symposium ISS'84*, Florence, Italy, May 7-11, 1984, Session 43A, paper 1, pages 1-5 (hereinafter referred to as the Kulzer et al publication).

Given the drawbacks associated with circuit switched connections, packet switched connections, specifically using asynchronous transfer mode (ATM), presently appear to be the preferred mode of communication over B-ISDN. This mode involves asynchronous time division multiplexing and fast (high speed) packet switching. In essence, ATM relies on asynchronously transporting information in the form of specialized packets, i.e. so-called ATM "cells". Each ATM cell includes a header followed by accompanying data. The header contains a label, which is used for multiplexing and routing, that uniquely identifies the B-ISDN channel which is to carry that cell between two network nodes. A specific periodic time slot is not assigned to carry a cell on any B-ISDN channel. Rather, once an ATM cell reaches, for example, a B-ISDN switch, fast packet switching occurs: a route is dynamically established through the switch to an output destination for that particular cell followed by transport of the cell over that route, and so on for each successive cell. A route is only established in response to the cell reaching an input of the switch.

Advantageously, ATM communication allows any arbitrary information transfer rate up to the full facility rate to be supported for a B-ISDN service by simply transmitting cells at a corresponding frequency into the network. With ATM, channel bandwidth is dynamically allocated to any B-ISDN call and simply varies with the rate at which cells for that call are applied through a B-ISDN channel. No further intervention is required by either the subscriber or the network itself to utilize differing amounts of available channel bandwidth, as the need therefor arises. Any change in that subscriber's traffic patterns or services, even if dramatic, merely results in a changing mix of cells that are presented to the network for these services and changes in their corresponding rates of occurrence. As long as sufficient bandwidth is available on any subscriber channel to carry all the cells presented thereto, the ATM switching fabric merely continues to route cells to their appropriate destinations and remains essentially unaffected by any such change. Hence, by decoupling the information transfer rates from the physical characteristics of the switching fabric and providing the capability to handle bursty traffic, ATM is particularly well suited to transporting both bursty and continuous bit rate services and is therefore preferred for B-ISDN service. In this regard, see the Kulzer et al publication.

An essential ingredient of B-ISDN is an ATM switch. In order to support B-ISDN, that switch needs to possess the capability of routing cells at an information transfer rate of at least 150 Mbit/second between separate ATM ports. Based upon current estimates, a large central office B-ISDN switch is expected to handle approximately 80,000 subscriber lines each having a 150 Mbit/second channel. With a concentration ratio of 10-to-1, the switch needs to possess a total throughput of approximately 1.2 Terabit/second ($1.2 \times 10^{12}$ bits/second).

Not surprisingly, a number of different architectures has been proposed in the art for implementing a high speed, e.g. approximately 1 Terabit/second, ATM switch. One such illustrative architecture, which has been widely used in circuit switches, involves the use of a switch that has a single squared matrix of cross-point switching elements. See, e.g. U.S. Pat. No. 4,692,917 (issued to M. Fujoika on Sep. 8, 1987). Advantageously, such switches are internally non-blocking, i.e. once appropriate connections are established for the entire matrix at any given time there will be no contention for any link within that matrix and thereby two cells will not collide therein. However, these switches do suffer from output port contention. This deficiency can be ameliorated somewhat through use of various queuing functions and/or centralized control—though at the expense of significantly increasing switch complexity and cost. More significantly, the cross-point matrix that forms the basis of such a switch has the disadvantageous property of squared growth. Given this growth function, it has been known for some time that a crosspoint matrix switch capable of serving a relatively large number of ports is extremely costly to implement. Because of the cost, the art has concluded that a single stage cross-point matrix should be used only in those instances where the packet switch is relatively small or where a relatively small cross-point matrix forms a building block of a large multi-stage switch. In this regard, see pages 1098 and 1099 of the Ahmadi et al publication as well as pages 4 and 5 of the Kulzer et al publication.

In an effort to devise internally non-blocking switching architectures that utilize fewer cross-points than in a single stage crosspoint matrix, the art has devoted considerable attention to use of cascaded interconnection networks that present multi-path switching. One such illustrative architecture involves Batcher-Banyan networks. Examples of Batcher-Banyan based packet switch architectures can be found in the following United States patents, all of which are assigned to the present assignee hereof: U.S. Pat. No. 4,910,730 (issued to C. M. Day et al on Mar. 20, 1990—hereinafter referred to as the Day et al '730 patent); U.S. Pat. No. 4,893,304 (issued to J. N. Giacopelli et al on Jan. 9, 1990); U.S. Pat. No. 4,866,701 (issued to J. N. Giacopelli et al on Sep. 12, 1989); U.S. Pat. No. 4,817,084 (issued to E. Arthurs et al on Mar. 28, 1989); U.S. Pat. No.

4,761,780 (issued to B. L. Bingham et al on Aug. 2, 1988); and in the following publications: J. N. Giacopelli et al, "Sunshine: A High performance Self-Routing Broadband Packet Switch Architecture", *Proceedings of the XIII International Switching Symposium* 1990, Stockholm, Sweden, Paper 21, Vol. III, pages 123-129; T. T. Lee, "A Modular Architecture for Very Large Packet Switches", *Proceedings of IEEE Globecom '89*, Dallas, Tex., November 1989, pages 1801-1809; and Hui et al, "A Broadband Packet Switch for Integrated Transport", *IEEE Journal on Selected Areas in Communications*, Vol. SAC-5, No. 8, October 1987, pages 1264-1273. In general, in a Batcher-Banyan based switch, all incoming cells are first routed through a single Batcher sorting network which, in turn, feeds a Banyan routing network. The Batcher network first sorts all simultaneously occurring incoming ATM cells into an ascending order, after which the Banyan routing network routes each of these cells to its addressed destination output port of the switch. Each network is formed of multiple columns of identical Batcher sorting circuits or identical Banyan routing circuits thereby forming respective multi-stage Batcher or Banyan networks. These columns are internally interconnected within each network by binary wiring patterns. Each individual Batcher and Banyan circuit typically has two separate inputs and two separate outputs. A Batcher network may be interconnected to a Banyan network using a so-called "perfect shuffle" wiring pattern. Incoming ATM cells typically include a header which includes an activity bit followed by address bits. In operation, the Batcher network sorts the incoming cells into ascending order based upon serial comparisons of their destination addresses. In response to these comparisons, each Batcher circuit receives two cells simultaneously and assumes either a pass state or a cross state for these two cells. If a Batcher circuit assumes a pass state, then the two cells that are presented to two inputs of that circuit simultaneously appear on corresponding outputs thereof. Alternatively, if that circuit assumes a cross state, then those cells simultaneously appear on the opposite outputs of that circuit. Various Batcher circuits are configured to route that one of the two cells having a higher address to an upper output of each such circuit, while the remaining Batcher circuits are configured to route such cells to the lower output. Similarly, each Banyan circuit decides whether to assume a pass or cross state. However, in lieu of comparing cell addresses as occurs in each Batcher circuit, each Banyan circuit forms its decision for any given cell presented to that circuit based upon the activity bit, to determine cell validity, and a single address bit in that cell. Each Banyan circuit situated in successive stages of the Banyan routing network serially rotates the address of each incoming cell applied to that circuit by one bit position and then utilizes what is then the most significant bit of the rotated address in forming its decision. Hence, the first column of Banyan circuits operates on the most significant bit of the output port address for each incoming cell applied to the Banyan routing network, while the last column of Banyan circuits operate on the least significant bit of that address.

Other cascaded switch architectures, such as Clos and Benes type networks, that have been proposed in the art rely on using several successive serially connected routing stages, with each stage being implemented using a bus, ring or a shared memory structure. Unfortunately, the routing algorithms that must be followed in these switches to avoid blocking tend to be complex and generally require examining the state of the entire switch before routing decisions can be made. In this regard, see pages 4 and 5 of the Kulzer et al publication. Consequently, these other switch architectures, as presently proposed, are also not suitable for use in implementing an ATM switch for actual B-ISDN service.

In addition, while Batcher-Banyan and other packet switches that rely on cascaded architectures utilize far fewer individual switching circuits than does a crosspoint matrix switch, such cascaded packet switches possess various faults which severely limit their incorporation into an actual operating telephone network. First, because these switches possess highly efficient switching topologies, these switches generally have insufficient redundancies and thereby exhibit very poor fault tolerance. In the event that a single switching circuit in such a packet switch, such as illustratively that described in the Day et al '730 patent, fails, then typically, due to an inherent inability within the switch to route packets around that particular circuit, the entire switch will need to be taken out of service for a period of time during which the fault would be isolated and repaired. Thus, to provide adequate levels of fault tolerance which sufficiently avoid impairments or, in extreme cases, disruption of network switching capacity, the entire cascaded switch might need to be duplicated, with both switches operating, for example, on a well known "hot-standby" basis. Unfortunately, this is an extremely costly solution and hence one that is quite impractical. Second, cascaded switches are extremely difficult to expand. Ordinarily, a basic sized switch is first installed in a network and, as the need arises, is "grown" by successively adding pre-defined increments of switching fabric to continually increase the capacity of that switch in a manner that keeps pace with increasing subscriber demands for services. Unfortunately, the topology of a cascaded switch architecture does not lend itself to incremental growth. In this regard, due to the inflexibility of the switching topology, increasing the size of a cascaded switch generally necessitates a complete re-design and/or replacement of the switching fabric. Hence, a cascaded switch must be initially sized to carry the full switching load that will be expected to occur during its useful life. As such, a local telephone company might likely be faced with significant entry costs in providing B-ISDN service if it were to provide this service through such a cascaded switch. Moreover, the steady state subscriber demand for packet services, specifically B-ISDN, is extremely difficult to estimate, within an acceptable margin of error, prior to the deployment of the services. Accordingly, this difficulty injects sizeable uncertainties into the design and costing of such a switch. Lastly, the high density and complexity of the inter- and intra-switching module interconnect wiring used in a cascaded switch complicates the design of such a switch. It also reduces the physical space that would otherwise be available within a custom integrated circuit(s) for integrating the physical components that are needed to implement each separate switching (e.g. Batcher or Banyan) circuit. Accordingly, by artificially reducing the integration density of the switching circuits used in a cascaded switch, the physical volume and component count of the entire switch both tend to increase thereby again disadvantageously increasing the cost of the switch.

Thus, a need exists in the art for a large, e.g. at least 1 Terabit/second, packet switch particularly suited for use with ATM communication that is relatively inexpensive and simple to implement when compared to packet switches of similar capacity that have been proposed in the art. In addition, the needed packet switch should exhibit a high degree of fault tolerance and be readily and economically expandable on an incremental basis. Advantageously, the emergence of such a switch could well facilitate the provision and deployment of B-ISDN service throughout the public telephone network.

SUMMARY OF THE INVENTION

The inventive large capacity packet switch substantially eliminates the deficiencies associated with such switches known in the art, including those proposed for transport of ATM cells. In particular, the inventive architecture utilizes a series of "k" separate identical input modules, each of which provides incoming ATM cells from "n" separate input ports to "m" separate identical self-routing cross-point planes. Each of the cross-point planes possesses a k-by-k switching capacity and routes incoming ATM cells to each one of "k" separate output modules. Each output module services "n" separate output ports. With "n", "m" and "k" illustratively equalling the values 32, 32 and 256 respectively, the inventive switch provides an 8192-by-8192 capacity.

Each ATM cell possesses a header containing a virtual channel identifier (VCI) field and a priority field. The VCI field specifies the specific virtual channel through the switch that is to carry that cell. Upon arrival at an appropriate interface module, the VCI field of each ATM cell is read, translated and over-written with a VCI value that specifies the specific virtual channel that is to carry that cell between the switch and a downstream node on the B-ISDN network. In addition, the interface module also prepends a routing header to each incoming ATM cell. This prepended routing header, used solely within the switch, contains fields which specify a physical output module address and a specific output port address on that output module to which that cell is destined.

Each input module in the inventive switch has a single internal queue, illustratively implemented using shared memory, and services "n" separate input ports. All the input ports serviced by this module are sequentially read in a round-robin fashion with the incoming ATM cell incident on each input port being deposited in next successive location in the queue. Inasmuch as multiple incoming ATM cells can address the same output module and thus cause output port contention, all "k" input modules simultaneously send the address and accompanying priority information for the cells situated at the heads of their internal queues to a centralized contention resolution unit to determine, through arbitration, which ones of these cells can then be simultaneously routed through a common cross-point plane. Those cells that lose arbitration remain at the head of their respective queues for processing during the next round of arbitration.

Those cells that win arbitration are simultaneously applied by their respective input modules through the cross-point switching planes and routed therethrough to the addressed output modules for each of these cells. Each output module contains "n", illustratively 32, separate logical queues and is connected to the same one of the "k" different outputs on each of the "m" different cross-point planes. These queues are also implemented using illustratively shared memory. The input lines on each output module are sequentially read in a round-robin fashion. Based upon the output port address within each incoming ATM cell present on these input lines, that cell is then deposited at the end of a corresponding internal queue for that output port. These internal queues are read in a round-robin fashion with the ATM cell situated at the head of the queue being supplied in bit serial fashion, though without its prepended routing header, to a corresponding output port.

To provide an approximate 1 Terabit/second data rate, an inventive technique has been developed for operating all the cross-point switching planes on a parallel, though time staggered (phased), basis. Specifically, the inventive technique relies on dividing an STS-3c cell period, which is approximately 2.83 $\mu$sec, into "m", illustratively 32, separate successive "staggered" time intervals. During each such staggered time interval, such as the first interval, every input module simultaneously provides output port address and cell priority information (collectively referred to as a "request") for the ATM cell presently situated at the head of its internal queue to the contention resolution unit. Thereafter, again during this interval, the contention resolution unit performs a complete arbitration cycle through which it compares the current request received from every input module to every other such current request received from all the other input modules that are being presented during this interval. Using top-down physical ordering modified by fairness and cell priority considerations, the contention resolution unit resolves contending requests and provides appropriate signals to all the input modules specifying which of these modules have presently won arbitration. In response to these signals, all the input modules that have won arbitration during, for example, the first staggered time interval then simultaneously route, on a serial basis, the ATM cells situated at the head of their internal queues onward through a specific cross-point plane, e.g. the first such plane, during the remainder of an STS-3c cell period, to the addressed output modules. This process then repeats one staggered time interval later, e.g. during the second time interval, but with the ATM cells that have won arbitration during this second staggered time interval being serially routed through the next successive cross-point switching plane, e.g. the second plane, and so on, for the remainder of the cross-point planes. Those ATM cells that have not won arbitration during any one staggered time interval remain at the head of each of their corresponding queues and await contention resolution and routing during the next successive staggered time interval. Thus, a separate group of upwards of 256 ATM cells is launched into all 32 cross-planes every staggered time interval, i.e. every 2.83/m $\mu$second, with each cross-point plane itself routing therethrough upwards of the 256 separate ATM cells that comprise such a group during every STS-3c cell period, i.e. every 2.83 $\mu$sec. Although all the cross-point switching planes operate in the same identical fashion, each of these planes operates on a staggered (phased) basis with respect to its neighboring planes, by routing a group of ATM cells therethrough commencing either 2.83/m $\mu$sec before or after that of its neighboring planes.

Fast contention resolution permits all the cross-point switching planes to be operated in parallel. Advantageously, this permits the switch to possess an architecture that is both compact and modular.

Furthermore, an inventive technique, illustratively for use in the switch, has been developed that substantially reduces the amount of time required to configure all the cross-point planes prior to routing a group of cells therethrough. This technique, which we refer to as cell address "look-ahead", relies on storing configuration information within each cross-point circuit, in every cross-point switching plane, one cell in advance of the actual cell that is being routed therethrough. Specifically, the prepended routing header for each ATM cell that is applied to each input of every cross-point switching plane contains the output module address of the next successive ATM cell that will be applied to that specific input. Each individual cross-point circuit situated within each switching plane has an accompanying one-bit register that stores the "future configuration" of that circuit. While a group of individual ATM cells is being serially shifted into the inputs of a cross-point plane, the prepended routing headers for these cells are used to set the "future configuration" bit within all the individual cross-point circuits for each input line thereto. Then, after that group of cells has been completely routed through the cross-point plane, a strobe pulse is applied to all the cross-point circuits within that plane to simultaneously set the switching configuration of all those circuits to that specified by the stored future configuration bits, thereby essentially instantaneously setting the entire plane to properly route the next group of cells that will be switched therethrough, and so on for each successive cell on every input to each cross-point plane. Owing to the high degree of parallelism inherent in this technique, the time required between successive routing operations to change the configuration of the entire cross-point switching matrix is advantageously reduced to essentially only a very short interval required to "strobe" the future configuration into the cross-point circuits. Inasmuch as the entire switch configuration is stored in parallel with the cell routing operations rather than being undertaken sequentially prior thereto, switching bandwidth is advantageously increased. Furthermore, storing the future configuration in advance of the corresponding cells, through use of the inventive cell address "look ahead" technique, significantly relaxes a relatively tight time constraint that would otherwise exist for reading the prepended routing header of each of the current cells and then setting the switch configuration therefor. As a result, the need to employ relatively costly high speed logic to read the prepended routing headers and set the configuration of all the cross-point circuits.

Thus, ATM cells are routed on a distributed basis through the inventive switch, i.e. in parallel through input and output modules and cross-point switching planes, while switch control, including contention resolution, is provided on a centralized basis. Due to the use of distributed routing, the inventive switch is significantly less complex and less costly to implement than designs for high speed packet switches, particularly those for ATM service, known in the art.

Advantageously, a matrix of cross-point elements has not only proven in the past to be very reliable under actual service conditions, but also due to its intrinsic redundancies, possesses the capabilities of being internally non-blocking and able to dynamically isolate a number of separate switching elements from active service without significantly affecting the throughput of the entire switch. Moreover, the inventive crosspoint matrix based switch architecture can be easily and relatively inexpensively grown, within reasonable limits, by merely adding additional switching fabric to the matrix. Furthermore, the interconnect wiring in the inventive crosspoint matrix based switch tends to be significantly less complicated and requires much less volume both within and among custom integrated circuits used to fabricate the switching fabric than that required in a cascaded switch architecture, thereby reducing the physical size requirements for the entire switch as well as its cost.

In accordance with a feature of the invention, the number of cross-point planes grows in a linear, not squared, fashion as the number of input and output ports increases. Such a growth path is less expensive than the squared growth path associated with various packet switch designs known in the art.

The invention also provides the feature of possessing a small failure group size in the event of a failure of an input or output module. In this respect, such a failure in a switch serving, for example, 8192 input and 8192 output ports will only affect 32 input or output ports, respectively (less than 1% of the total switch capacity), rather than causing the entire switch to fail as occurs with various ATM switch designs known in the art. Moreover, the inventive switch can be easily re-configured to route ATM cells around a failed input or output module without the need to restart call processing. By employing at least one spare input module, one spare output module, "k−1" active input modules and "k−1" active output modules, the inventive switch is robust and provides a very high degree of fault tolerance. In addition, fault tolerance can be increased by triplicating the contention resolution unit and adding inexpensive majority voting logic to process the outputs thereof. Furthermore, a failure of a previously operational cross-point switching plane will only reduce switch capacity by approximately 3.1% which is generally low enough to be completely absorbed by the excess operating capacity intentionally designed into the switch with little, if any, adverse effects on the B-ISDN traffic currently being handled thereby.

BRIEF DESCRIPTION OF THE DRAWINGS

The teachings of the present invention can be readily understood by considering the following detailed description in conjunction with the accompanying drawings, in which:

FIG. 4 is a high level flowchart of Routing Header Prepending and VCI Translation Routine 400 undertaken by processor 360 in header processing unit $310_1$ shown in FIG. 3B;

FIG. 9A is a block diagram of a portion of a first embodiment of a typical single self-routing cross-point circuit, illustratively circuit $800_1$ shown in FIG. 8, that cen be used within each cross-point plane in the inventive broadband ISDN switch;

FIG. 9B is a block diagram of a portion of a second embodiment of a typical single self-routing cross-point circuit, though of the same corresponding portion as shown in FIG. 9A of illustratively circuit $800_1$ shown in FIG. 8;

FIG. 19 shows the proper alignment of the drawing sheets for FIGS. 19A and 19B;

FIGS. 19A and 19B collectively depict a high level flowchart of Fault Recovery Process 1900 which is executed by switch control module 290 in the event of a failure in an input or output module or in a cross-point switch plane.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in implementing nearly any packet switch of essentially any size, up to that imposed by technological speed limitations regardless of whether that switch is to be used for service in ISDN (Integrated Service Digital Network) or not. Furthermore, the inventive teachings can be used in such a switch that accommodates packets of nearly any size and transmission period. Nevertheless, for purposes of illustration and to simplify the ensuing description, the invention will be specifically discussed in the context of a 8192-by-8192 port packet switch particularly suited for switching asynchronous transport mode (ATM) packets which are applied to each input of a broadband ISDN (B-ISDN) switch at a rate of 155.52 Mbit/second (STS-3c rate). The period during which an ATM packet occurs (i.e. the "packet period") is approximately 2.83 $\mu$sec.

A. Basic ATM Cell Structure

Broadband ISDN relies on transporting individual packets of digital data through a packet network situated between user terminals. To provide data carriage for a sufficient number of services, including high definition video, a broadband ISDN user is to be provided with an STS-3c bit rate data channel. Such a channel has a total throughput of 155.52 Mbit/second and an effective data throughput, excluding overhead bits, of 149.76 Mbit/second.

Figure 1:
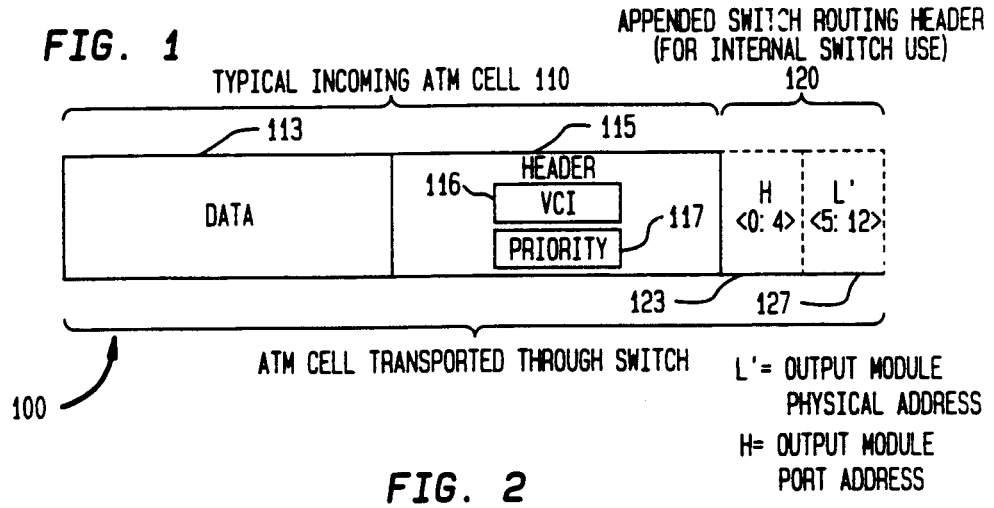
FIG. 1 shows a typical ATM cell, and its constituent fields, as transported through the inventive packet switch.

Each broadband ISDN packet is commonly referred to as a "cell". FIG. 1 shows a typical ATM cell, and its constituent fields, both as supplied by a broadband ISDN terminal and subsequently transported through the inventive packet switch. As shown, incoming ATM cell 110, typically 53 bytes long, is formed of header 115, itself containing virtual channel identifier (VCI) field 116 and priority field 117, followed by all remaining bits. These bits, which are collectively labelled as data 113, are the so-called "user data" bits and are merely transported unchanged through the switch. On an STS-3c line, a 53 byte ATM cell is typically delivered every 2.83 $\mu$sec (which is the "cell period").

The VCI identifies a specific virtual channel that is to transport the cell and which extends between a node within the B-ISDN network to the next successive such node. The specific channel and hence its corresponding VCI varies from one node to the next as the cell is transported through successive network nodes. The value of priority field 117 is determined during call set-up negotiations and, as a result, is appropriately set by the user terminal that initially produced cell 110. This value specifies the priority, relative to that associated with other cells, at which the cell is to be transported through the B-ISDN network. The value of the priority field remains constant as the cell propagates through the network.

As will be described in much detail below, the inventive switch is self-routing. This means that, prior to a cell being launched into the network, a route for a cell does not need to be extended through the network including all the switches therein. In fact, with self-routing switches, information stored within each cell itself is used to form a route through each switch whenever that cell reaches that switch. In this regard, the inventive switch, in a manner to be described below, translates the VCI of each incoming cell into a new VCI (to identify an output virtual channel from the switch) and prepends thirteen-bit routing header 120 to that cell. The routing header is strictly for internal use in routing the entire cell through the inventive switch. The routing header, indicated by dotted lines, is prepended to each such cell prior to entry of that cell into the inventive switch and is subsequently stripped off that cell prior to that cell being transmitted into the output virtual channel. As shown in FIG. 1, routing header 120 contains two fields: most significant five-bit "H" field 123. that specifies a physical address (1 out of 32) of a specific output port on an output module to which that cell is destined within the inventive switch, preceded by a least significant eight-bit "L'⇌ field 127 which provides a physical address (1 out of 128) of the specific output module to which the cell is destined. Within the switch, cell 110 is treated simply as data and provided with bit-serial transport therethrough. The resulting ATM cell, including the prepended routing header that is transported through the inventive switch, is denoted by reference numeral 100.

B. Overall Architecture of the Inventive B-ISDN Switch

Figure 2:
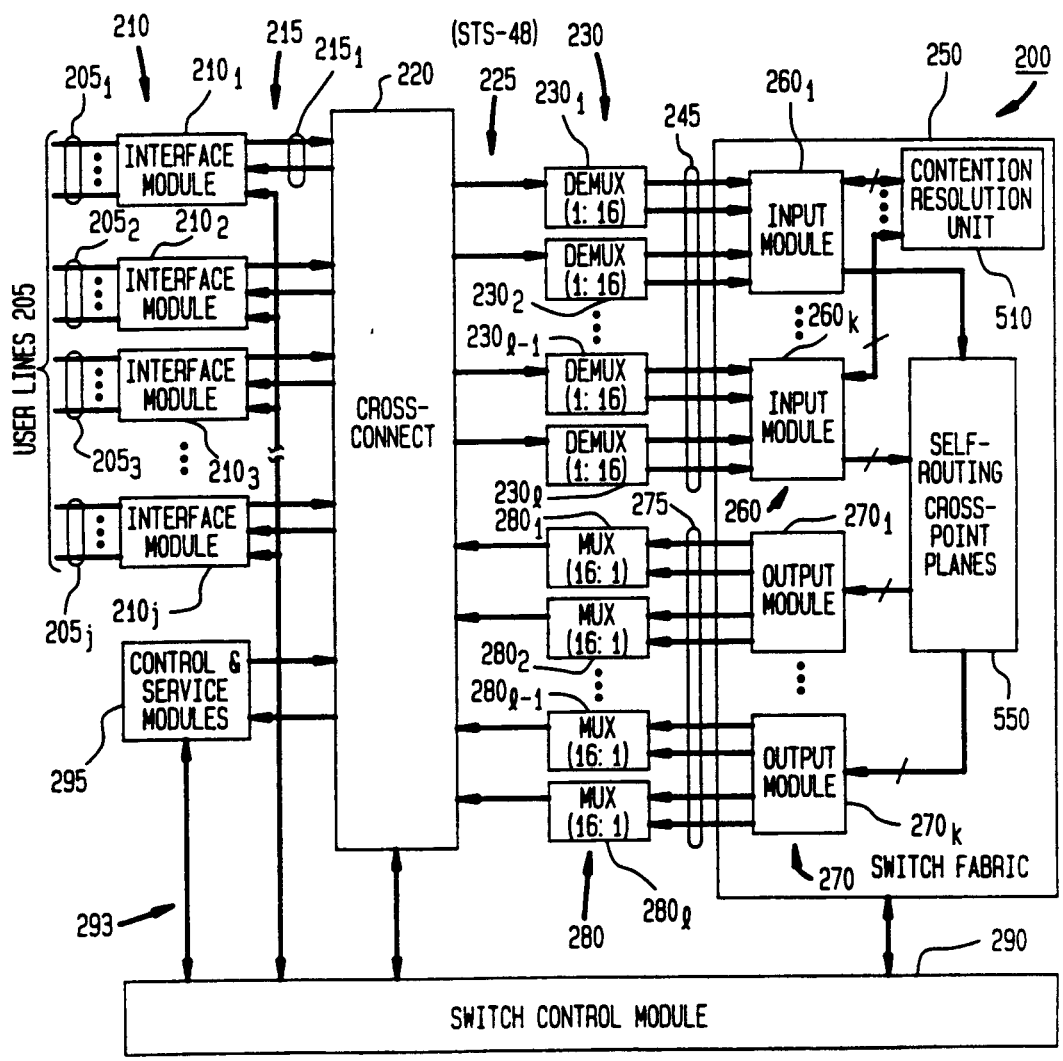
FIG. 2 is a high level block diagram of a preferred embodiment of a broadband ISDN switch constructed in accordance with the teachings of the invention.

FIG. 2 is a high level block diagram of a preferred embodiment of broadband ISDN switch 200 constructed in accordance with the teachings of the invention. For purposes of simplification, various control and clocking signals and associated circuit blocks that would be readily apparent to those skilled in the art have been intentionally omitted from this and other figures.

As shown, the inventive switch is basically formed of interface modules 210, control and service modules 295, cross-connect 220, demultiplexors 230, multiplexors 280, switch fabric 250 and switch control module 290. Interface modules 210 consisting of identical modules $210_1$, $210_2$, $210_3$, ... $210_j$ interface a number of user lines 205, specifically corresponding user line groups $205_1$, $205_2$, $205_3$, ..., $205_j$ to switch 200. User terminals (well known and not shown) are connected to the far end of each of these user lines and supply incoming ATM cells in bit-serial fashion thereto and receive outgoing ATM cells therefrom. In essence, each of the interface modules provides a number of essential network functions: it terminates each of its associated data lines, whether emanating from a user or the network; it protects the B-ISDN network both physically (electrically) and in terms of maintaining incoming data in an appropriate form suitable for carriage through the network; it provides a policing function by, for example, limiting the data rate (channel bandwidth) accorded to a user to that which the user has specifically contracted; it concentrates and sorts incoming packets, as needed; and, as discussed in detail below, it performs cell header translation for each incoming ATM cell and prepends a routing header to each such cell. Through appropriate leads within leads 215, each interface module bi-directionally communicates with the remainder of switch 200 by providing incoming cells at an STS-48 rate (16 times the basic STS-3c rate or approximately 2.488 Gbit/second) and receiving outgoing cells at the same rate. Each of the interface modules is connected to switch control module 290 through leads 293 and is appropriately monitored and controlled thereby. Under the control of switch control module 290, control and service modules 295, provide, also through appropriate leads within leads 215, special purpose inputs and outputs, such as for packet test and switch operations and maintenance connections, into switch 200.

Generally speaking, switch control module 290 performs a number of essential control, test and administration functions for switch 200. To effectively perform these functions, switch control module 290, over leads 293, bi-directionally communicates with and controls each of the blocks that constitutes switch 200 including interface modules 210, cross-connect 220 and switch fabric 250. For example, switch control module 290 processes incoming calls by establishing and tearing down appropriate virtual connections through switch 200 for each such call, selecting routes through cross-connect 220 for incoming and outgoing ATM cells that constitute each call handled by switch 200, and by determining the specific header translation that is to occur within each interface module. In addition, the switch control module also performs network maintenance and administrative functions by respectively attempting to locate and repair problems within the network itself and maintaining data on the performance and status of switch 200 and its interactions with the network. Switch control module 290 also distributes traffic between switch 200 and the remainder of the network in order to efficiently use existing network resources. In addition, module 290 also responds to various user inquiries as well as to user requests to change service.

Switch control module 290 also performs periodic routine diagnostic tests of the entire switch. In particular, switch control module 290 periodically executes a sequence of diagnostic operations to apply pre-defined ATM test cells to and test the resulting operation, on an end-to-end basis, of the entire switch as well as to test the operation of each of the blocks, as set forth above, within both the switch and the switch fabric. Through these diagnostics, switch control module 290 is able to detect failure conditions and, in the event of such a failure, invoke appropriate corrective action to counteract the failure. The corrective action taken in response to a failure of a cross-point switch plane, an input module or an output module is discussed in detail below. Switch control module 290 is formed of any one of many well-known relatively large stored programmed computers and associated peripheral and memory circuits.

Cross-connect 220 is a computer controlled switching matrix that provides circuit switched connections between lines 215, which are connected to interface modules 210 and control and service modules 295, and lines 225. The connections through the cross-connect are established by switch control module 290 and are dynamically changed, as needed, in the event of a failure within switch fabric 250 (specifically of an input or output module, as discussed in detail below) to provide fault tolerant B-ISDN switching operation. High speed trunks, connected through appropriate specialized interface modules would link switch 200 to other switching nodes situated within a B-ISDN network. Since these trunks are irrelevant to the present invention, they have been omitted from the drawing.

Lines 225 apply incoming cells at the STS-48 rate to demultiplexors 230 and accept outgoing cells also at the STS-48 rate from multiplexors 280. Demultiplexors 230, which are formed of identical individual demultiplexors $230_1$, $230_2$, ..., $230_{1-1}$, $230_1$, demultiplex the cells occurring at the STS-48 rate and appearing on single incoming lines, on a 1-to-16 basis, into separate bit-serial lines 245 at the STS-3c rate. Similarly, outgoing cells provided by switch fabric 250 over lines 275 at an STS-3c rate are multiplexed, on a -16-to-1 basis, into single STS-48 outgoing lines situated within lines 225 by multiplexors 280 formed by identical individual multiplexors $280_1$, $280_2$, ... $280_{l-1}$, $280_l$.

Incoming STS-3c lines 245 are connected to identical input modules 260 located within the switch fabric and specifically to corresponding input modules $260_1$, ..., $260_k$. Switch fabric 250 also contains output modules 270, contention resolution unit 510 and self-routing cross-point planes 550. As described in detail below in conjunction with FIG. 5, the input modules provide groups of simultaneous incoming cells to self-routing cross-point planes 550 for simultaneous routing therethrough. Switching planes 550 are formed of multiple planes of self-routing cross-point circuits. Cross-point connections are used because this type of connection is internally non-blocking and has proven to be highly reliable under actual operating service.

The input modules, in conjunction with contention resolution unit 510, select appropriate cells from the input ports, which are fed by lines 245, for carriage through planes 550 in order to eliminate the occurrence of output contention, i.e. two or more cells attempting to simultaneously reach same specific output port within output modules 270. Outgoing cells conducted through planes 550 are directed to output modules 270 which are themselves formed of identical individual output modules $270_1$, $270_2$, ..., $270_k$. Each of the output modules directs each of the outgoing cells received by that module, but without the accompanying routing header, to one of 32 appropriate output ports on that module. Each of these ports is connected via an outgoing STS-3c line within output lines 275 to multiplexors 280 and therethrough to cross-connect 220 back to either a user line or a high speed link to another network switch.

C. Interface Module and Header Processing Unit

As noted above, each interface module performs several essential functions. As it relates to the present invention, each interface module concentrates incoming ATM cells on a 10-to-1 basis and for each such cell performs cell header translation and prepends a routing header thereto.

Figure 3A:
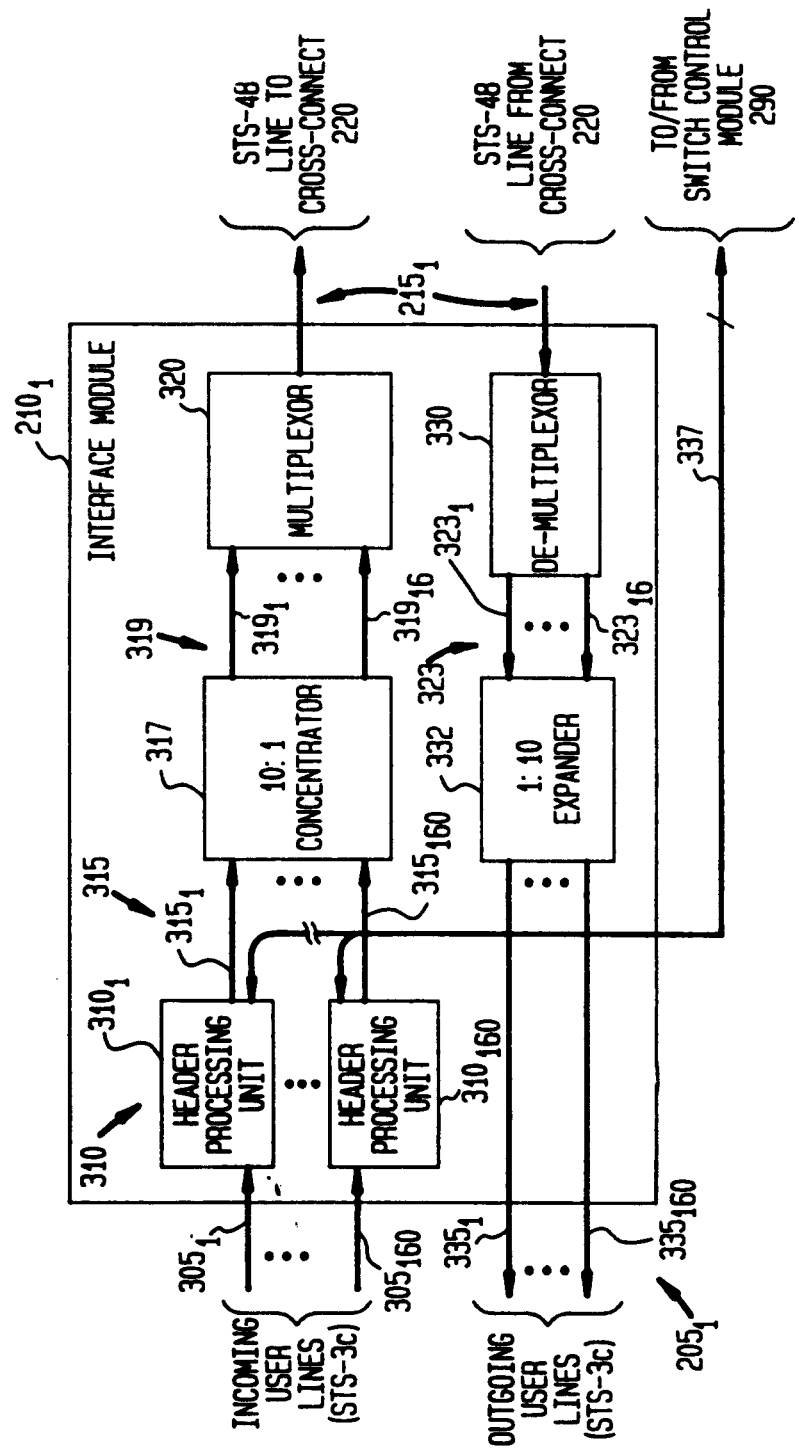
FIG. 3A is a block diagram of a typical interface module, illustratively module $210_1$, shown in FIG. 2.

FIG. 3A is a block diagram of a typical interface module, illustratively module $210_1$, shown in FIG. 2. This module contains header processing units 310, 10-to-1 concentrator 317, multiplexor 320, 1-to-10 expander 332 and demultiplexor 330. Each interface module concentrates incoming ATM cells appearing on 160 incoming user lines into 16 separate STS-3c lines and then multiplexes the cells appearing on these lines on a 16-to-1 basis into one multiplexed STS-48 trunk, which, in turn, is connected to an input of cross-connect 220. Similarly, but in a reversed fashion, each interface module also demultiplexes an outgoing STS-48 line from cross-connect 220, on a 1-to-16 basis, into 16 separate STS-3c lines 323 and further expands each of these STS-3c lines, on a 1-to-10 basis, to yield a total of 160 separate user lines 335. Accordingly, interface module $310_1$ serves incoming user lines $305_1$, ..., $305_{160}$ and outgoing user lines $335_1$, ..., $335_{160}$ which collectively form user lines $205_1$. Each user is provided with both an incoming and an outgoing user line, e.g. lines $305_1$ and $335_1$. The incoming and outgoing STS-48 lines served by module $210_1$ form leads $215_1$.

Each incoming user line is connected to a corresponding header processing (HP) unit located within units 310, specifically formed of header processing units $310_1$, ..., $310_{160}$ respectively associated with lines $305_1$, $305_{160}$. All of the header processing units are identical. As discussed in detail below in connection with FIG. 3B, each header processing unit translates the current VCI of an incoming ATM cell into a new VCI value for transport to the next successive node in the network, overwrites the current VCI field with the new VCI field (though maintaining a priority field at its prior value) and appends an appropriate routing header to that cell for internal use by switch fabric 250 in routing the cell therethrough. The outputs provided by header processing units 310 are routed over serial leads 315 formed of individual lines $315_1$, ..., $315_{160}$ for units $310_1$, ..., $310_{160}$, to concentrator 317. The concentrator concentrates the cell traffic appearing on every group of 10 successive user lines into one corresponding STS-3c line thereby providing incoming STS-3c lines 319 formed of individual lines $319_1$, ..., $319_{16}$. Lines 319 are routed to multiplexor 320, which, through time division multiplexing, multiplexes the cell traffic appearing on these sixteen STS-3c lines onto one STS-48 line that feeds cross-connect 220. Leads 337 (which form a portion of leads 293 shown in FIG. 2) connect each of the header processing units to switch control module 290 for use in transferring data to the switch control module and receiving control instructions and accompanying data therefrom, as discussed in detail below. The outgoing STS-48 line is applied to demultiplexor 330 which, in turn and through time division demultiplexing, demultiplexes the cell traffic on this line across 16 separate STS-3c lines 323, which are formed of individual outgoing STS-3c lines $323_1$, ..., $323_{16}$. Outgoing lines 323 are applied as input to expander 332 which, in turn, expands each such line into 10 successive corresponding user lines, thereby providing outgoing user lines $335_1$, ..., $335_{160}$ which collectively form a portion of user lines $205_1$. Both concentrator 317 and expander 332 are well known in the art.

Figure 3B:
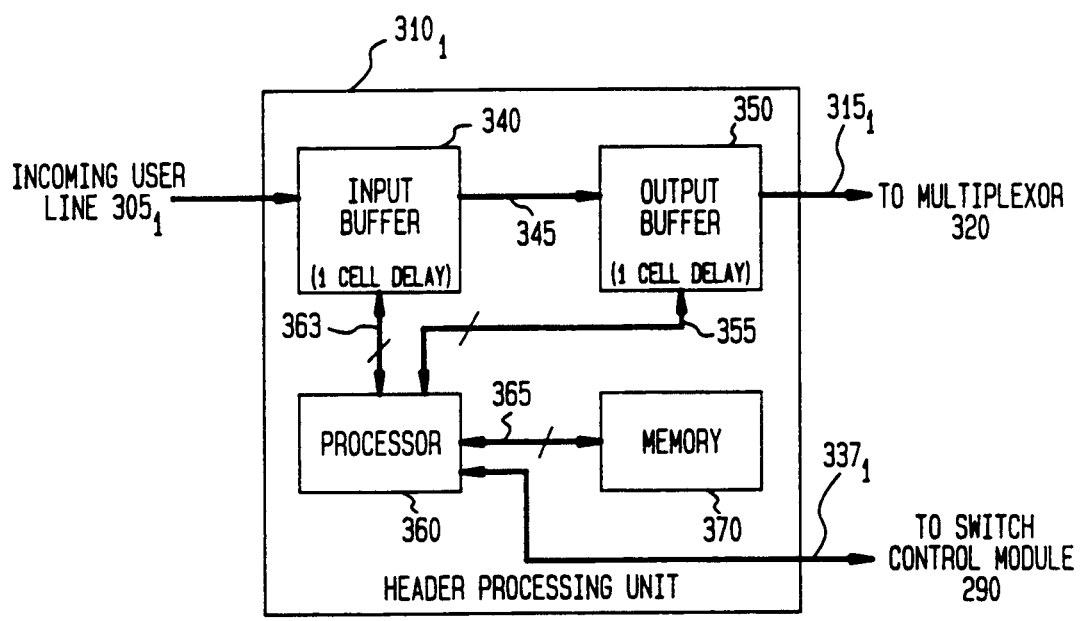
FIG. 3B is a block diagram of a typical header processing unit, illustratively unit $310_1$, shown in FIG. 3A.

FIG. 3B is a block diagram of a typical header processing unit, illustratively unit $310_1$, shown in FIG. 3A. As discussed above, for each incoming ATM cell, this unit translates the current VCI field for that cell into a new VCI, over-writes the current VCI with the new VCI and prepends an appropriate routing header onto that cell.

As shown, header processing unit $310_1$ is formed of input buffer 340, output buffer 350, processor 360 and memory 370. The input and output buffers are connected through respective leads 363 and 355 to processor 360 which itself is connected through leads 365 to memory 370. Each of these buffers provides a one cell delay. The incoming one cell delay through the header processing unit provides processor 360 with sufficient time to perform table look-up operations (as described in detail below in conjunction with FIG. 4) into memory 370, as shown in FIG. 3B, to translate the current VCI for an incoming cell and formulate an appropriate routing header for that cell. The bits shifted out of buffer 340 are shifted into output buffer 350 and therethrough onto lead $315_1$. However, immediately prior to the occurrence of any bits being shifted into buffer 350 from buffer 340 for an incoming ATM cell, processor 360 serially applies at the proper bit intervals appropriately valued bits over leads 355 into output buffer 350 in order to first append the routing header to this cell. Thereafter, as bits for this cell are then shifted into buffer 350, the processor serially applies appropriately valued bits, also via leads 355, to an input of buffer 350 to over-write the VCI field for this cell with a new value. Then, to complete each such cell, all the remaining bits, specifically data bits 113 (see FIG. 1) that form that cell are merely shifted into output buffer 350, as shown in FIG. 3B, in bit-serial fashion over lead 345 from the input buffer 340. The bits shifted out of buffer 350 are applied in bit-serial fashion over lead $315_1$ to an input of multiplexor 320. As such, each header processing unit imparts a two cell delay to each incoming ATM cell. Inasmuch as an STS-3c cell period is approximately 2.83 μsec, this delay amounts to approximately 5.66 μsec. Header processing unit $310_1$ communicates with switch control module 290 via lead $337_1$ which is contained within leads 337 shown in FIG. 3A.

FIG. 4 is a high level flowchart of Routing Header Prepending and VCI Translation Routine 400 undertaken by processor 360 in header processing unit $310_1$ shown in FIG. 3B. As one can readily appreciate, this processor also executes a number of other routines related to other functions that are performed by the header processing unit. Inasmuch as these functions are only marginally relevant to the present invention and since the appropriate routines for these functions would all be readily apparent to those skilled in the art, then, for purposes of simplicity, only general mention will be made hereinafter of the other functions provided by the header processing unit, as they relate to the present invention.

Now, specifically with respect to routine 400, execution proceeds to block 410 upon entry into the routine. This block, when executed, reads the value of the current VCI for the incoming ATM cell as that cell is being shifted into input buffer 340. Once the current VCI field has been completely read, execution proceeds to block 420. This block, when executed, performs a look-up operation into a table stored within memory 370. For each incoming VCI value, this table stores a new VCI value, based upon the interconnection topology of the entire B-ISDN network, and an accompanying routing header. As such, the table look-up operation results in an accessed new VCI value and an accessed routing header. Should the network interconnection topology change, header processing unit $310_1$ can load appropriate VCI values reflecting the changed topology into the table in response to appropriate instructions and data received over leads 293 (see FIG. 2 and specifically over lead $337_1$ shown in FIG. 3B) from switch control module 290. The accessed routing header contains a physical "H" address portion, i.e. a physical address of a specific output port on an output module, and a logical "L" portion, i.e. a logical address of a desired output module. Alternatively, the VCI value can be translated using direct memory addressing wherein the incoming VCI value is used as a memory address to a new VCI value, or through a content addressable memory in which the incoming VCI value is used as a "tag" value to provide an index to a location within the memory where the new VCI value is stored.

Next, to provide fault tolerance, the logical address is translated into a physical module address ("L'⇌") by execution of block 430 shown in FIG. 4. This translation is undertaken using a separate table of logical-to-physical (L-to-L') module addresses which is also stored within memory 370. The physical module address is used within the routing header with the correspondence between a logical address and its accompanying physical address being dictated by the status of all the individual output modules in the switch. In this regard, if any output module should fail, the switch control module can change the eight-bit physical "L'" address associated with that output module and stored in the logical-to-physical translation table without affecting the stored network topology. This has the subsequent effect of appropriately changing the prepended routing headers. To assure that no subsequent ATM cells are directed to the failed output module, the tables in all the header processing units would be simultaneously changed, typically in response to an instruction broadcast over leads 337, shown in FIG. 3A, by switch control module 290 to all these units, in the event of such a failure. By separating the VCI and L-to-L' translation tables, this advantageously helps to prevent the network data and overall network operation from being inadvertently corrupted in the event of a malfunction occurring in response to a local failure of an output module and also simplifies the manner through which an output module fault condition is handled.

After block 430, shown in FIG. 4, has been executed to access a physical module address ("L'"), execution proceeds to block 440. This latter block serially applies a routing header formed of physical module address L' and physical output port address H to output buffer 350 at the proper bit times to prepend a routing header onto the head of the incoming ATM cell which is being shifted therein. Thereafter, execution passes to block 450. This block, when executed, shifts the remainder of the incoming ATM cell, in bit-serial form, from input buffer 340 into output buffer 350 and therethrough onto lead $315_1$ but, in the process of doing so, over-writes the VCI field with the newly accessed value thereof. The value of the priority field in the outgoing ATM cell is set to match the value of this field in the incoming ATM cell, thereby assuring that the ATM cell maintains the same priority as it propagates through the switch. Once block 450 has fully executed, then execution loops back, via path 460, to block 410 to process the next incoming ATM cell that is being serially applied to header processing unit $310_1$ and so on for subsequent such cells.

D. Switch Fabric 250

1. Overall architecture and operation

Figure 5:
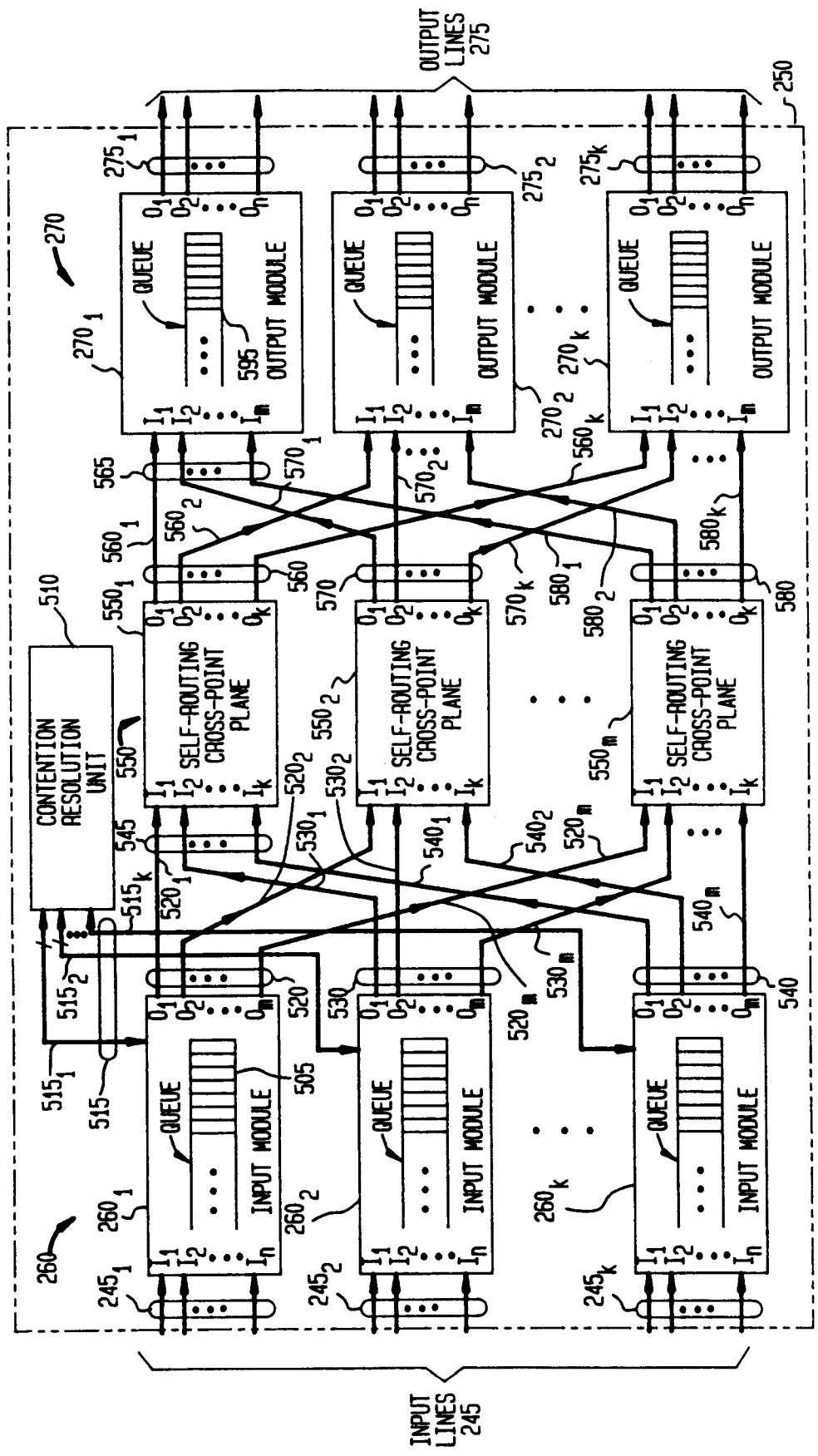
FIG. 5 is a block diagram of switch fabric 250 which is shown in FIG. 2 and which is constructed in accordance with the inventive teachings.

FIG. 5 provides a block diagram of switch fabric 250 which is shown in FIG. 2 and which is constructed in accordance with the inventive teachings.

As shown in FIG. 5, the switch fabric contains input modules 260 composed of identical individual input modules $260_1$, $260_2$, ..., $260_k$; self-routing cross-point switching planes 550 composed of identical individual self-routing cross-point planes $550_1$, $550_2$, ..., $550_m$; output modules 270 composed of identical individual output modules $270_1$, $270_2$, ..., $270_k$; and contention resolution unit 510. In order to service a sufficient number of subscribers, such as approximately 82,000 user lines each having a 150 Mbit/second channel, the switch, assuming a 10-to-1 input concentration ratio, needs to possess a total throughput of approximately 1.2 Terabit/second ($1.2 \times 10^{12}$ bits/second). This, in turn, requires an 8192-by-8192 port switching fabric. As such, fabric 250 must accommodate 8192 separate input ports and 8192 separate output ports. With the architecture shown in FIG. 5, a switch this size can be readily implemented using 256 separate input modules and 256 separate output modules with each such module accommodating 32 separate STS-3c ports. As such, the values of "k" and "n" illustratively equal the values "256" and "32", respectively. Switching fabric 250 illustratively utilizes 32 separate self-routing cross-point switching planes, with each plane having 256 separate input and 256 separate output connections. As such, the value of "m" also illustratively equals the value "32". However, all of these values are merely illustrative as switches, whether for transporting ATM cells or other packets, of nearly any size can be readily constructed based upon the inventive architecture by choosing appropriate values of "k", "m" and "n" accordingly. To a certain extent, these values will be dictated by technological limits and system design tradeoffs, such as, for example, current integration density and physical input/output capacity of available integrated cross-point switch circuits and the density of available interconnect technology, as well as various attendant cost considerations thereof. The complexity, cost and density, of the interconnect wiring, as well as the technology used therefor, running to and from the cross-point switching planes also tends to limit the switching capacity of each plane as well as the number of such planes that are used.

Inasmuch as a 32-by-32 port cross-point switch can be fabricated on a single integrated circuit using currently available technology, individual 256-by-256 port switching planes formed of a matrix of these discrete circuits can be readily constructed. In this regard, such an integrated switching circuit is illustratively discussed in M. Akata et al, "A 250 Mb/s 32×32 CMOS Cross-point LSI for ATM Switching Systems", *Digest of Technical Papers for the 1990 IEEE International Solid State Circuits Conference*, February 1990, pages 30-31. At these capacities, a wired metallic interconnect can easily and economically be used to interconnect such switching planes to the input and output modules.

Figure 20:
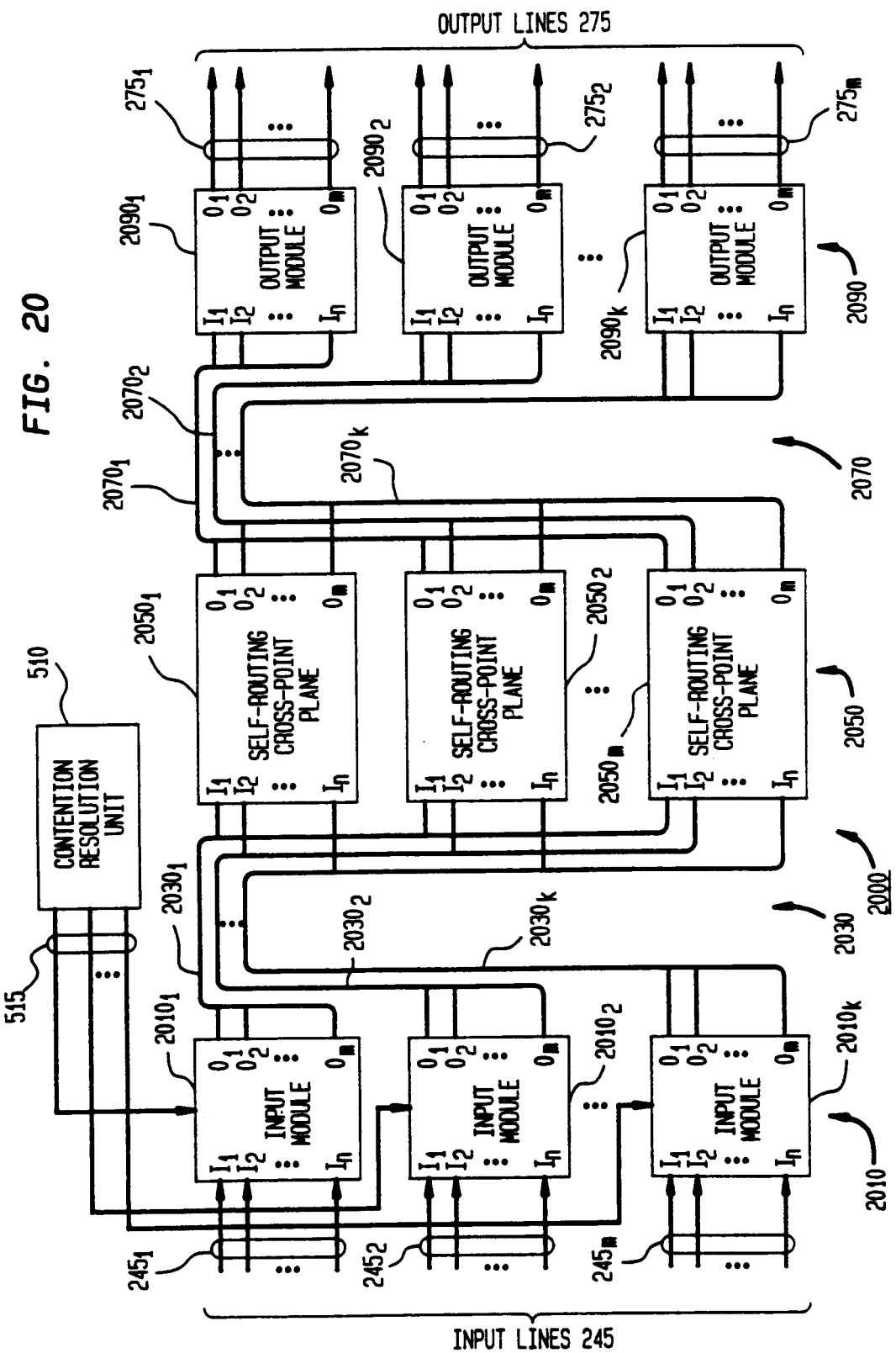
FIG. 20 is a block diagram of an alternate embodiment of the inventive broadband ISDN switch, particularly switch fabric 250, which utilizes a fiber optic interconnect to and from the cross-point switching planes.

It is contemplated that as integration density continues to increase as the result of subsequent continual advances in semiconductor technology, increasingly dense integrated cross-point switches will likely become available with port capacities that significantly exceed 32-by-32. This, in turn, will permit the port capacity of the individual switching planes as well as the overall capacity of the switch to advantageously increase without a significant attendant increase in physical size and/or the cost of each of these planes. Similarly, increases in integration density will also permit each of the input and output modules to accommodate an increased number of input or output ports without necessarily significantly increasing their physical size and/or cost. However, this, in turn, will require increasingly dense interconnects between each of the input modules and the switching planes and between each of these planes and each of the output modules. Nevertheless, it is also expected that accompanying advances will also be made in optical and/or metallic interconnection technology that will economically provide these interconnects at the required density. In this regard, FIG. 20, which will be discussed below, shows a block diagram of an alternate embodiment of switch fabric 250 in which an optical fiber interconnect has been substituted for the metallic interconnect used in the embodiment shown in FIG. 5. Use of such an optical interconnect advantageously reduces the interconnect density involving the switching planes and the input or output modules from 8,192 separate metallic conductors to 256 separate fibers.

Returning to FIG. 5, each input module services a group of 32 separate STS-3c serial input bit streams which result from demultiplexing two STS-48 bit-serial input lines. Input modules $260_1$, $260_2$, ..., $260_k$ respectively service input line groups $245_1$, $245_2$, ..., $245_k$. For any input module, each successive incoming line in the group is connected to a corresponding successive input port of that module. Each input module services 32 different incoming lines, thereby collectively providing, across all 256 such modules, a total of 8192 separate input ports. For example, the different lines in group $245_1$ are connected to inputs $I_1, I_2, \ldots, I_n$ of module $260_1$, and so on for the other input modules. In addition, each of the input modules is connected to the same corresponding numerical input port on all of cross-point switching planes 550, with each successive input module feeding the same successive input (i.e. having the same numerical ranking) on all the switching planes. Specifically, the first input module, i.e. module $260_1$, feeds the first input of each of the 32 different switching planes. Outputs $O_1, O_2, \ldots, O_m$ of module $260_1$ are connected, via leads 520 formed of individual leads $520_1, 520_2, \ldots, 520_m$, to the first input, i.e. $I_1$, of switching planes $550_1, 550_2, \ldots, 550_m$. The second input module, i.e. module $260_2$, feeds, through leads 530 formed of individual leads $530_1, 530_2, \ldots, 530_m$, the second input ($I_2$) of each of the "m" different switching planes and so on with the last input module, i.e. module $260_k$, through leads 540 formed of individual leads $540_1, 540_2, \ldots, 540_m$, feeding the last input, $I_k$, of every switching plane. Accordingly, each of the 32 outputs of every input module feeds a different one of the 32 different cross-point switching planes; each of the switching planes, such as plane $550_1$ is connected, such as through leads 545, to the same numerical output, such as output $O_1$, of all the input modules.

Each of the cross-point switching planes feeds every output module. Using a similar interconnect pattern, each of the 256 numerical outputs on any one of the 32 switching planes feeds a common numerical input (i.e. having the same numerical ranking) on every output module. Specifically, the first switching plane, i.e. plane $550_1$, feeds the first input of each of 256 different output modules 270. Outputs $O_1, O_2, \ldots, O_k$ of plane $550_1$ are connected, via leads 560 formed of individual leads $560_1, 560_2, \ldots, 560_k$, to the first input, i.e $I_1$, of all the output modules $270_1, 270_2, \ldots, 270_k$. The second switching plane, i.e. plane $550_2$, feeds, through leads 570 formed of individual leads $570_1, 570_2, \ldots, 570_k$, the second input ($I_2$) of each of the 256 different output modules and so on with the last switching plane, i.e. plane $550_m$, feeding, through leads 580 formed of individual leads $580_1, 580_2, \ldots 580_k$, the last input, $I_m$, of every output module. Accordingly, the 256 outputs of every cross-point switching plane feed the same numerical input to every one of the 256 different output modules; each of the output modules, such as module $270_1$ is connected, such as through leads 565, to the same numerical output, such as output $O_1$, of every cross-point switching plane.

Each of the output modules routes incoming switched ATM cells to one of 32 separate output ports ($O_1, O_2, \ldots, O_n$) available on that module. Each of these ports is connected to a corresponding output line. Since each of the 256 different output modules feeds a group of 32 separate output lines, such as output lines $275_1, 275_2, \ldots, 275_k$, switch fabric 250 services 8192 separate output ports (with all the lines connected thereto being collectively identified as output lines 275).

Contention resolution unit 510, which will be discussed in detail below, is connected through multi-bit leads $515_1, 515_2, \ldots, 515_k$ which collectively form leads 515 to all of the input modules, specifically input modules $260_1$, $260_2$, ..., $260_k$, respectively.

Operationally speaking, ATM cells are routed through switch fabric 250 in a essentially a two-step process. First, each cell is routed based solely upon the L' portion of its prepended routing header through cross-point switching planes 550 to a particular output module without any regard to the specific output port on an output module to which that cell is destined. Second, that specific output module then routes that incoming cell, based upon the H portion of its prepended routing header, to the specific output port to which that cell is destined. Groups of cells, up to "k" (illustratively 256) in number, are simultaneously routed through each one of the cross-point switching planes with each of "m" (illustratively 32) such groups being routed on a staggered basis during each of "m" (illustratively 32) successive intervals that collectively form an STS-3c cell period, i.e. 2.83 $\mu$sec.

Specifically, each one of input modules 260 contains a single queue, such as queue 505, implemented with a shared memory containing a buffer having a size of 128 Kn cells. With respect to any one input module, such as module $260_1$, that module successively reads the current incoming ATM cell appearing at each of its inputs and deposits (writes) that cell into the next available location in the queue. This reading proceeds continuously in a round-robin fashion continually cycling through all the inputs in a circular manner. All thirty-two inputs are successively read in a phased fashion during each STS-3c cell period. For example, the first cell in the buffer may come from input $I_1$ of that module, the next cell from input $I_2$ and so on. In the event that an "idle" cell is present at any input, then the input module does not place anything into the appropriate location in the queue for that particular input.

Between every two successive write operations, an input module reads a cell from the head of its internal queue ("HOQ"). For this specific HOQ cell, the input module first supplies the L' portion of its prepended routing header (i.e. which specifies the output module to which that cell is destined) to contention resolution unit 510. As such, during a read interval, all the input modules collectively supply simultaneous requests to the contention resolution unit to resolve contention for their current HOQ cells. Unit 510 determines whether any two (or more) ATM cells currently situated at the head of the queues in all the input modules are contending for the same output module. If so, the contention resolution unit determines, as specifically described in detail below and based upon: (a) the numerical top-down value of the input port on which that cell arrived, (b) the relative priority of all the HOQ cells and (c) fairness principles, the particular ATM cells that are situated at the HOQ positions which are to be currently and simultaneously routed from all the input modules, through the cross-point planes, to all the output modules. Once contention has been resolved, unit 510 provides the results, over leads 515, in the form of a single bit instruction back to each individual input module signifying whether that module should presently route or not route its HOQ cell onward through cross-point switching planes 550. Those cells that won arbitration are routed through a common, illustratively the first, cross-point switching plane, e.g. plane $550_1$. One cell, either active or idle, is routed through this plane to the first input ($I_1$) of every output module. As such, a group of cells, up to "k" (illustratively 256) in number—if no contention whatsoever has occurred, are simultaneously routed through this plane to all the output modules. For those input modules that have won arbitration, a HOQ pointer is advanced by one to point to the next cell in each of their respective input queues; however, the HOQ pointer is not advanced for each of those input modules that has lost contention. Thereafter, all the input modules again send the L' portion of the routing header of the cells now located at the HOQ position in their internal queues to contention resolution unit 510. The winning cells that now result are routed to the next successive, e.g. the second, cross-point switching plane, e.g. plane $550_2$ which, in turn, simultaneously routes a second group of up to "k" ATM cells therethrough to all the output modules, and so on for each successive cross-point plane. Those cells that have previously lost arbitration for routing through one switching plane are generally accorded a higher favor (fairness) for purposes of resolving contention and being routed through the next successive switching plane than those cells that have just arrived at the HOQ position in their respective queues, thereby significantly and advantageously reducing the likelihood that head of queue blocking will occur within any input module. After winning ATM cells have been routed to the last cross-point plane, i.e. plane $550_m$, this process cyclically repeats with the first plane and so on. Once contention has been resolved for all the input modules, the winning ATM cells simultaneously supplied by those modules are routed through a common cross-point plane during the remainder of the STS-3c cell period. Thus, each of the input modules interleave read and write operations as successive input lines and outputs thereof are serviced.

Inasmuch as all the input modules provide 256 cells at the end of each arbitration cycle and each separate switching plane requires essentially a full STS-3c cell period to route ATM cells therethrough, then, to fully occupy all the cross-point planes with switching activity, contention resolution unit 510 resolves contention at "m" times the STS-3c cell period, i.e. a complete arbitration cycle involving HOQ cells occurring at all the input modules is completely performed in 2.83/m $\mu$sec. As such, all the cross-point planes operate on a time staggered (phased) basis throughout every STS-3c cell period with routing through each individual plane, e.g. plane $550_1$, being initiated for a group of cells 2.83/m $\mu$sec earlier than at the point in time when the next successive plane, i.e. plane $550_2$, will commence routing the next successive group of cells therethrough.

Furthermore, to substantially reduce the time interval needed to configure all the cross-points within switching planes 550 prior to routing a group of cells therethrough and thereby increase their effective switching bandwidth, the routing header of each cell applied to any input of a cross-point plane carries the output module address (L' value) for the next successive cell that is to be applied to that specific input. As such, once a cell header for a current ATM cell has been routed into a cross-point switching plane, the output module address in its routing header is used, in a manner described in detail below, to set the "future configuration" of the appropriate cross-points in the plane to properly switch the next successive cell that will appear on that input. As will be discussed below in conjunction with FIG. 9A, each individual cross-point circuit situated within each switching plane has an accompanying one-bit register that stores the "future configuration" of that circuit. After a group of ATM cells has been completely routed through a cross-point plane, a strobe pulse is applied to all the cross-point circuits within that plane to simultaneously set the switching configuration of all those circuits to that specified by their stored future configurations, thereby essentially instantaneously setting the entire plane to handle the next group of cells that will be switched therethrough. By storing the next successive switching configuration for each switching plane in advance of the occurrence of the actual corresponding ATM cells that are to be switched therethrough and then, immediately before the application of these cells to this plane, simultaneously setting all the cross-point circuits therein to reflect this configuration, this inventive technique can be viewed as providing cell address "look-ahead".

By preserving the order of the cells in the internal queue in each input module in terms of sequential order of occurrence of the cells at every input port thereof as well as by sequentially reading and writing from the queue in the same order across all input lines to each input module, switch fabric 250 is able to switch ATM cells at several times the STS-3c rate. As can be appreciated, the signals that appear at the inputs of contention resolution unit 510 and at the inputs of each cross-point switching plane must be bit synchronized, to within an appropriate portion, for example ±30%, of a bit period. Any one of many well known techniques and associated circuits can be used to self-synchronize the bit-streams that appear at these inputs. For example, one such technique is described in R. J. Baumert et al, "A Monolithic 50-200 MHz CMOS Clock Recovery and Retiming Circuit", *Proceedings of the IEEE 1989 Custom Integrated Circuits Conference*, pages 14.5.1-14.5.4.

Each of the output modules contains an internal queue, such as queue 595 situated within output module $270_1$, implemented with a shared memory having a buffer size of 128 Kn cells. The internal queue contains a separate logical queue (not specifically shown). To provide this functionality, the internal queue contains "n" separate logical queues, specifically linked lists, with separate pointers for the first (HOQ) and last entries therein. As each new ATM cell is routed to an input of an output module, specifically on a phased basis from one input to the next for this module, the output module simply reads the output port address, i.e. the "H" portion, of the routing header of that cell and deposits (writes) the bits that form that cell, specifically the data portion thereof, into the next available location in the logical queue for the specific output port to which that cell is destined. The last entry pointer for this logical queue is then appropriately updated to reflect this new entry. After all the inputs to an output module have been sequentially serviced, the output module successively reads the cell at the head of each logical queue and applies the bits that form that cell in bit-serial form to a corresponding output port. Reading begins with the first queue, sequentially proceeds to the $n^{th}$ queue and cyclically repeats, after a complete memory write cycle, in a round-robin fashion starting with the first queue and so on. The logic and memory contained within each output module is sufficiently fast to service every input and output of that module in one STS-3c cell period.

Figure 6:
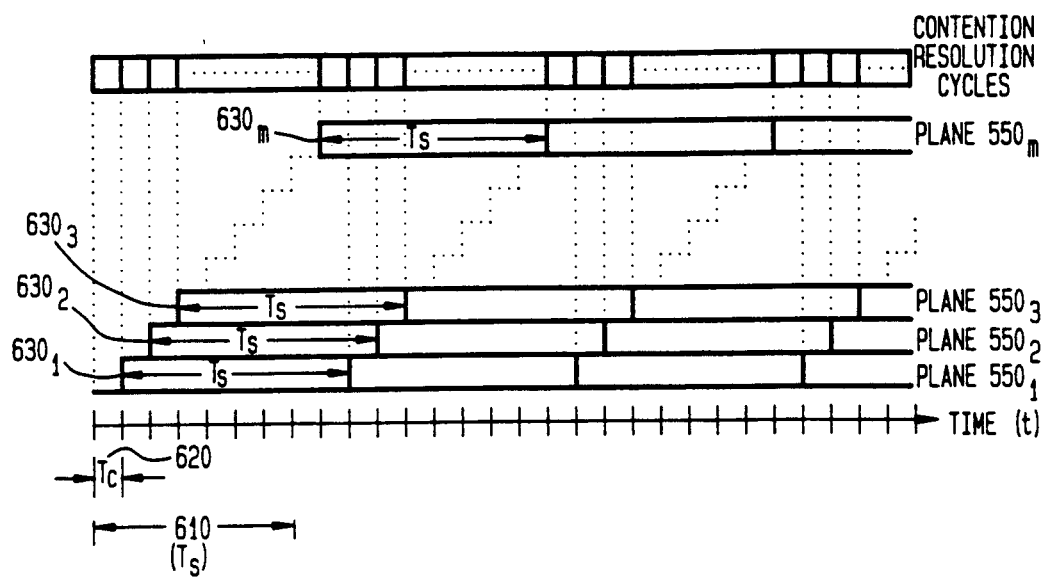
FIG. 6 is a timing diagram of inventive staggered routing and contention resolution operations that occur within switch fabric 250.

As discussed above, the switching planes operate on a time staggered (phased) basis. FIG. 6 is a timing diagram of the inventive staggered routing and contention resolution operations that occur within switch fabric 250 for the "m" switching planes. A complete STS-3c cell period 610 is simply shown as $T_s$ in length. This time interval, specifically 2.83 μsec, is that required to route a group of up to "k" simultaneously occurring cells through a single cross-point switching plane. The interval $T_c$, illustratively designated by the numeral 620, is the time interval consumed for one contention resolution cycle, i.e. that required (2.83/m μsec) by the contention resolution unit to resolve contention for the 256 cells simultaneously present at the head of the queues of all the input modules. The time scale, t, has been divided into intervals of $T_c$ seconds. As shown, each one of cross-point switching planes $550_1, 550_2, 550_3, \ldots, 550_m$ routes a group of simultaneously occurring ATM cells therethrough during a respective corresponding time interval $630_1, 630_2, 630_3, 630_m$, each of which is $T_s$ seconds in length, but which commences after a delay of $T_c$ seconds from the interval associated with the immediately preceding switching plane in sequence. Alternatively, the cross-point switching planes need not be operated on a time staggered basis. In this regard, contention could first be resolved for "m" (illustratively 32) successive groups of ATM cells. Once this occurs, all the winning cells from all such groups would be routed in parallel through the cross-point planes, with the winning cells in each group being simultaneously applied to the inputs of a different corresponding cross-point plane. As such, all the cross-point switching planes would receive synchronized cells and produce synchronized outputs. Now, while all 32 groups of cells are being routed through all the cross-point planes, contention could also be resolved for another 32 successive groups of cells, and so on. As such, the cross-point planes and the contention resolution unit would operate in parallel but not on a time staggered basis. In either case, if the contention resolution unit could resolve contention for a group of up to "k" simultaneously occurring ATM cells in less than 2.83/m μsec, then more than 32 separate cross-point switching planes could be used, i.e. the value of "m" could be increased beyond 32. This, in turn, would permit more than 32 groups of ATM cells to be simultaneously routed, on either a staggered basis or not, through collectively all the cross-point planes thereby increasing the intermediate bandwidth of the entire packet switch.

Figure 7:
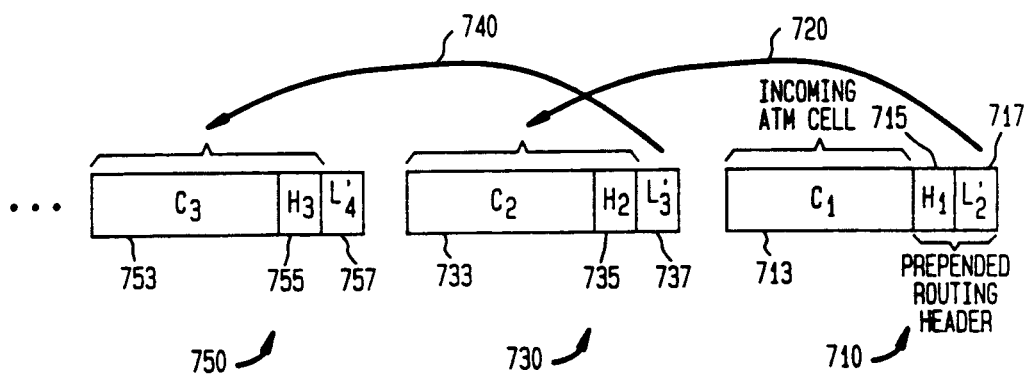
FIG. 7 (shows the relationship between successive ATM cells that are applied to any one input of a cross-point switching plane located within switch fabric 250 and their associated routing headers prepended in accordance with the teachings of the present invention.

Furthermore, as discussed above, the routing header for each ATM cell that is applied to an input of a cross-point switching plane contains the output module address of the next successive ATM cell that will be applied to that specific input. FIG. 7 shows this specific relationship between such successive ATM cells and their associated prepended routing headers. For purposes of illustration, consider three successive ATM cells 710, 730 and 750 that are applied to a common input of a cross-point switching plane. The subscripts in this figure indicate the order of occurrence of the incoming ATM cells and their associated routing header portions.

Cell 710 contains incoming ATM cell $C_1$ designated by reference numeral 713 which has been applied to an input module and to which a routing header has been prepended. This routing header contains output module port address $H_1$ in field 715 and, in field 717, the physical output module address, $L_2'$, for next successive cell 730. The correspondence between physical output port address $L_2'$ and cell 730 is symbolized by arrow 720. Cell 710 is followed by cell 730. This latter cell contains incoming ATM cell $C_2$ designated by reference numeral 733 which has been applied to the same input module and to which a routing header has been prepended. This routing header contains output module port address $H_2$ in field 735 and, in field 737, the physical output module address, $L_3'$, for next successive cell 750. The correspondence between the physical output port address $L_3'$ and next successive cell 750 is symbolized by arrow 740. This next successive cell contains incoming ATM cell $C_3$ designated by reference numeral 753 which has been applied to the same input module and to which a routing header has been prepended. This routing header contains output module port address $H_3$ in field 755 and, in field 757, the physical output module address, $L_4'$, which is associated with the next successive cell (not shown), and so on for all subsequent cells applied to this input of the cross-point switching plane. During switch start-up, the first ATM cell that is applied to each input of a cross-point plane merely contains a routing header that specifies an output port address for the next cell in sequence for that input followed by "idle" data thereafter.

Storing the future configuration in advance of the corresponding cells, through use of the inventive cell address "look ahead" technique, significantly relaxes a relatively tight time constraint that would otherwise exist for reading the prepended routing header of each of the current cells and then setting the switch configuration therefor. As a result, the need to employ relatively costly high speed logic to read the prepended routing headers and set the configuration of all the cross-point circuits is advantageously eliminated.

The switch can easily grow from a relatively small size by merely adding additional cross-point switching planes along with appropriate input and output modules. Inasmuch as the cost of installing "m" separate cross-point planes is expected to be significantly less than the cost of installing "k" separate input and output modules, it may be economically attractive to fabricate a switch containing a maximum number of cross-point switching planes but less than a full complement of input and output modules. In this scenario, some cross-point plane inputs would simply be idle. Then, over time, incremental numbers of input and output modules and accompanying interconnects (to previously unused cross-point switching plane inputs) would be successively added to the switch fabric to incrementally increase the capacity of the switch to keep pace with expanding market demand for B-ISDN service. Furthermore, it is likely that the cost of a full sized contention resolution unit would amount to an insignificant portion of the cost of the total switch fabric. Hence, such a unit could initially be economically incorporated into the switch fabric even if a number of the inputs to the unit were initially unused, particularly in view of the associated costs of expanding the cross-point planes at a later date. With this scenario, switch growth would simply be a linear function of the number of additional input and output module ports needed. Alternatively, a switch fabric could be fabricated with "k" input and output modules but with less than "m" switching planes, in which case some of the lines to the input and output modules would initially be idle.

2. Cross-point switching plane

Figure 8:
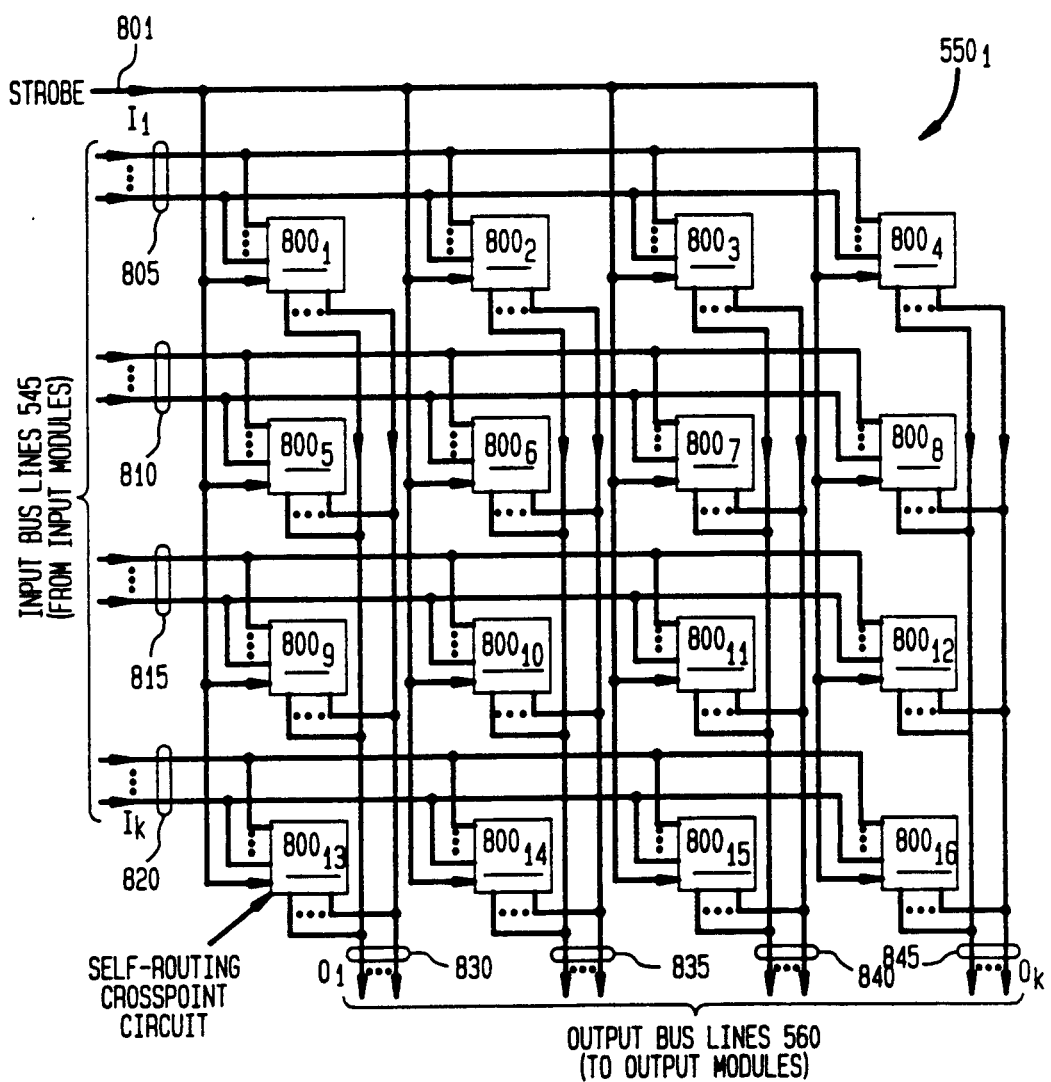
FIG. 8 is a high level block diagram of a typical cross-point switching plane, illustratively plane $550_1$, shown in FIG. 5.

FIG. 8 is a high level block diagram of a typical cross-point switching plane, illustratively plane $550_1$, shown in FIG. 5. This diagram relies on fabricating plane $550_1$ using a 4-by-4 matrix of illustratively sixteen integrated 64-by-64 cross-point circuits, $800_1$, $800_2$, ..., $800_{16}$, with each such integrated circuit being formed on a single chip. Input signals ($I_1$, ..., $I_k$) which appear on leads 545 are routed in parallel from corresponding input modules by separate busses 805, 810, 815 and 820 to the inputs of each chip in each corresponding row in the matrix. The outputs produced by each column of chips in the matrix are applied in parallel through respective output busses 830, 835, 840 and 845 to output bus lines 560, which, in turn, collectively provide switched output signals ($O_1$, ..., $O_k$) that feed respective output modules. Each integrated cross-point circuit employs tri-state output drivers in order to permit the outputs of these chips to be connected together in parallel. A strobe pulse is applied, via line 801, to all the cross-point circuits to signify the start of an ATM cell routing header.

Although this architecture relies on using 64-by-64 cross-point circuits, the matrix can be readily reduced in each dimension to accommodate the use of 32-by-32 integrated cross-point circuits or alternatively expanded in each dimension to accommodate the use of integrated cross-point circuits that have a capacity greater than 64-by-64. The number of lines in each bus would necessarily change based upon the capacity of the specific integrated cross-point circuits that are to be used to form the matrix. In addition, the above-described values of parameters "n", "m" and "k" would also need to be changed accordingly.

Through the use of the bus based architecture, the size of each cross-point plane can easily grow by merely adding additional cross-point switches in each dimension to that plane along with appropriate bus connections therefor. In this manner, a printed circuit board containing a cross-point switching plane could be installed with appropriate sockets to accommodate all such circuits but with a partial population of cross-point integrated circuits arranged in a relatively small matrix in some of these sockets. Circuits $800_1$, $800_2$, $800_5$ and $800_6$ could illustratively form such a matrix. Over time, as the need arose, additional cross-point integrated circuits could be added to the board, on a plug-in basis, to increase its switching capacity, as needed. Here, growth would exhibit a a squared dependency, i.e. a function of the difference in the squares of the total number of switching circuits that are required and the number of such circuits that are presently installed.

FIG. 9A is a block diagram of one embodiment of a portion of a typical single self-routing cross-point circuit, illustratively circuit $800_1$ shown in FIG. 8, used within each cross-point plane in the inventive broadband ISDN switch. This particular embodiment sets all the cross-point switching elements in accordance with the inventive cell address "look ahead" technique, as described above. Although each cross-point circuit has been described as containing either, for example, 32-by-32 or 64-by-64 cross-point connections, in order to simplify this figure, it specifically shows a 4-by-4 cross-point circuit. Given the configuration of this circuit and the accompanying description, it will be readily apparent to anyone skilled in the art that larger cross-point circuits can be fabricated, within technological limits, by merely upwardly scaling the size of both the cross-point switching matrix and the ancillary support circuits to an appropriate level.

As shown, this portion of cross-point circuit $800_1$ contains a square matrix of identical cross-point cells organized into rows and columns. Each such cell, of which cell 950 is typical, can assume either one of two states: closed or open. One-bit input signals are applied in parallel to all cells in a rows while one-bit outputs of all cells in a column are connected in parallel, specifically through a pre-charged bus scheme which is similar to the well known wired-OR configuration. If a cell, such as cell 950, is closed, then a signal appearing on its row input $805_1$ will be conducted through that cell to its columnar output $830_1$, and so on for all the other such cells. The state of all the cells, i.e. open or closed, is collectively referred to as the switch configuration. As noted above, each cell not only assumes its current configuration but also stores its future, specifically next, configuration. A one-bit register, such as register 957 is situated within each cell, such as cell 950, to store the future configuration.

Each column of cross-point cells is connected, by vertical addressing lines 925, to column decoder 920 and, by horizontal addressing lines 935, to sequencer 930. A strobe pulse is connected through leads 915 and delay element 940 to an input of the sequencer. Incoming serial ATM cells are routed by input lines $805_1$, $805_2$, $805_3$ and $805_4$ to the inputs of corresponding rows of cross-point cells as well as to the inputs of shift registers $910_1$, $910_2$, $910_3$ and $910_4$. These shift registers collectively form shift registers 910. Any of the individual shift registers within registers 910 can be read in parallel through application of a suitable address by sequencer 930 to address leads 937. Each of these shift registers is sized to only hold the output module address (L' portion) of the prepended routing header. The outputs of the individual shift registers are connected in parallel and applied through leads 913 to an input of column decoder 920. Outgoing serial ATM cells routed through the cross-point cells are applied to output leads $830_1$, $830_2$, $830_3$ and $830_4$.

Ordinarily, if the one-bit future configuration register, e.g. register 953, were not present in each cross-point cell, then the configuration of each cell would be set by simultaneously providing appropriate signals on vertical and horizontal addressing lines, such as lines $925_1$ and $935_1$, respectively. Whenever a particular cell in the matrix is addressed in this fashion, i.e. situated at the intersection of two high level vertical and horizontal addressing signals, that cell assumes a closed state while all the other cells in the same column assume an open state. As a result, at most only one cell on any column is closed at any given time.

However, as discussed above, to implement a self-routing function requiring minimal delay, the future configuration of all the cross-point cells is stored while a current group of ATM cells is propagating through these cross-point cells. Once these ATM cells have fully propagated through the cross-point cells and immediately prior to the application of the next group of ATM cells to cross-point cells, all these cross-point cells are simultaneously strobed, by a strobe pulse applied to lead 801, to change the entire switch configuration to match the stored future configuration. Specifically, to provide this function, whenever a strobe pulse occurs on lead 801 coincident with the start of routing headers being applied to the input leads, each of the individual shift registers 910 begin serially storing the L' portion of the routing header as it appears on the corresponding input line connected to that register. The strobe pulse is applied, via driver 905 and leads 915, to a strobe input of every cross-point cell. Once the L' portion of a corresponding incoming routing header has been completely stored in each of the shift registers, these portions are used to appropriately set the future configuration bits.

In particular, shortly after all the current routing headers have been written into shift registers 910, delay element 940 produces a delayed strobe pulse at its output and applies the delayed pulse to an enable input (not specifically marked) of sequencer 930. The sequencer, in turn, applies a stream of appropriate addresses on leads 937 to sequentially read the contents, i.e. the stored L' portions of the routing headers, stored within each individual shift register of registers 910. This portion of the routing header on any input line contains two bits which specifies which particular integrated cross-point circuit on the row connected to that input line (such as the row containing circuits $800_1$, $800_2$, $800_3$ and $800_4$ shown in FIG. 8) will have a cross-point cell closed for that particular input line.

In response to each routing header that appears on leads 913 shown in FIG. 9A, future configuration bits for a column of cross-point cells are appropriately and simultaneously set or reset. Specifically, if a routing header for a given input line does not identify a particular integrated cross-point circuit, such as the portion of circuit $800_1$ shown in FIG. 9A, then the column decoder in that circuit, such as decoder 920, simply ignores the routing header supplied for this input line. Alternatively, if the L' portion of the routing header for an input line, such as line $805_1$, specifies that the integrated cross-point circuit contains a cross-point cell that is to assume a closed state for the next ATM cell cycle, then the column decoder, in conjunction with sequencer 930, applies horizontal and vertical addressing signals to the address inputs of the future configuration register for that specific cross-point cell, which, in turn, sets its future configuration accordingly. The column decoder and the sequencer also apply appropriate address signals to the address inputs of the future configuration bits in the remaining cross-point cells in the same column as that specific cell in order to reset all the future configuration bits for these remaining cross-point cells. This process of sequentially reading the routing headers and setting/resetting the future configuration bits sequentially continues for each successive input line, such as illustratively lines $805_2$, $805_3$ and $805_4$, in each integrated cross-point circuit. Those cells in which their future configuration bits are set or reset are to assume either closed or open states, respectively, during the next ATM cell cycle. Once all the routing headers have been processed in this fashion within an integrated cross-point circuit, all the remaining bits of the current ATM cells are merely shifted through the currently closed cross-point cells in this integrated cross-point circuit. After these cells have been completely shifted through the cross-point circuit, then a strobe pulse again appears, such as on lead 801, to simultaneously change the configuration of every cross-point cell to match its stored future configuration, with this self-routing cross-point switching process then cyclically repeating as described above. Setting the configuration of the cross-point cells in this sequential fashion advantageously eliminates the need to use a centralized controller to set these cells as well as the interconnection wiring associated therewith including that running to the crosspoint cells.

Another embodiment of a self-routing cross-point circuit is shown in FIG. 9B. This embodiment, which involves a relatively simple modification to that shown in FIG. 9A, handles incoming ATM cells in which each such cell carries its own complete prepended routing header and hence does not employ the inventive cell address "look ahead" technique. For ease of understanding, FIG. 9B specifically depicts the same portion of self-routing cross-point circuit $800_1$ as shown in FIG. 9A. In view of the high degree of similarity between the two embodiments shown in FIGS. 9A and 9B, then, for simplicity, the following discussion will only address the differences therebetween.

Structurally speaking, the embodiment shown in FIG. 9B differs from that shown in FIG. 9A by the addition of shift registers 917, formed of individual shift registers $917_1$, $917_2$, $917_3$ and $917_4$, interposed between input leads $805_1$, $805_2$, $805_3$ and $805_4$ and the respective input to each row of cross-point cells. Each of these shift registers is one ATM cell in length, i.e. specifically 424 bits (53 bytes × 8 bits/byte) long. In operation, the routing header of each incoming ATM cell appearing on input lines $805_1$, $805_2$, $805_3$ and $805_4$ is simultaneously and serially shifted into both shift registers $910_1$, $910_2$, $910_3$ and $910_4$ and shift registers $917_1$, $917_2$, $917_3$ and $917_4$, respectively. Inasmuch as one ATM cell period is needed to fill shift registers 917 with these incoming cells, then, once the prepended routing headers for these cells have been shifted into shift registers 910, the latter shift registers are sequentially read and their contents used to set and store the future configuration bits of all the cross-point cells, in the manner set forth above, while these incoming ATM cells continue to be serially shifted into registers 917. After a delay of one ATM cell period commencing from the time the first bit of a prepended routing header of each of these incoming cells is first shifted into registers 910 and 917, a strobe pulse is applied, via lead 801 and driver 905, to simultaneously change the configuration of the all the cross-point cells to match that specified by the stored future configuration bits. This configures all the cross-point cells to properly route the ATM cells now fully stored in shift registers 91 through the cross-point circuit. While the ATM cells are being shifted from registers 917 and through the cross-point cells, a new group of ATM cells can be shifted into registers 910 and 917 to properly configure the cross-point circuit and thereafter route these cells therethrough accordingly, and so on.

As such, the embodiment shown in FIG. 9B does not require the prepended routing header in each ATM cell on any input line to contain a physical output module address of the next successive cell that will appear on that line. Accordingly, use of this embodiment simplifies the structure of each input module by eliminating the circuitry, specifically an internal routing header transfer circuit (as described in detail below), needed to shift and properly configure portions of the prepended routing headers for each ATM cell. However, this embodiment complicates the design of each cross-point circuit by requiring a cell long shift register to be added to each input line. Inasmuch as all of these shift registers, each 424 bits long, will likely consume a significant portion of the available area on a single integrated circuit, this will disadvantageously reduce the integration density, in terms of the number of input lines that could be handled, of each separate integrated cross-point circuit. Moreover, shift registers 917 impart an additional one ATM cell period, which is generally insignificant, to the end-to-end propagation delay experienced by incoming packets transiting through the entire packet switch.

3. Input module

Figure 10:
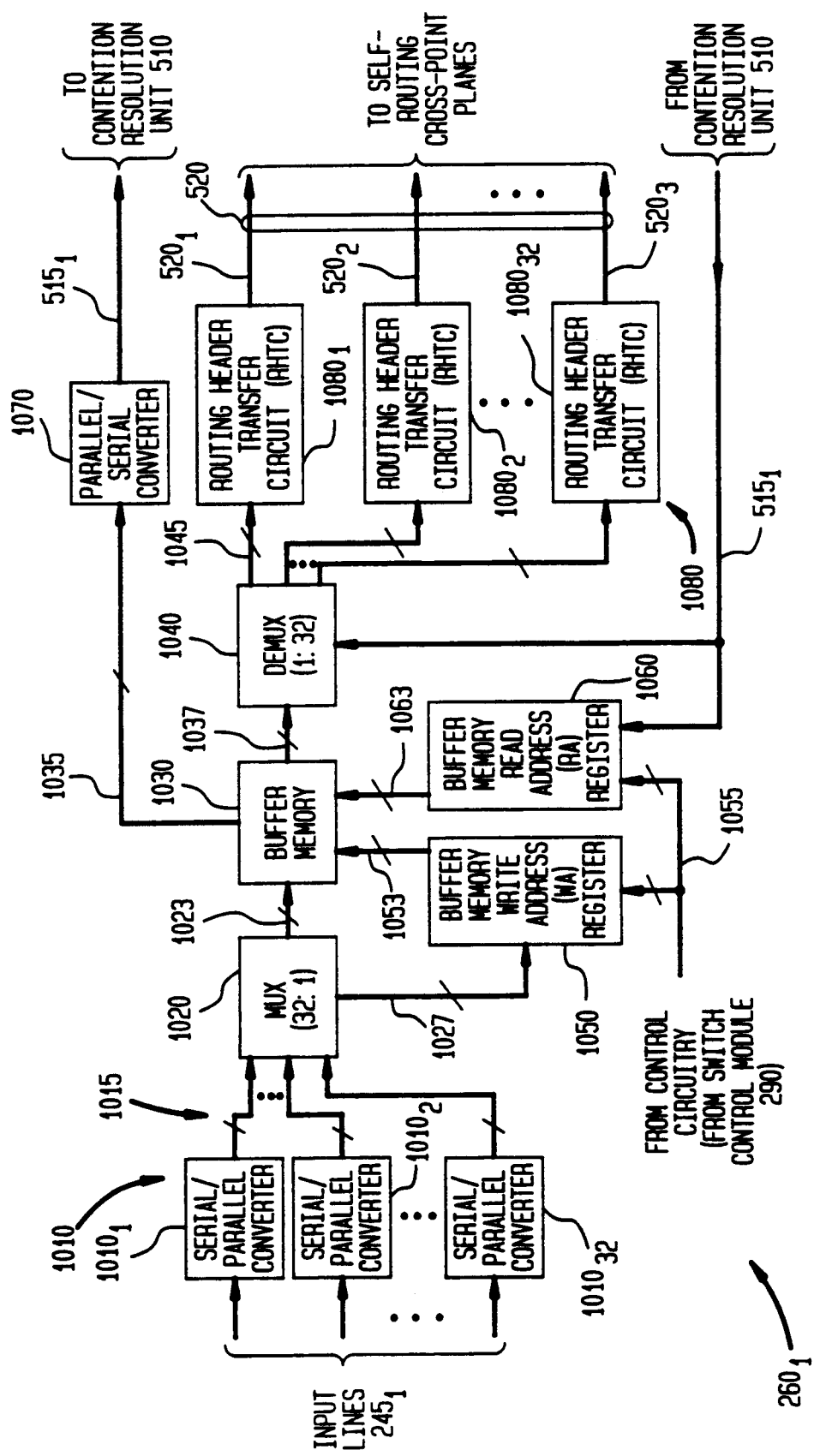
FIG. 10 is a block diagram of a typical input module, illustratively input module $260_1$, shown in FIGS. 2 and 5.

FIG. 10 is a block diagram of a typical input module, illustratively input module $260_1$, shown in FIG. 2 and 5.

As discussed above, the input module sequentially obtains each incoming ATM cell, including its prepended routing header, from every input line in seriatim connected thereto and deposits (writes) that cell into the first available location in a single internal shared memory queue. This reading proceeds continuously in a round-robin fashion continually cycling through all the inputs in a circular manner. All thirty-two inputs are successively read in a phased fashion during each STS-3c cell period. The input module reads, on an interleaved basis between separate write operations, the ATM cell situated at the head of the queue and communicates the output module address (L' portion) for that cell to the contention resolution unit. If this input module is informed by the contention resolution unit that it won arbitration, then the current ATM cell situated at the head of the queue is serially transmitted into the next successive output lead and, from there, into a cross-point switching plane. As part of this transmission process, the physical output module address in the prepended routing header for this cell is substituted with the physical output module address for the next successive cell that is to be applied to this output lead.

Specifically, within illustrative input module $260_1$, as shown, each input line within input lines $245_1$ is routed through a separate serial/parallel converter $1010_1$, $1010_2$, . . . , $1010_{32}$ which collectively form converters 1010. These converters change the format of each incoming cell from serial to byte-parallel form. The output of all of these converters are connected, via leads 1015, to respective parallel inputs of multiplexor 1020. This multiplexor, instructed by suitable clock and control circuitry (not shown), sequentially writes, in a round-robin fashion, each incoming ATM cell in the next available cell location in buffer memory 1030. This location is addressed by the contents of buffer memory write address (WA) register 1050. After each write of a byte for a given incoming ATM cell, the contents of this register are incremented by one to point to the next sequential location in memory 1030. In addition, to determine whether buffer memory 1030 is now full, the contents of register 1050 are also compared at this time to the current contents of buffer memory read address (RA) register 1060. No further write operations will occur as long as memory buffer 1030 remains full. Each write to buffer memory 1030 alternates with a read therefrom. However, before a read operation actually proceeds, the current address in buffer memory read address register 1060 is compared to the address stored in write address register 1050 to determine whether buffer memory 1030 is empty. No read operations occur as long as the buffer remains empty. The ATM cell supplied by memory 1030 is applied in parallel fashion, via leads 1037, to an input of demultiplexor 1040. This demultiplexor, in turn, routes this cell to the next successive one of routing header transfer circuits 1080. These circuits are also selected in a round-robin fashion. Each one of the routing header transfer circuits 1080, formed of identical individual circuits $1080_1$, $1080_2$, . . . , $1080_{32}$, first substitutes the physical output module address in the prepended routing header for the current cell with the physical output module address for the next successive cell, then converts the current cell into bit-serial form and applies the resulting bit-serial ATM cell, via a respective output lead $520_1$, $520_2$ . . . , $520_m$ which collectively form leads 520, to the cross-point switching planes.

When an ATM cell is first read from buffer memory 1030, this memory directs the physical output module address portion of the prepended routing header and the value of the cell priority field, via leads 1035, to parallel/serial converter 1070. This converter converts this address portion and priority value into bit-serial format and applies the resulting serial information, via leads $515_1$, to contention resolution unit 510. If the contention resolution unit then provides a response, as specifically discussed below, over leads $515_1$ indicating that contending input module $260_1$ has lost arbitration, then read address register 1060 does not increment its current address and the demultiplexor is instructed to mark the current cell as "idle" before applying it to a routing header transfer circuit. As a result, the current packet remains at the head of the queue in buffer memory 1030 awaiting an opportunity to be transmitted through the demultiplexor and thereafter to the cross-point switching planes. If, however, contention resolution unit provides a response over lead $515_1$ indicating that input module $260_1$ has won arbitration, then both the current address in buffer memory read address memory 1060 is incremented by one to point to the next stored ATM cell and demultiplexor 1040 routes the current ATM cell, in byte parallel form, that is currently being read from buffer memory 1030 to the next successive routing header transfer circuit. Leads 1055 are used to carry control signals from control circuitry (specifically switch control module 290) to clear registers 1050 and 1060, when appropriate.

Figure 11:
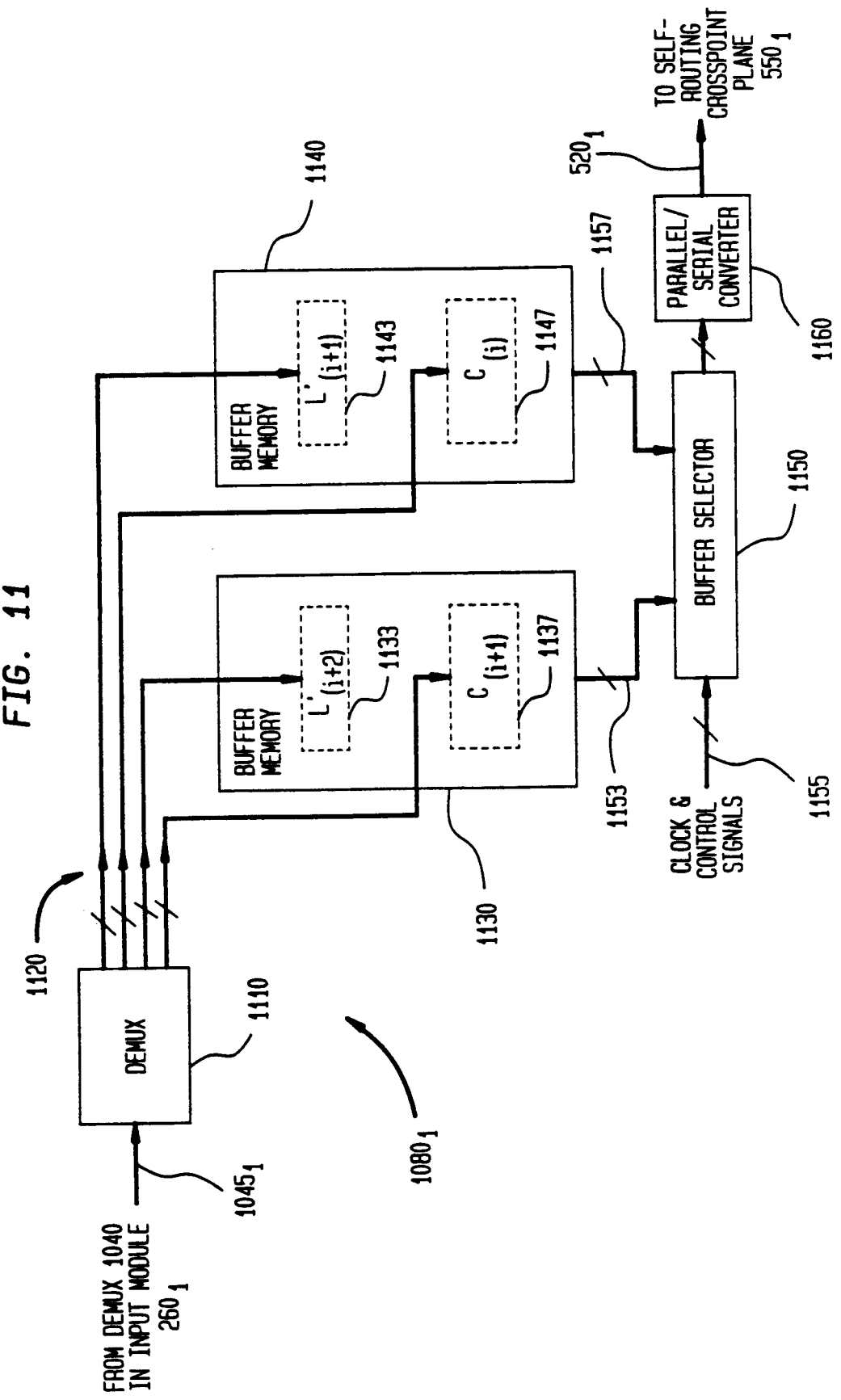
FIG. 11 is a block diagram of a typical routing header transfer circuit, illustratively circuit $1080_1$, shown in FIG. 10.

FIG. 11 is a block diagram of a typical routing header transfer circuit, illustratively circuit $1080_1$, shown in FIG. 10. This circuit contains demultiplexor 1110, buffer memories 1130 and 1140, buffer selector 1150 and parallel/serial converter 1160. After an ATM cell is initially applied to input lead $1045_1$ and therethrough to demultiplexor 1110, the demultiplexor separates the physical output module address portion (L') of the prepended routing header from the remainder of the cell. This portion is transferred over leads 1120 to one portion of one of these two buffer memories, illustratively portion 1133 of buffer memory 1130. Thereafter, the remainder of that cell (including the output port address and the 53-byte ATM cell itself) is then transferred over these leads by the demultiplexor to the opposite portion of the other one of these two buffer memories, illustratively portion 1147 of buffer memory 1140. Demultiplexor 1110 repeats this process for the next incoming ATM cell appearing on leads $1045_1$ illustratively using memory portion 1143 to store the physical output module address of the prepended routing header and memory portion 1137 to store the remainder of that cell. As such, the physical output module address for any ATM cell appearing on lead $1045_1$ is stored in one memory buffer and the remainder of that cell is stored in the other buffer. This has the effect of coupling, within any one of these memory buffers, the physical output module address of the prepended header for the next successive cell with the remainder of the current cell. Specifically, after the physical output module address for the $i+2$ cell has been written into memory 1130, buffer memories 1130 and 1140 will illustratively and respectively hold an ATM cell formed of physical output module address $L'_{i+2}$ and the remainder of cell $C_{i+1}$ and an ATM cell formed of physical output module address $L'_{i+1}$ and the remainder of cell $C_i$. Once the physical output module address has been deposited into one of these buffer memories, then, during the remainder of an ATM cell period, buffer selector 1150 reads the complete contents of this memory. During the next ATM cell period, the buffer selector will completely read the contents of the other buffer memory. As such, the routing header of any cell read by buffer selector 1150 contains the physical output module address (L') for the next successive ATM cell. The byte-parallel output provided by buffer selector 1150 is applied to parallel/serial converter 1160 which converts the cell currently being read into bit-serial form for application over lead $520_1$ to an input of cross-point switching plane $550_1$.

4. Output module

Figure 12:
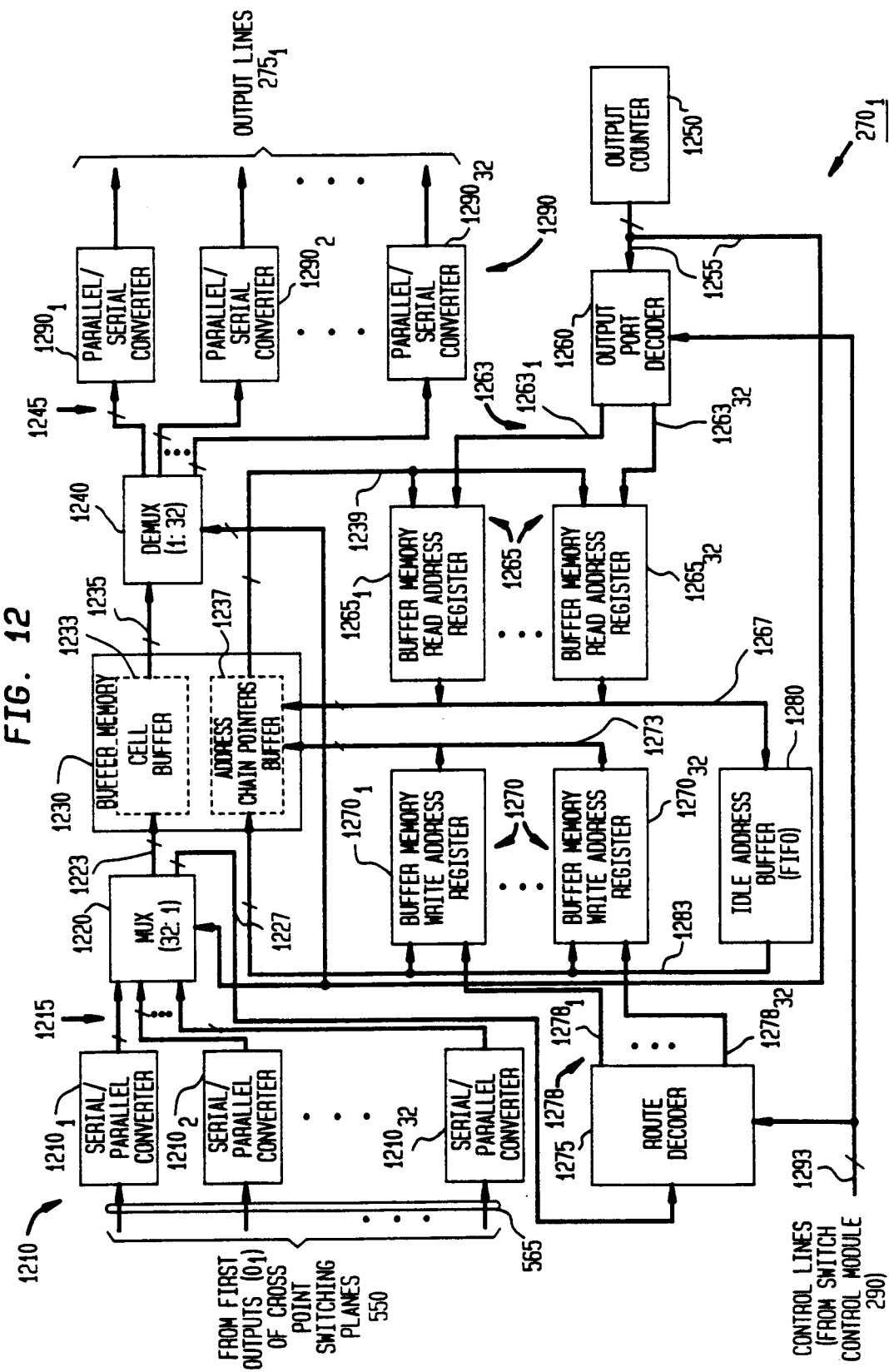
FIG. 12 is a block diagram of a typical output module, illustratively output module $270_1$, shown in FIGS. 2 and 5.

FIG. 12 is a block diagram of a typical output module, illustratively output module $270_1$, shown in FIGS. 2 and 5.

As discussed above, the output module contains "n" separate internal logical queues. Essentially, output module $270_1$ routes each successive incoming ATM cell supplied by a common output of all the cross-point switching planes on a phased basis to an appropriate location at the end of a corresponding logical queue. The particular logical queue is determined by the output port address, i.e. the "H" portion of the prepended routing header in that cell. After all thirty-two inputs to an output module have been sequentially serviced, the output module successively reads the cell at the head of each logical queue and applies the bits that form that cell in bit-serial form to a corresponding output port and specifically to an output line associated therewith. Reading begins with the first queue, sequentially proceeds to the $32^{nd}$ queue and cyclically repeats, after a complete memory write cycle, in a round-robin fashion starting with the first queue and so on. The logic and memory contained within the output module is sufficiently fast to service every input and output of that module in one STS-3c cell period.

Specifically, incoming ATM cells provided from a common output, illustratively the first output ($O_1$), of all the cross-point switching planes are routed over corresponding lines in input lines 565 within illustrative output module $270_1$, as shown, to separate corresponding serial/parallel converters $1210_1$, $1210_2$, ..., $1210_{32}$. These individual converters collectively form converters 1210. These converters change the format of each incoming cell from serial to byte-parallel form. The outputs of all of these converters are connected, via leads 1215, to respective parallel inputs of multiplexor 1220. This multiplexor, instructed by an address appearing on leads 1255 and supplied by output counter 1250, sequentially writes, in a round-robin fashion, each incoming ATM cell, though without its prepended routing header, from each addressed lead on leads 1215 into the first available location in the logical queue specified by the output port address ("H") portion of the prepended routing address in that cell.

The incoming ATM cells are specifically written into cell buffer 1233 situated within buffer memory 1230. This buffer memory implements thirty-two separate logical queues on a shared memory basis as separate linked lists and stores appropriate pointers to the items in each such list in address chain pointers buffer 1237. The specific memory address into which a currently supplied ATM cell is to be written is provided by buffer memory write address (WA) registers 1270 which are formed of individual write address registers $1270_1$, ..., $1270_{32}$. The specific register that supplies a write address to buffer memory 1230 for a current incoming ATM cell is determined by route decoder 1275. Specifically, as an ATM cell is first being routed through multiplexor 1220, the multiplexor extracts the output port address (H) portion of its routing header and applies this portion in byte-parallel form, via leads 1227, to route decoder 1275. Route decoder 1275 then decodes this output port address and applies a high level control signal to a corresponding one of control leads 1278, formed of individual leads $1278_1, \ldots, 1278_{32}$, to select a corresponding one of the 32 buffer memory write address registers 1270. Concurrently, idle address buffer 1280, which is implemented using a hardware FIFO file, supplies an available address of an idle memory location within cell buffer 1233 and writes that address into the selected memory write address register. Buffer 1280 stores the addresses of all the idle locations in cell buffer 1233. The address of the currently available idle memory location is also written into address chain pointers buffer 1237. The selected memory address write register then supplies that address onto leads 1273 as the address of the cell location within cell buffer 1233 at which the remainder of the current cell being provided by multiplexor 1220 is to be written. Once memory 1230 has been addressed in this fashion, multiplexor supplies, in byte-parallel form, all the bytes in the ATM cell subsequent to the prepended routing header, via leads 1223, to a parallel data input to buffer memory 1230. As such, multiplexor 1220 truncates the prepended routing header off each ATM cell which it supplies to buffer memory 1230. By virtue of storing the memory address for the current incoming cell within chain pointers buffer 1237, a corresponding logical queue is extended within cell buffer 1230 to encompass this latest cell. Output counter 1250 appropriately increments the address supplied to multiplexor 1220 to sequence through all thirty-two separate input lines 565. It should be noted that rather than requiring each output module to truncate the entire prepended routing header from each incoming cell, as described above, each cross-point switching plane could include appropriate circuitry to drop the physical output module address (L') from the prepended routing header of each cell propagating therethrough. In this case, each output module would merely truncate the remainder of the prepended routing header, i.e. the output port address (H) from each cell it receives. Once each cross-point plane utilizes the physical output module address of an incoming cell in setting its future configuration, this portion of the routing header is no longer needed. However, embedding a truncation function within each cross-point plane disadvantageously complicates its circuitry.

Once all thirty-two input lines 565 have been serviced, the output module successively reads the ATM cell located at the head of each logical queue and supplies that cell over leads 1235 to an input of demultiplexor 1240. The demultiplexor, in turn, routes that cell, via leads 1245 and an associated one of parallel/serial converters 1290, to the corresponding output port and specifically an output line associated therewith within output lines $275_1$. Parallel/serial converters 1290 contain individual parallel/serial converters $1290_1, 1290_2, \ldots, 1290_{32}$ which convert the ATM cell applied in byte-parallel form to its input, via leads 1245, into bit-serial form for application to output lines $275_1$. The specific memory address from which an ATM cell is to be read is provided by the buffer memory read address (RA) registers 1265 which are formed of individual read address registers $1265_1, \ldots, 1265_{32}$. The specific register that supplies a read address to buffer memory 1230 for a logical queue is determined by output port decoder 1260. This decoder simply decodes the count provided over leads 1255 by output counter 1250 and generates a corresponding one of 32 separate select signals, via leads 1263 collectively formed of corresponding leads $1263_1, \ldots, 1263_{32}$, to read address registers 1265. The selected register applies its contents, via leads 1267, to the read address inputs of buffer memory 1230. Inasmuch as this memory address, once read, is now available to store data, this address is also stored within idle address buffer 1280 as the next idle memory address. Thereafter, address chain pointers buffer 1237 supplies, via leads 1239, the address of the next successive location in this logical queue. This address is then over-written into the selected buffer memory read address register to point to the memory location now currently associated with the head of this logical queue. Output counter 1250 appropriately increments the address supplied to demultiplexor 1240 to sequence through all thirty-two separate input lines 565. For any complete memory read cycle, output module $270_1$ begins reading the first logical queue and sequentially proceeds to the $32^{nd}$ such queue. This cycle repeats, starting with the first logical queue, only after a complete memory write cycle involving all 32 logical queues has occurred. Leads 1293 carry control signals from control circuitry (specifically switch control module 290) to control route decoder 1275 and output port decoder 1260, as appropriate.

In order to implement ATM cell switching at a rate faster than the STS-3c rate, the circuitry in output module $270_1$ must be slightly modified from that shown. Specifically, route decoder 1275 must be configured to ignore a specific number of the least significant bits of the output port address ("H") portion of the routing header. In addition, the output port decoder must be configured to ignore a specific number of the least significant bits of the count generated by output counter 1250. These modifications will effectively use common read and write address pointers for a group of successive input and output lines of the output module, thereby forming a single logical queue for these output ports. For example, if the least two significant bits of the output port address and the count were ignored, then this will form a single logical queue for every four output ports. If the least four significant bits of these two values were ignored, then this will form a single logical queue for every sixteen output ports, and so on for other number of bits. Through lines 1293, switch control module 290 (see FIG. 2), which manages the operation and administration of the entire switch, dynamically specifies the resolution at which route decoder 1275 and output port decoder 1260 operate, for various groups of output ports as the need arises.

Illustrative circuitry that can be used to form output module $270_1$ can be readily constructed by those skilled in the art by suitably modifying the shared buffer memory switch circuit described in H. Kuwahara et al, "A Shared Buffer Memory Switch for an ATM Exchange", *International Conference on Communications—ICC'89 Boston*, 1989, pages 4.4.1–4.4.5. These modifications essentially entail removing the header conversion unit present at each input to this shared buffer memory switch circuit and employing the output port destination address ("H") portion of the routing header in each incoming ATM cell to control the route decoder used in this memory switch circuit.

5. Contention resolution unit

As discussed above, contention resolution unit 510 determines whether any two (or more) ATM cells currently situated at the head of the queues within all the input modules are contending for the same output module. If so, the contention resolution unit determines, based upon: (a) the numerical top-down value of the input port on which that cell arrived, (b) the relative priority of all the HOQ cells and (c) fairness principles, the particular ATM cells that are situated at the HOQ positions which are to be currently and simultaneously routed from all the input modules, through the cross-point planes, to all the output modules. As noted, contention resolution unit 510 resolves contention at "m" times the STS-3c cell period, i.e. a complete arbitration cycle involving HOQ cells occurring at all the input modules, is completely performed in 2.83/m μsec.

To fully understand how contention resolution unit 510 operates, the discussion will first describe this circuit in terms of a functional block diagram (FIG. 13) and an accompanying register diagram (FIG. 14) followed by a discussion of two block diagrams (FIGS. 15 and 16) that separately depict a preferred embodiment of this unit as it would be typically implemented in practice using very large scale integrated circuits and a single illustrative contention resolution circuit used in this implementation.

In general, contention is determined for any incoming ATM cell situated at the HOQ by comparing the physical output module address (L') in its prepended routing header with same address for every other ATM cell situated at the HOQ. If two (or more) cells have the same physical output module address, contention occurs and is resolved according to the relative numerical top-down locations of the specific input ports for these cells as modified by priority and fairness considerations.

Figure 13:
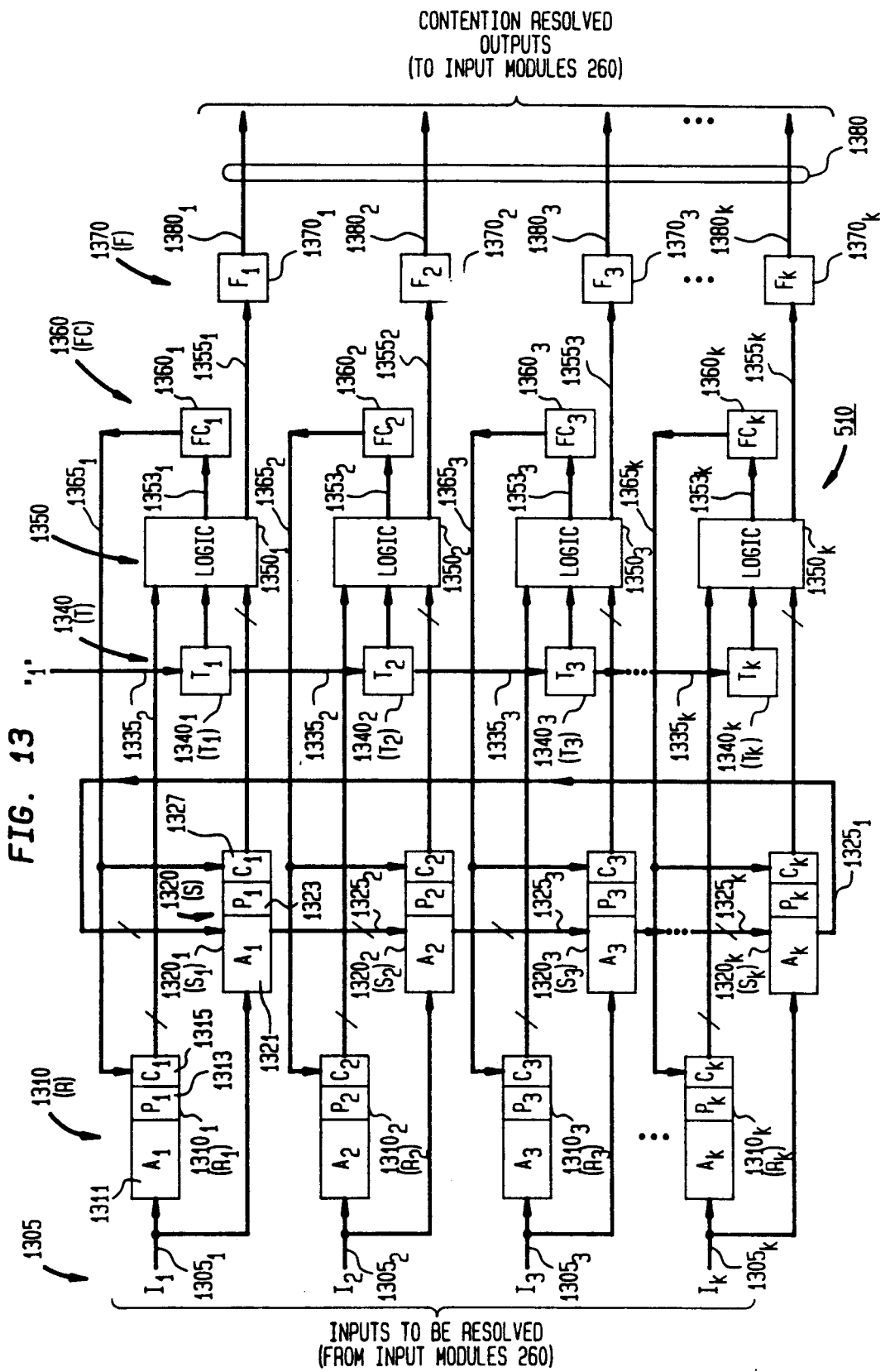
FIG. 13 is an overall high level functional block diagram of contention resolution unit 510 shown in FIG. 5.

Specifically, as shown in FIG. 13, contention resolution unit 510 contains five basic groups of registers: R registers 1310 formed of identical multi-bit registers $1310_1$ ($R_1$), $1310_2$ ($R_2$), $1310_3$ ($R_3$), ..., $1310_k$ ($Rk$); S registers 1320 formed of identical multi-bit registers $1320_1$ ($S_1$), $1320_2$ ($S_2$), $1320_3$ ($S_3$), ..., $1320_k$ ($S_k$); T registers 1340 formed of identical one-bit registers $1340_1$ ($T_1$), $1340_2$ ($T_2$), $1340_3$ ($T_3$), ..., $1340_k$ ($T_k$); FC registers 1360 formed of identical one-bit registers $1360_1$ ($FC_1$), $1360_2$ ($FC_2$), ... $1360_3$ ($FC_3$), ..., $1360_k$ ($FC_k$); and F registers 1370 formed of identical one-bit registers $1370_1$ ($F_1$), $1370_2$ ($F_2$), $1370_3$ ($F_3$), ..., $1370_k$ ($F_k$) The F registers serve as output flags. All the R registers 1310 and the S registers 1320 are identical in size. The contention resolution unit also contains logic units $1350_1$, $1350_2$, $1350_3$, ..., $1350_k$, which collectively form logic units 1350, which are each formed of simple combinatorial logic. Given the following description, the specific circuitry that can be used to implement each logic unit would be readily apparent to anyone skilled in the art.

As previously discussed, each input ($I_1$, $I_2$, $I_3$, $I_k$) to the contention resolution unit originates with a different corresponding input module and receives, in bit-serial form, during each staggered time interval $T_c$ (see FIG. 6), the output module address and priority value for the ATM cell that is then located at the head of its internal queue. At the end of a complete arbitration cycle, i.e. an STS-3c cell period shown as $T_s$ in FIG. 6, the contents of F registers (flags) 1370, shown in FIG. 13, indicate the winning input modules and are provided over leads 1380, specifically containing leads $1380_1$, $1380_2$, $1380_3$, ..., $1380_k$, back to the corresponding input modules. A zero in any register within F registers 1370 indicates that its corresponding contending input module has won arbitration against another input module(s) for the same output module. For example, if the contents of registers $1370_1$ and $1370_3$ are both "0", the first and third input modules have won arbitration and, as a result, will supply the entire ATM cells at the head of their internal queues onward to the cross-point planes for routing therethrough during the current staggered time interval, $T_c$, to appropriate output modules. Conversely, a "1" in any register within F registers 1370 indicates that the corresponding input module has lost contention for an output module to another input module. The circuitry within the contention resolution unit is identical for each input line.

To enhance reader understanding of how contention is resolved, the following explanation will proceed in three stages: first, by describing the operation of basic top-down contention resolution, involving essentially the R, S and T registers; second, modifying this operation by adding fairness, involving the FC registers and C fields; and third by further modifying the operation by adding priority, involving the P fields.

First, basic top-down contention resolution operates in the following manner. At the start of a complete arbitration cycle, various registers are initialized. Specifically, all the T and F registers 1340 and 1370 are cleared to zero. The purpose of the T registers will shortly become clear. In addition, during initialization, input information is loaded into all R and S registers 1310 and 1320. For example, input $I_1$, shown in FIG. 13, receives the output module address and priority value for an ATM cell at the head of the queue in the first input module. This information is simultaneously routed in serial form into registers $1310_1$ ($R_1$) and $1320_1$ ($S_1$), with the physical output module address stored in the address (A) fields, specifically address field 1311 ($A_1$) in register $1310_1$ and address field 1321 in register $1320_1$, and the accompanying priority value stored in the priority (P) fields, specifically priority field 1313 ($P_1$) in register $1310_1$ and priority field 1323 in register $1320_1$ Similarly, address and priority information is serially shifted into each of the other R and S registers 1310 and 1320 from corresponding inputs $I_2$, ..., $I_k$ at the start of arbitration. If an input module does not currently contain an active ATM cell at the head of it queue, then "idle" cell information is shifted into the corresponding R and S registers within unit 510 during the current staggered time interval. The letter designations and accompanying subscripts used within R, S and T registers 1310, 1320 and 1340, e.g. $A_1$, $P_1$, $C_1$, identify the specific contents of each of these registers at a given time, specifically as shown in FIG. 13 after all the incoming output module address and priority information for all the inputs has been shifted into the registers.

Once all the R and S registers 1310 and 1320 have been filled with incoming address and priority information, the address and priority data stored in each individual R register is successively compared, through logic units 1350, with the address and priority data stored in every S register. This is effectuated by parallel connections $1325_1$, $1325_2$, $1325_3$, ... $1325_k$ which collectively interconnect S registers 1320 in a vertical ring configuration. The parallel outputs of each R register $1310_1$, $1310_2$, $1310_3$, ..., $1310_k$ and a respective S register $1320_1$, $1320_2$, $1320_3$, ..., $1320_k$ are connected to a respective logic unit $1350_1$, $1350_2$, $1350_3$, ..., $1350_k$. In response, each logic unit determines whether the output module addresses (A) in each corresponding pair of R and S registers match thereby signifying output contention. If the addresses do not match, there is no contention in which case the value in the corresponding F register is not changed, i.e. it remains at zero. After each compare operation, the contents of all the S registers 1320 are circularly shifted vertically ($S_{(i)}$ to $S_{(i+1) \bmod 256}$) in parallel by one register position. Thereafter, the current contents of each pair of R and S registers are again simultaneously compared by all the logic units and so on until the contents of each R register 1310 have been compared to the contents of every S register 1320 for a total of 256 ("k") shift and compare operations. Once these operations have concluded, the outputs of F registers 1360 serve as flags to indicate which corresponding input lines have won arbitration: contending input line "i" has won arbitration if the value of its associated F register, i.e. F(i), is "0", or has lost arbitration to a different input line if the contents of F(i) are "1". However, comparing the output module address portions (A) merely indicates whether contention occurs but provides no methodology for resolving it, i.e. indicating the conditions under which register F(i) is set to one.

To initially resolve contention, a top-down input line ordering scheme can first be established. This ordering is effectuated through T registers 1340. These one-bit registers are vertically connected through leads $1335_1$, $1335_2$, $1335_3$, ... $1335_k$ as a serial shift register. A "1" bit is shifted into register $1350_1$ ($T_1$); the output of register $1350_k$ ($T_k$) is dropped. The output of each T register is also fed as an input to each logic unit along with corresponding outputs of the corresponding R and S registers. After each compare operation involving the R and S registers occurs, all the T registers are also shifted vertically by one register position. This, in turn, causes the T registers starting with register $1340_1$ to increasingly and incrementally fill with "1" values as successively shift operations occur until, after 256 such shift operations, T registers 1340 are completely purged of zeroes. The contents of each T register influence the comparison undertaken by each corresponding logic unit. Specifically, if, for any input line "i", the contents of register T(i) are "1", then the value of register F(i) is not changed from its prior value. A value of "1" in register T(i) indicates that the present input line contending with input line "i" has a lower order than the input line "i", so that input line "i" does not lose against the present line. However, if the value of register T(i) is zero and there is contention, then input line "i" loses; in this case, logic unit $1350_i$ then sets the contents of register F(i) to "1".

Unfortunately, if contention were merely resolved on the basis of the contents of the T registers, i.e. solely on a top-down ordering scheme, this would disadvantageously yield a very inflexible ordering scheme heavily biased towards the high order lines (i.e. lines with low values of "i") at the expense of low order lines. Thus, high order contending lines would always win access to an output module over low order lines that are contending for the same module. As such, this would effectively prevent, i.e. block, ATM cells that appear on low order input lines from gaining entry into the cross-point switching planes until after the ATM cells on all the higher order lines were routed into these planes, thereby unfairly skewing the response of the switch to the high order input lines. To prevent this unfairness, each one of the R and S registers 1310 and 1320 also contains a one-bit field, C. Specifically, R register 1310 contains C field 1315; S register 1320 contains C field 1327 and so on. In addition, the output of logic units 1350 also feed FC registers 1360, specifically logic units $1350_1$, $1350_2$, $1350_3$, ..., $1350_k$ respectively feed FC registers $1360_1$, $1360_2$, $1360_3$, ..., $1360_k$.

Now, with the addition of the FC registers and C fields, operation can proceed in the following fashion to use fairness principles in resolving contention. At the start of an arbitration cycle, initialization proceeds as described above, i.e. each of the R and S registers 1310 and 1320 is loaded with the address and priority data from a corresponding incoming line; the T and F registers 1340 and 1370 are both cleared to zero. However, in addition to these operations, all of the FC registers 1360 are cleared to zero if switch startup is occurring. If startup is not occurring, then each of the FC registers 1360, i.e. register FC(i) for all i, retains its prior contents from the most recent arbitration cycle and copies its contents into the C fields in corresponding registers within R and S registers 1310 and 1320, i.e. into fields C(i) in both registers R(i) and S(i) for all i. For example, register $1360_1$ ($FC_1$) copies its contents into $C_1$ fields 1315 and 1327 in respective R and S registers $1310_1$ and $1320_1$, and so on for all other individual FC registers $1360_2$, $1360_3$, ..., $1360_k$. If no active ATM cell appears on a given input line, i.e. no request is occurring on input line i in lines 1305, then register T(i) is set to one, register FC(i) is set to zero and address field A(i) can take on any value. Once this entire initialization is completed, a series of "k" illustratively 256) shift and compare operations is undertaken as described above, with the contents of register fields C(i) in S registers 1320 being simultaneously shifted in unison with and in the same circular manner as the address fields A(i) in these registers. The contents of the T(i) registers are also incrementally shifted one position as described above until the entire T register has been filled with "1's". The contents of the C(i) fields in both the R(i) and S(i) registers are also compared during each such comparison. The contents of these C(i) fields are used to impart a higher ranking to input line i that is presenting an ATM cell that lost arbitration in the most recent arbitration cycle over an ATM cell that is contending for the same output module and is being presented for the first time on another input line. As such, if the address fields A(i) for registers R(i) and S(i) are unequal, the associated input lines are not contending for the same output module. Accordingly, no action is taken and the output value in registers F(i) and FC(i) are unchanged.

If, however, contention occurs involving a request on input line (i) for a particular output module, this contention could now be resolved in favor of a request for that output module that lost arbitration during the most recent arbitration cycle and second, if no such prior request exists, then by a top-down ordering based upon the contents of register T(i). Specifically, if the address fields A(i) in both registers R(i) and S(i) are equal, contention is occurring for a common output module. In this case, two conditions can occur as the result of any shift and comparison operation: where there is no prior request for a particular output module, i.e. the contending requests are both being presented for the first time in which case the values of the C(i) fields in registers R(i) and S(i) are equal, or where there is a prior request for that module, i.e. where the value of the C(i) field in register R(i) is one and the value of the field C(i) in register S(i) is zero. In the event there is no prior request, then the contents of register T(i) are used to provide top-down ordering of the two contending requests that are being presented for the first time. The specific fairness based methodology is embodied in steps (f)-(k) in Table 1 below. In particular, if the contents of register T(i) are one for input line "i", as specified in step (g), then no change is made to the values in the F or FC registers. Alternatively if the contents of register T(i) are zero, as signified in step (h), the contents of registers F(i) and FC(i) are both set to one signifying that input line "i" has lost arbitration. If there is a prior request, contention can be resolved in favor of the input line that is presenting this request. Specifically, if the contents of field C(i) in register R(i) equals one and field C(i) in register S(i) equals zero, as occurs in step (i), then no change is made in the contents of register F(i). In this case, the prior request on input line "i" wins contention as against current requests presented for the first time on other input lines. Now, if as the result of any shift and comparison operation, the value of field C(i) in register R(i) equals zero and the value of field C(i) in register S(i) equals one, as occurs in step (j), then again a prior request, though presented over a different input line, for output module (i) exists and wins contention against a current request presented on input line i. In this case, the contents of register F(i) would be set to one, the contents of registers FC(i) would be copied into field C in register R(i) and logic unit $1350_i$ would be disabled for the remainder of the arbitration cycle. Once all the shift and compare operations have been completed for the current arbitration cycle, as stated in step (k) in Table 1 below, if the value of register F(i) equals zero, then the contents of register FC(i) are also set to zero.

Fairness aids in properly resolving contention. However, in the absence of prior requests, the line order (physical ranking) in which contention is resolved is itself fixed with a top to bottom ranking. As such, the average waiting time for ATM cells on low order lines will still be longer than for higher order lines, even if the ATM cells themselves on the low order lines carry a higher priority value than cells on the high order lines. One method for correcting this is to periodically invert the physical ranking by simply reversing the direction in which T registers 1340 fill with "1's", i.e. from bottom to top rather than top to bottom as shown in FIG. 13. Other methods would involve assigning the line order at random to contending lines during initialization or "time stamp" each of these lines and assign access based upon the age of requests being presented by an associated input module connected to each "stamped" line. However, each of these methods unnecessarily complicates the circuitry of the contention resolution unit 510.

However, in the inventive switch, ATM cell priority can be easily handled by incorporating within each of the R and S registers 1310 and 1320, respectively, a three-bit field, P as shown in FIG. 13, to store the priority value associated with each ATM cell situated at the head of the queue of a corresponding input module. For example, registers $1310_1$ ($R_1$) and $1320_1$ ($S_1$) contain P fields 1313 and 1323, respectively, and so on for each of the other R and S registers. During initialization, as discussed above, each of the R and S registers 1310 and 1320 is loaded with both the address and priority data from a corresponding incoming line, and the T and F registers 1340 and 1370 are cleared to zero. Also, all the T and F registers 1340 and 1370 are cleared to zero. Now, also during initialization, if either the values of fields A(i) or P(i) for all input lines i are different from their corresponding values that occurred during the most recent arbitration cycle, the contents of the corresponding FC(i) register are also cleared to zero; otherwise, FC(i) retains the value it held at the conclusion of this prior cycle. Thereafter, as described above, the contents of register FC(i), for all i, are copied into the C(i) fields in registers R(i) and S(i). Alternatively, if switch startup is occurring, the contents of all the FC registers 1360 are cleared to zero. If no active ATM cell appears on a given input line, i.e. no request is occurring on input line i in lines 1305, then register T(i) is set to one, register FC(i) is set to zero, address field A(i) can take on any value and priority field P(i) is set to the lowest priority value. Once this entire initialization process is completed, a series of "k" (illustratively 256) shift and compare operations is undertaken as described above, with the contents of register fields C(i) and P(i) in S registers 1320 being simultaneously shifted in unison with and in the same circular manner as the address fields A(i) in these registers. The contents of the T(i) registers are also incrementally shifted one position as described above until the entire T register has been filled with "1's".

Figure 14:
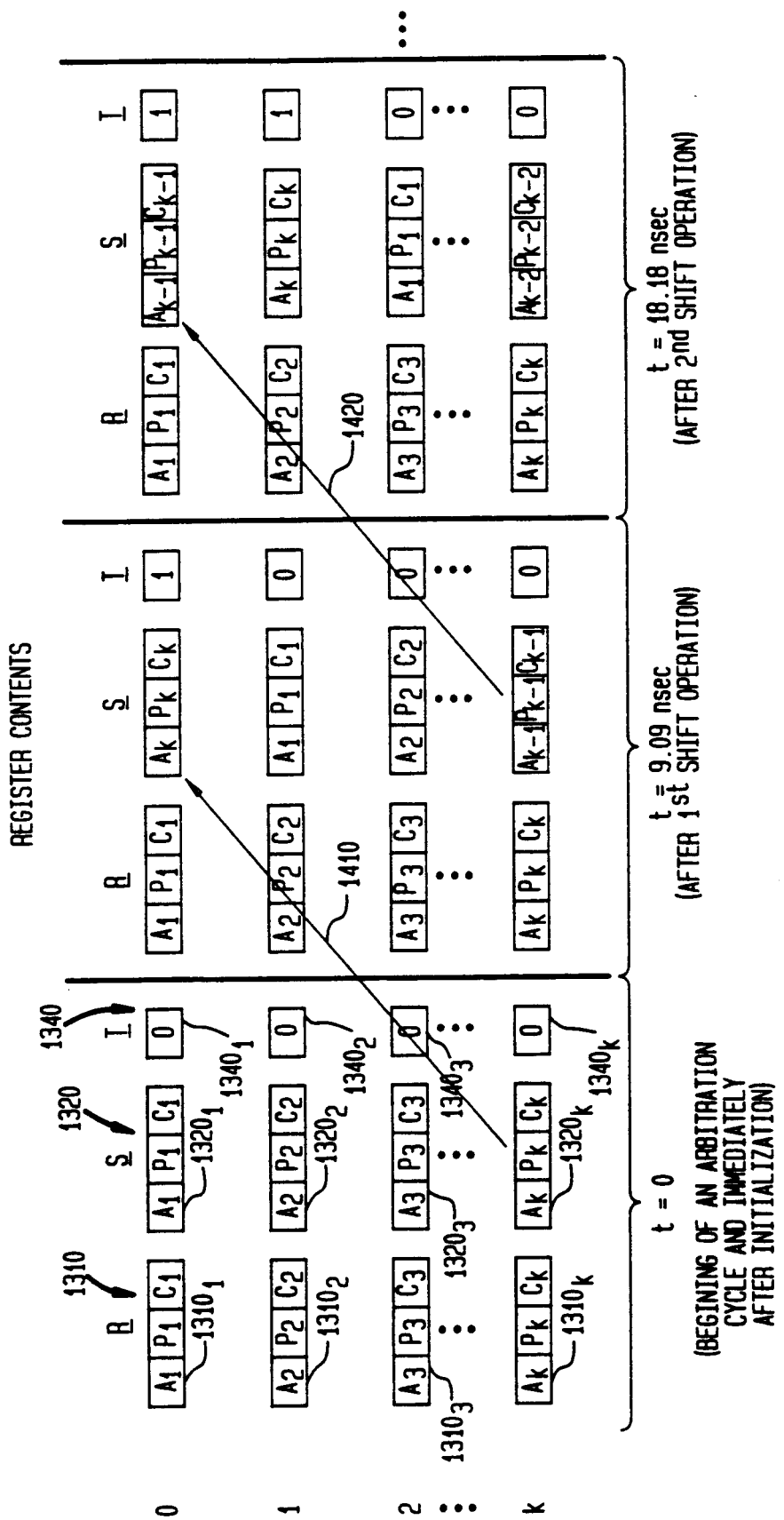
FIG. 14 depicts a register diagram showing the contents of registers R, S and T shown in FIG. 13 at the beginning of an arbitration cycle and after the first and second shift cycles.

In this regard, FIG. 14 specifically shows the contents of R, S and T registers 1310, 1320 and 1340, respectively, at the beginning of an arbitration cycle, i.e. immediately after initialization has occurred; and after the first and second shift operations during that cycle. As indicated by arrows 1410 and 1420, S registers 1320 are circularly shifted in a vertical direction with the contents of register $S_k$ [($A_k$, $P_k$, $C_k$) and ($A_{k-1}$, $P_{k-1}$, $C_{k-1}$)] being shifted into register $S_1$ during the two successive shift cycles (t=9.09 and 18.18 nsec) following initialization (where t is illustratively taken as zero). T registers 1340 are merely shifted downward with a "1" being applied as the shift input to register 1340 during each successive shift operation. As can be seen, the T registers incrementally fill from the top down with "1's" during successive shift operations.

During each compare operation, the value of the priority field P(i) in both registers R(i) and S(i) are compared within logic unit $1350_i$, for all i. In the event contention occurs, i.e. the contents of address fields A(i) in registers R(i) and S(i) are equal, the difference in priority values between the contending input lines determines which specific input line wins contention. The specific algorithm which the inventive switch uses to resolve contention including both fairness and priority considerations is shown in Table 1 below.

TABLE 1

| ALGORITHM IMPLEMENTED BY LOGIC UNIT $1350_i$ | |
|---|---|
| (a) | If $R_A(i) \neq S_A(i)$, do nothing; |
| (b) | If $R_A(i) = S_A(i)$ |
| (c) | then: If $R_P(i) > S_P(i)$, do nothing; |
| (d) | else: If $R_P(i) < S_P(i)$, set F(i) = 1 and FC(i) = $R_C(i)$, and disable logic unit $1350_i$ for the rest of the current arbitration cycle; |
| (e) | else: If $R_P(i) = S_P(i)$ |
| (f) | then: If $R_C(i) = S_C(i)$ |
| (g) | then: If T(i) = 1, do nothing; |
| (h) | else: If T(i) = 0, set F(i) = 1 and FC(i) = 1; |
| (i) | If ($R_C(i) = 1$ and $S_C(i) = 0$), · |

TABLE 1-continued

ALGORITHM IMPLEMENTED BY LOGIC UNIT 1350$_i$ (j)    do nothing:
If ($R_C(i) = 0$ and $S_C(i) = 1$):
set $F(i) = 1$ and $FC(i) = R_C(i)$,
and disable logic unit 1350$_i$ for
the rest of the current arbitration
cycle;

(k)    when all the shift and compare operations are
completed, if $F(i) = 0$, set $FC(i)$ equal to 0.

For brevity, individual terms in this algorithm, such as $R_A(i)$, specify the contents of a specific register or a field in that register, e.g. the contents of field A in register R(i).

With respect to the algorithm shown in Table 1 above, if the contents of address fields A(i) in registers R(i) and S(i) are unequal, as stated in step (a) above, no contention exists and no changes are made to the contents of the F(i) and FC(i) registers. However, if an address match exists, as indicated by line (b), then contention occurs and is resolved through step (c) or step (d), or steps (e)–(j). Specifically, if, on the other hand, the present request being presented on line i has a higher ATM cell priority value than another ATM cell request for the same output module, then, as indicated in step (c), the request on line i wins contention. If, on the other hand, the incoming request on line i has a lower cell priority, as indicated in step (d), this request loses contention against another request(s) for the same output module but being presented on a different input line(s). In this instance, the contents of register F(i) would be set to one, the contents of registers FC(i) would be copied into field C in register R(i) and logic unit 1350$_i$ would be disabled for the remainder of the arbitration cycle. Disabling the logic unit prevents subsequent requests at a given priority value during the current arbitration cycle from gaining access prior to other such subsequent requests. Now, alternatively, if the priority values associated with the two contending requests are equal, as indicated in step (e), then priority is resolved for each input line i simply using fairness based upon prior requests, i.e. using the contents of the C(i) fields in registers R(i) and S(i) and top down ordering using the contents of T registers 1340, for all i and in the manner described above for steps (f)–(j). Once all the shift and compare operations have been completed for the current arbitration cycle, then, as stated in step (k) in Table 1, if the value of register F(i) equals zero, the contents of register FC(i) are also set to zero. At the end of the complete arbitration cycle, F registers 1370 signify which input lines have won arbitration. The contents of the F registers are routed, via leads 1380 formed of individual leads 1380$_1$, 1380$_2$, 1380$_3$, ..., 1380$_k$, back to each corresponding input module to instruct that module whether to route the ATM cell situated at the head of its internal queue onward to the cross-point switching planes or not during the present staggered time interval.

Figure 15:
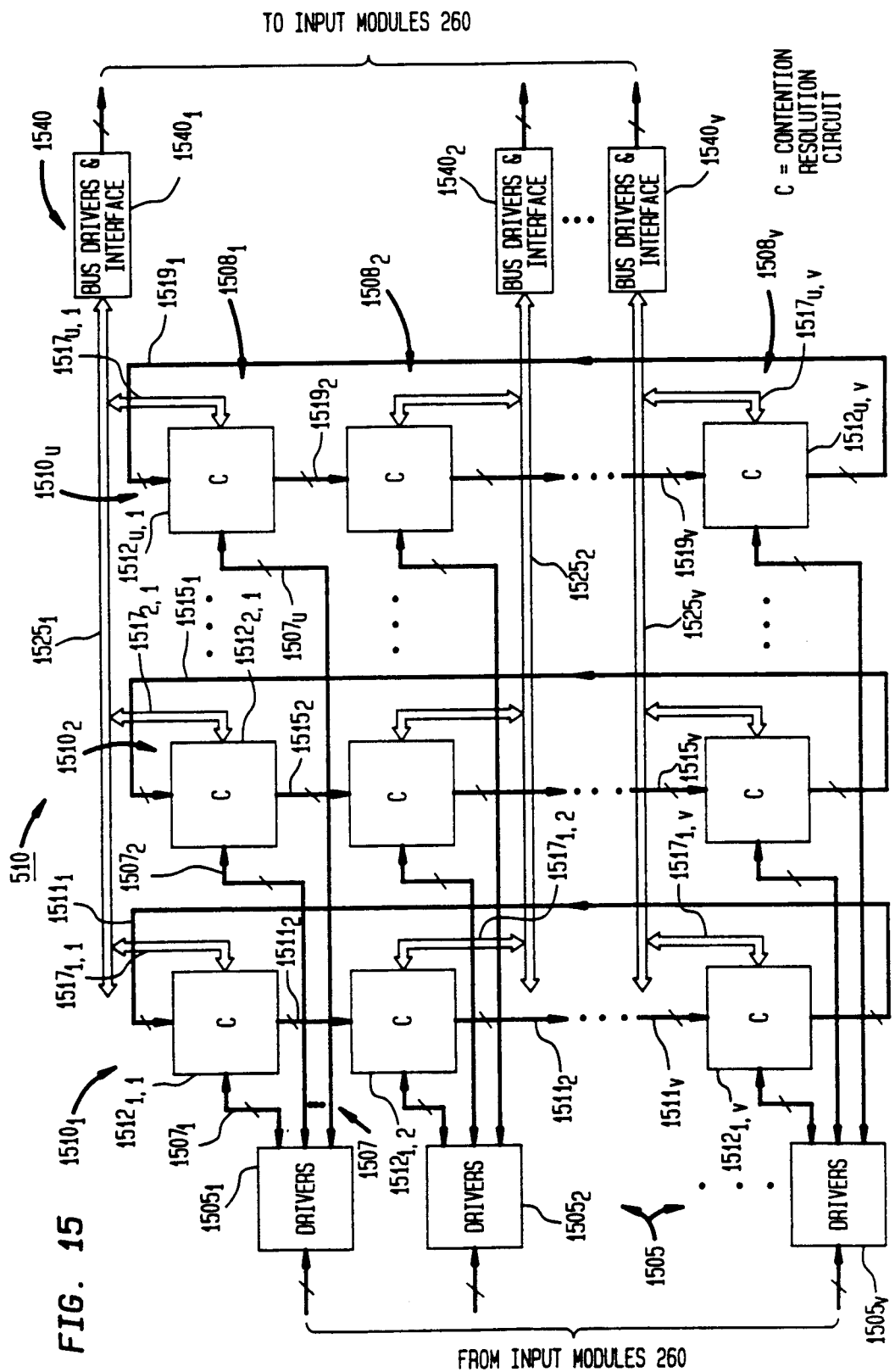
FIG. 15 is a high level block diagram of a preferred embodiment of contention resolution unit 510 as it would be typically implemented in practice.

With this functional description in mind, FIG. 15 is a high level block diagram of preferred embodiment of contention resolution unit 510 as it would typically be implemented in practice using very large scale integrated circuits.

As shown in FIG. 15, the contention resolution unit is formed of a matrix of identical large scale integrated circuits, typically containing CMOS (complementary metal oxide semiconductor) type circuitry. Each circuit, identified by "C", performs contention resolution on a pre-defined number of input lines and provides its results in parallel to appropriate bus lines. The matrix contains "u" successive columns, e.g. 1510$_1$ and 1510$_u$, of "v" individual contention resolution circuits, e.g. individual contention resolution circuits 1512$_{1,1}$, 1512$_{1,2}$, ..., 1512$_{1,v}$ in column 1510$_1$ and circuits 1512$_{u,1}$, ..., 1512$_{u,v}$ in column 1510$_u$. Incoming serial data (address and priority information) from each input module is applied to drivers 1505 formed of individual driver circuits 1505$_1$, 1505$_2$, ..., 1505$_v$. Each driver circuit contains a number of identical drivers, with one driver for each contention resolution circuit in an associated row in the matrix, such as illustratively row 1508$_1$. The drivers merely amplify the incoming serial bit stream supplied by each input module to a drive level appropriate to match the requirements of each contention resolution circuit. Driver circuits 1505$_1$, 1505$_2$, ..., 1505$_v$ feed serial bit streams to the individual contention resolution circuits in rows 1508$_1$, 1508$_2$, ..., 1508$_v$, respectively. Specifically, driver circuit 1505$_1$ feeds serial bit streams from corresponding input lines over leads 1507 formed of individual paralleled leads 1507$_1$, 1507$_2$, ..., 1507$_u$ to the serial inputs of contention resolution circuits 1512$_{1,1}$, 1512$_{1,2}$, ..., 1512$_{u,1}$ in row 1508$_1$. Each of these paralleled input leads is itself formed of a group of serial leads with each such lead routing a different serial bit stream to a corresponding different single serial input to a common contention resolution circuit. The number of drivers in each driver circuit and the number of driver circuits, v, are dictated by the number of different input lines that are serviced within each identical contention resolution circuit, e.g. circuit 1512$_{1,1}$. The individual contention resolution circuits situated in each column of the matrix, such as in columns 1510$_1$, 1510$_2$, ..., 1510$_u$, are connected in a vertical ring configuration to permit the output port address and priority information for each input line serviced in that column to be compared to the output port address and priority information for every other input line serviced in that column through a complete circular shift operation, as described above. In this regard, contention resolution circuits 1512$_{1,1}$, 1512$_{1,2}$, ..., 1512$_{1,v}$ in column 1510$_1$ are interconnected by parallel paths 1511$_1$, 1511$_2$, 1511$_v$. Similarly, the contention resolution circuits in column 1510$_2$ and 1510$_u$ are respectively interconnected by parallel paths 1515$_1$, 1515$_2$, ..., 1515$_v$ and 1519$_1$, 1519$_2$, 1519$_v$. The outputs of every contention resolution circuit in each row are connected through a corresponding bus to a horizontal interconnect bus to implement wired OR connections. Specifically, contention resolution circuits 1512$_{1,1}$, 1512$_{1,2}$, ..., 1512$_{u,1}$ in row 1508$_1$ are connected through corresponding busses 1517$_{1,1}$, 1517$_{2,1}$, ..., 1517$_{u,1}$ to horizontal interconnect bus 1525$_1$. Identical connections, specifically through busses 1517$_{1,2}$, 1517$_{1,v}$, 1517$_{u,v}$, are made from the individual contention resolution circuits in rows 1508$_2$, ..., 1508$_v$ to respective passive horizontal interconnect busses 1525$_2$, ..., 1525$_v$. The horizontal interconnect busses feed appropriate bus drivers and interface circuits which, in turn, synchronize the results applied thereto and provide the signals on each of these busses at an appropriate drive level and on a synchronized basis back to the corresponding input modules. Busses 1525$_1$, 1525$_2$, ..., 1525$_v$ feed bus drivers and interface circuits 1540$_1$, 1540$_2$, ..., 1540$_v$ which collectively form circuits 1540.

Thusfar, the discussion of contention resolution unit 510 has been limited to considering "k" separate, e.g. "256", comparisons in parallel and, as such, "k" separate input modules. This limit can be overcome by increasing the amount of parallelism occurring in unit 510, as appropriate. One such technique for doing so could involve dividing the registers shown in FIG. 13 into groups, simultaneously performing comparison operations on the register contents in each group and simultaneously shifting the contents of the each entire group of S and T registers to another such group. Appropriate initialization procedures, such as by setting or over-riding the initial contents of each T register, may need to be used in each logic unit in order to assure proper overall operation with such a technique.

Figure 16:
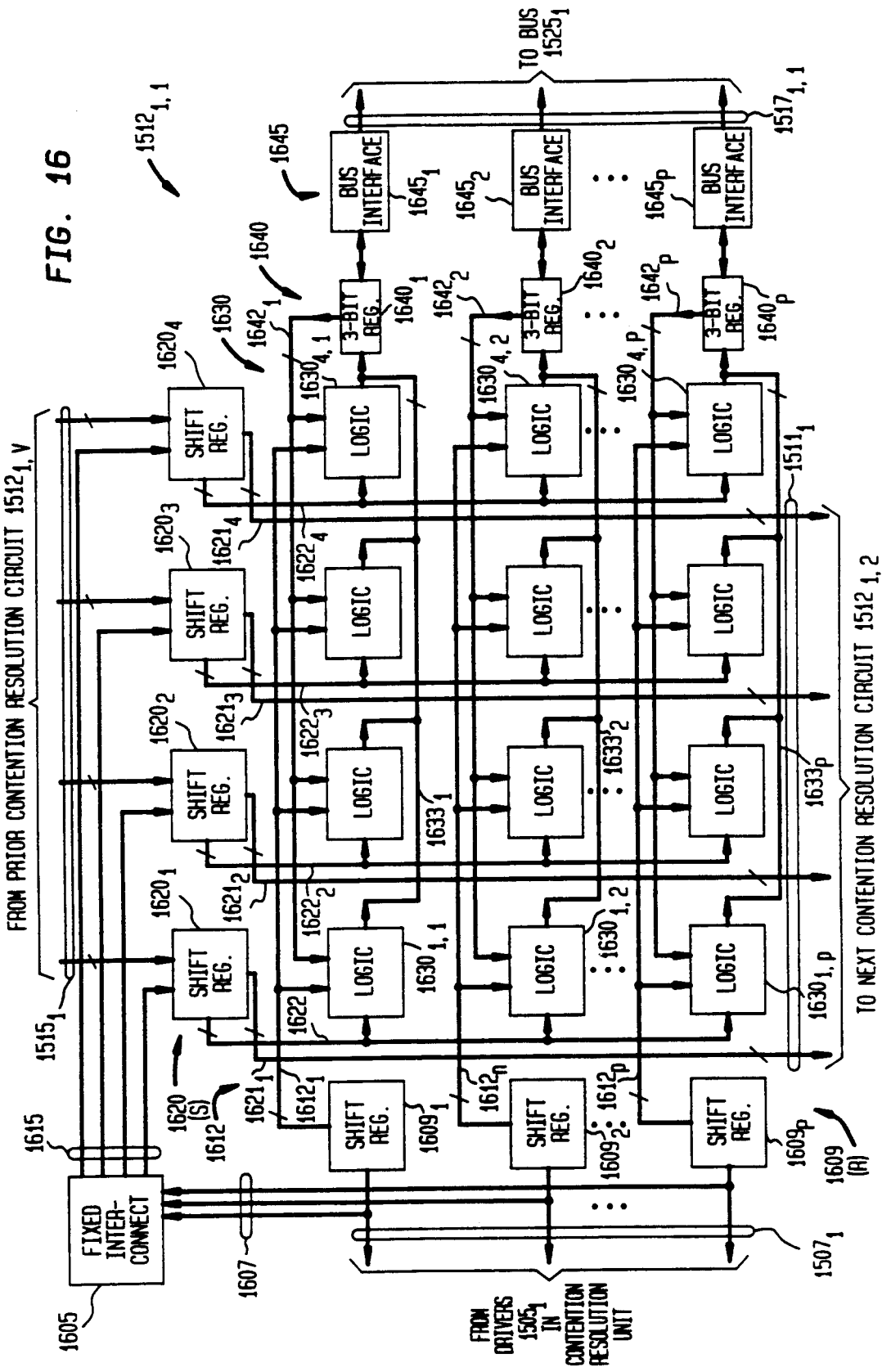
FIG. 16 is a block diagram of a typical contention resolution circuit, illustratively circuit $1512_{1,1}$, used within the implementation of the contention resolution unit 510 shown in FIG. 15.

FIG. 16 is a block diagram of a typical contention resolution circuit, illustratively circuit $1512_{1,1}$, used within the implementation of contention resolution unit 510 shown in FIG. 15. This circuit would typically be fabricated on a single integrated circuit chip using CMOS technology.

Circuit $1512_{1,1}$ is formed of an illustrative matrix of p-by-4 logic units 1630 which contains identical individual units $1630_{1,1}$, $1630_{1,2}$, ..., $1630_{1,p}$, $1630_{4,1}$, $1630_{4,2}$, ..., $1630_{4,p}$. Each of these logic units provides substantially the same functionality as each one of logic units 1350 shown in FIG. 13 and discussed in detail above. With the configuration shown in FIG. 16, contention resolution circuit $1512_{1,1}$ is able to perform 4-by-p comparisons of incoming address and priority information. This size is chosen based upon the capacity limitations of very large scale CMOS integrated circuits that can be currently produced. As integration density increases, the capacity of circuit $1512_{1,1}$ can be increased accordingly.

As shown, circuit $1512_{1,1}$ accommodates "p" input lines which collectively form input lines $1507_1$. Each input line carries a serial bit stream originating from a corresponding input module and provides a physical output module address (L') and accompanying priority information for an ATM cell situated at the head of the internal queue within that input module. During initialization, address and priority information is serially shifted over all the leads within leads $1507_1$ into R shift registers 1609 formed of individual shift registers $1609_1$, $1609_2$, ..., $1609_p$ These shift registers correspond to and perform the same function as R registers 1310 shown in FIG. 13 and discussed in detail above. Due to capacity limitations circuit $1512_{1,1}$ only contains four individual identical S registers 1620 formed of individual registers $1620_1$, $1620_2$, $1620_3$ and $1620_4$. Concurrent with the application of the incoming serial bit streams to R shift registers 1609, these bit streams are also applied, via leads 1607, to fixed interconnect 1605. This interconnect, illustratively implemented with a fusible link device or a once-programmed logic array, routes four particular bit streams within the "p" incoming streams to the serial inputs of the four S shift registers 1620. These four bit streams are selected based upon the physical location of circuit $1512_{1,1}$ within the matrix of contention resolution circuits that form contention resolution unit 510, as shown in FIG. 15. Inasmuch as circuit $1512_{1,1}$ itself is located in the upper left hand corner of the matrix, then fixed interconnect 1605, shown in FIG. 16, is configured to route the upper four bit streams on leads $1507_1$ to S registers 1620.

S registers 1620 shift their contents serially in a horizontal direction to accept incoming address and priority information and in parallel in a vertical direction to support the circular shift and compare operations set forth above. These registers accept incoming information in parallel, via leads $1515_1$, from a prior contention resolution circuit, here circuit $1512_{1,v}$ situated in a vertical ring configuration (see FIG. 15) and provide their output information again in parallel, via leads $1621_1$, $1621_2$, $1621_3$ and $1621_4$ which, as shown in FIG. 16, collectively form leads $1511_1$, to the next successive contention resolution circuit, here circuit $1512_{1,2}$ in that ring. For ease of implementation, each of S registers 1620 also includes an additional bit (not specifically shown) to implement a corresponding T register, as discussed above. The uppermost T register is not connected to contention resolution circuit $1512_{1,v}$ but rather is supplied with a fixed "1" value at its shift input.

The outputs of every individual one of R registers 1609, i.e. R(p) for all p, are routed in parallel over corresponding leads 1612, specifically leads $1612_1$, $1612_2$, $1612_p$, to a complete row of logic units 1630. Similarly, the outputs of every individual one of the four S registers 1620, are routed in parallel over corresponding leads $1622_1$, $1622_2$, $1622_3$ or $1622_4$, to a complete column of logic units 1630. Once initialization has been completed, each one of logic units 1630 compares the contents of one of R registers 1609 with the corresponding contents of one of the S registers and also utilizes the bit allocated to the T register situated within that S register. All the comparisons proceed in parallel. The results of the comparisons for each row are provided through a wired "OR" connection over corresponding parallel leads $1633_1$, $1633_2$, $1633_p$ to an input of corresponding three-bit output registers 1640 formed of individual registers $1640_1$, $1640_2$, $1640_p$. The output of registers $1640_1$, $1640_2$, ..., $1640_p$ are fed back to the logic units on each row over corresponding three-bit leads $1641_1$, $1641_2$, ..., $1641_p$ as the bits previously described above stored in the FC registers and C register fields for implementing fairness. The outputs of registers 1640 are also supplied to bus interfaces 1645 which contain separate interfaces $1645_1$, $1645_2$, ..., $1645_p$. Each of these interfaces coordinates and synchronizes the results of the outputs provided by all the logic units on a corresponding row in order to permit these results to be combined through a global wired-OR operation (on bus $1525_1$—see FIG. 15) and to reset the contents of the corresponding three bit output registers, in accordance with the algorithm specified in Table 1 and discussed in detail above. As shown in FIG. 16, the output of bus interfaces 1645 are applied to bus leads $1525_1$.

After logic units 1630 have simultaneously preformed a set of comparisons, the contents of the S registers are vertically shifted from one contention resolution circuit to the next and the comparisons occur again, and so on until a full set of comparisons has been made. Such a full set will involve a number, v, of vertical shifts equal to the number of circuits in each column of entire contention resolution unit 510 (see FIG. 15). After a full set of comparisons has been made, a single bit of information is communicated to each specific input module, from contention resolution unit 510 and specifically through bus drivers and interfaces 1540 and the wired-OR operations inherent in each of busses 1525, specifying whether that contending input module has won or lost arbitration.

As one can readily appreciate, the inventive contention resolution unit can be used in nearly any packet switch in which output port contention needs to be resolved. As such, the operation and implementation of the inventive contention resolution unit for such a switch does not depend, to any appreciable extent, on the specific switch type, e.g. cross-point, as long as that switch is one of a broad class of switches that require resolution of output port contention.

E. Fault Tolerant Operation

1. Redundant contention resolution

To assure that the inventive switch properly operates in the event contention resolution unit 510 fails, the inventive switch architecture shown in FIG. 5 can be readily modified to incorporate multiple contention resolution units, which operate in parallel, along with majority voting of their outputs. Inasmuch as the cost of a complete contention resolution unit is expected to represent an insignificant portion of the total cost of the entire switch, then adequately duplicating the contention resolution units and adding the necessary, and quite simple, duplicated logic to perform majority voting is likely to be quite an inexpensive approach to achieving an acceptable level of fault tolerant contention resolution.

Figure 17:
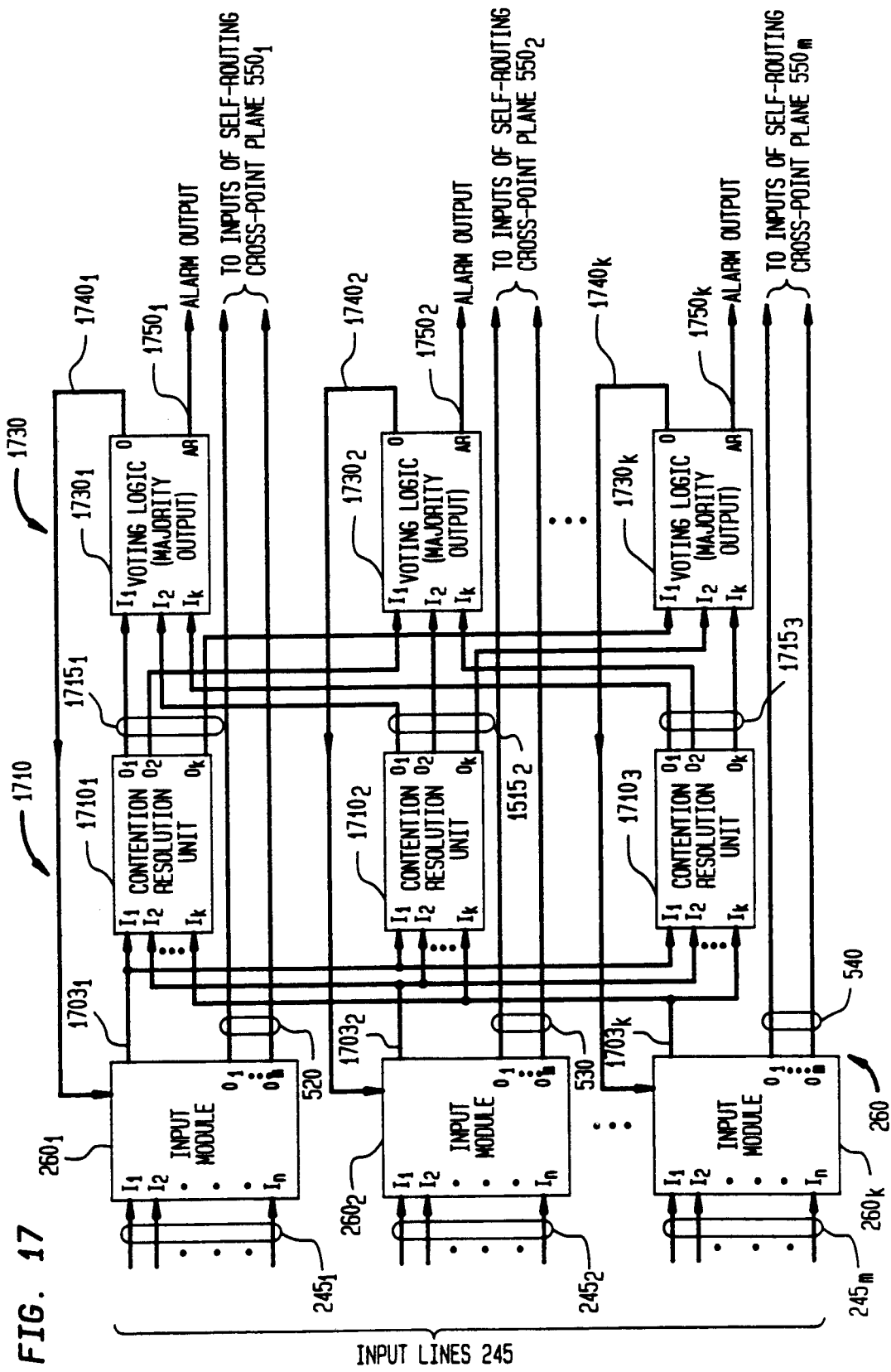
FIG. 17 is a high level block diagram which shows the use of redundant contention resolution and majority voting.

FIG. 17 shows a block diagram of a portion of the switch shown in FIG. 5 which has been modified to incorporate multiple contention resolution units.

As shown, input modules 260 provide requests for contention resolution not to just one contention resolution unit, as shown in FIG. 5, but rather, as depicted in FIG. 17, in parallel to multiple contention resolution units 1710 formed of three identical individual contention resolution units $1710_1$, $1710_2$, $1710_3$. In particular, each one of input modules $260_1$, $260_2$, ..., $260_k$ feeds a common input of all three contention resolution units. Input module $260_1$ feeds the first input, $I_1$, via lead $1703_1$, of all three contention resolution units. Input module $260_2$ feeds the second input, $I_2$, via lead $1703_2$, of all three contention resolution units, and so on with the last input module, i.e. module $260_k$, feeding the last, $I_k$, input of all three contention resolution units. The outputs of the three contention resolution units feed, via leads $1715_1$, $1715_2$ and $1715_3$, "k" separate identical voting logic circuits 1730. Each circuit, specifically circuits $1730_1$, $1730_2$, ..., $1730_k$, has three inputs $I_1$, $I_2$, $I_3$. The same output of each contention resolution circuit is connected to an input of a common voting circuit. The number of separate voting circuits equals the number of separate input modules. For example, the first outputs, $O_1$, of all three separate contention resolution units 1710 are connected to the inputs of the first voting circuit, i.e. circuit $1730_1$. Similarly, the second outputs, $O_2$, of all three separate contention resolution units are connected to the inputs of the second voting circuit, i.e. circuit $1730_2$, and so on with the last, i.e. $k^{th}$, output of all three separate contention resolution units being connected to the inputs of the $k^{th}$ voting circuit, i.e. circuit $1730_k$. Each voting circuit is implemented using well known logic to provide an output signal that equals the state of the majority (i.e. two or three out of three) of its three input signals. The output (O) provided by each voting circuit is fed back through one of leads 1740, specifically formed of leads $1740_1$, $1740_2$, $1740_k$, to an input of its corresponding input module, specifically modules $260_1$, $260_2$, ..., $260_k$ to indicate which of these modules has won arbitration in any one instance.

In addition, each of the voting logic circuits provides an alarm output (AR), via a corresponding lead, specifically leads $1750_1$, $1750_2$, ..., $1750_k$ for circuits $1730_1$, $1730_2$, ..., $1730_k$, to the switch control module to indicate a failure condition of that circuit. This permits the switch control module to appropriately notify an operator that a particular voting circuit has failed and request the operator to take appropriate corrective action to remedy the failure. In particular and as noted above, the switch control module, as part of its monitoring and maintenance functions, continually invokes a sequence of diagnostic tests, using known input signals, of various switch components at pre-defined periodic intervals, such as illustratively every few seconds in order to continually re-assess the "health" of the entire switch. During a diagnostic aimed at each voting circuit, that circuit would be supplied with pre-defined input signals. The circuit would be pre-programmed with the correct output value. A discrepancy between the actual output produced by that circuit and the pre-programmed value would be detected through logic internal to that voting circuit which, in turn, would apply a high level to the alarm output for that circuit.

As can now be appreciated, through the modification shown in FIG. 17, if a single contention resolution unit fails, the output provided by the voting logic to any input module will equal the outputs provided by the other two contention resolution units. This allows the switch fabric to effectively ignore the failed contention resolution unit as well as to permit that unit to be replaced without removing the switch from active service.

2. Fault recovery and switch operation resulting from a failure of a cross-point switching plane Switch control module 290 tests each individual cross-point plane situated within planes 550 located within switch fabric 250 by periodically executing appropriate diagnostic operations. Since a virtual connection is not established through a fixed path through any one cross-point plane, module 290 periodically instructs every input module to simultaneously insert a pre-defined diagnostic (test) ATM cell into all the individual cross-point planes. Based upon the arrival of these cells at proper output modules, switch control module 290 is then able to verify proper operation of each of the individual cross-point planes.

To perform these diagnostics, each input module maintains a well-known buffer, typically in read only memory (ROM) (well known and not specifically shown), of pre-defined diagnostic cells from which a particular cell is read as instructed by switch control module 290. These diagnostic cells are routed through specific cross-point connections so as to arrive at specific output modules and particular output ports thereon. An output module will then recognize an incoming diagnostic ATM cell and provide a signal to switch control module 290, via leads 293 (see FIG. 2) upon the arrival of that cell. In the event a diagnostic cell is not received at the proper output module, then a particular cross-point plane has likely failed.

Advantageously, a failure of an individual cross-point switching plane merely reduces the capacity of the entire switch by 1/m. Such a failure can be handled in one of two illustrative ways. First and preferably, contention resolution unit 510 can be programmed, by switch control module 290, to indicate an arbitration loss to all the input modules for the particular staggered time slot that would ordinarily be serviced by the cross-point plane that has failed. Alternatively, the contention resolution unit, after being appropriately programmed by switch control module 290, could inform all the input modules that a particular cross-point switching plane is not available. In this case, all the input modules would send a "no-request" to the contention resolution unit during the corresponding staggered time interval. In either case, all the input and output modules are still serviced by the remaining cross-point switching planes but at a reduced capacity. Inasmuch as the capacity loss in the entire switch is simply 1/m, which for 32 switching planes amounts to approximately 3.1%, this loss is generally low enough to be absorbed by the excess operating capacity intentionally designed into the switch with little, if any, adverse effects on the B-ISDN traffic currently being handled thereby.

3. Fault recovery and switch operation in response to a failure of an input or output module As noted above, switch control module 290 also periodically executes appropriate diagnostics to test each input module and each output module.

To perform these diagnostics, switch control module 290, shown in FIG. 2, periodically sends instructions, via leads 293, to each interface module to substitute a diagnostic cell for an idle cell into the incoming stream of ATM cells applied to cross-connect 220. Inasmuch as the B-ISDN network of which switch 200 is a part rarely, if ever, uses 100% of its available bandwidth capacity at any given instant in time, then, in the absence of any incoming ATM cells appearing on a given incoming user line, the associated interface module that services that line will transmit so-called "idle" cells into switch 200 in order to preserve proper sequencing of actual incoming ATM cells flowing through the switch. Due to the frequent occurrence of idle cells, each interface module can regularly substitute an appropriate diagnostic ATM cell for an idle cell in order to test a virtual connection established through specific input and output modules. For a given configuration of the cross-connect, interface modules 210 are connected to specific input modules and output modules within switch fabric 250. Each interface module detects the arrival of a diagnostic cell thereat and reports its occurrence to switch control module 290. Based upon this report, module 290 verifies the proper operation of the associated input and output modules through which the diagnostic cell has transited.

If all the input and output modules are being used with no spares, then a failure of one of the input modules will result in a loss of B-ISDN service to only 32 STS-3c lines. Although this loss amounts to only approximately 0.4% of the total 8192 such lines that are serviced by switch 200, a switch operator should take corrective action to quickly remedy the fault and restore full service so as not to adversely affect, at least for an extended period of time, those users that are currently being served by the affected lines. However, since a telephone network rarely carries 100% of its rated traffic load at every instant in time, a 0.4% reduction in the capacity of switch 200 is likely to engender only a minimal adverse affect, if any at all, on instantaneous traffic flow through the switch.

Figure 18:
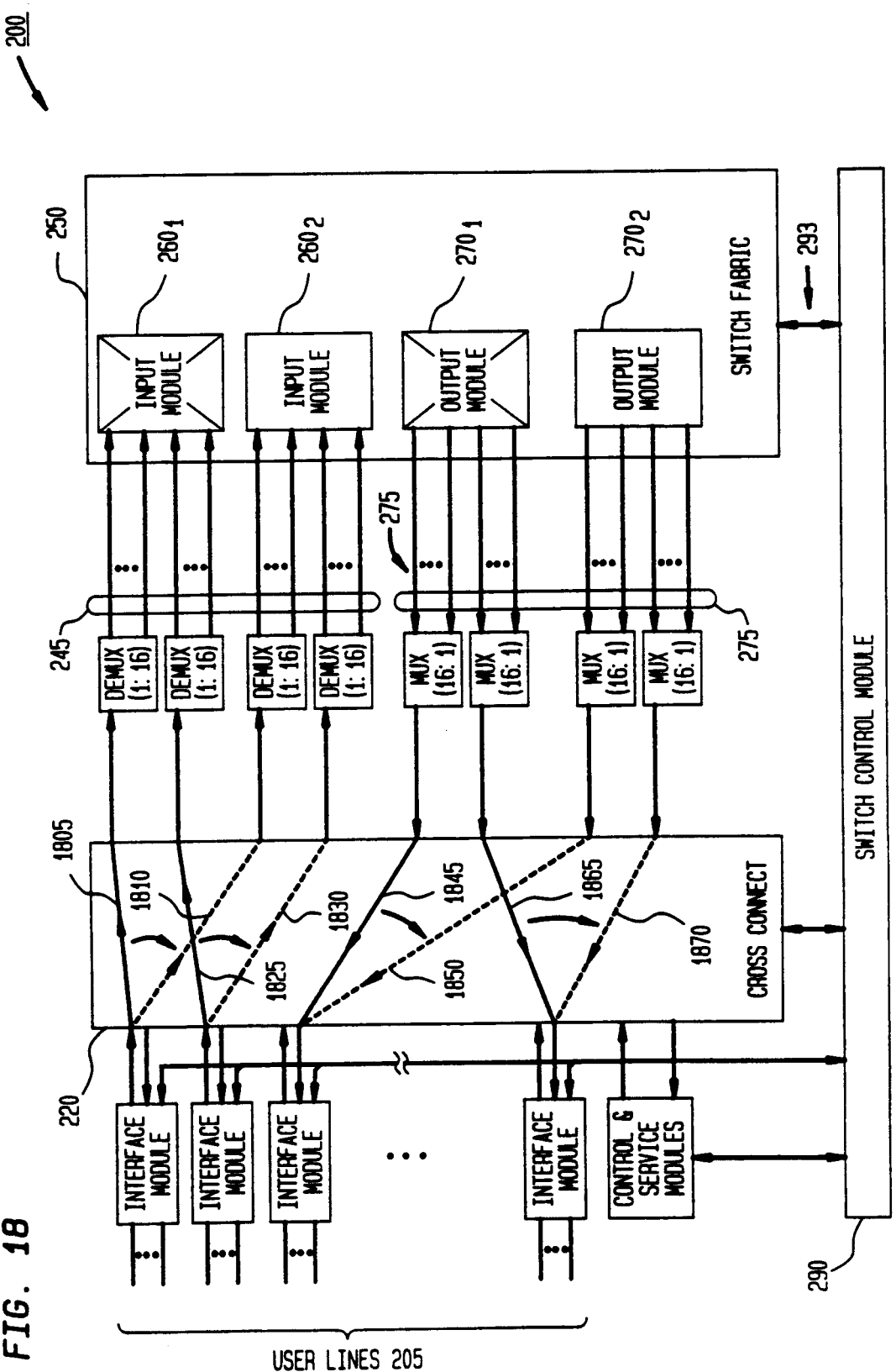
FIG. 18 is a simplified block diagram of the inventive broadband ISDN switch which specifically shows packet re-routing around a failed input or output module.

Nevertheless, to advantageously avoid an extended service interruption to users, the inventive switch would typically be constructed to utilize so-called "hot/standby" sparing of both input and output modules. In this case, switch fabric 250 would typically contain at least one spare ("standby") input and one spare ("standby") output module with at most "k−1" active input and "k−1" active output modules. Preferably, more than one spare input and one spare output modules will be utilized in any actual implementation in order to provide an increased level of redundancy. In this case, if an input module or an output module fails, ATM cell traffic is merely re-routed around the failed module as illustratively shown in FIG. 18. While this may produce a slight temporary loss of some ATM cells over the affected STS-3c lines, the corresponding calls themselves will remain active and advantageously require no call management re-processing of the affected virtual circuits.

Assume, for the moment, that switch 200 is normally operating. Furthermore, although switch fabric 250 typically contains "k" separate input and "k" separate output modules, to simplify this figure and its associated discussion, only two separate input modules, $260_1$ and $260_2$, and two separate output modules, $270_1$ and $270_2$, are specifically shown in FIG. 18 and considered herein. Also assume, that in normal operation, modules $260_1$ and $270_1$ are handling ATM cell traffic, while modules $260_2$ and $270_2$ are both spares and are normally idle. Thus, cross-connect 220 routes incoming ATM cells through paths 1805 and 1825 (indicated by solid lines) for two STS-48 lines for service by input module $260_1$ located within the switch fabric.

Now, in the event that input module $260_1$ fails, as indicated by the "X" drawn through it, this failure condition is subsequently detected by switch control module 290 which, in turn, instructs cross-connect 220 to change its circuit switched connections from paths 1805 and 1825 to paths 1810 and 1830 (indicated by dashed lines), respectively, to route subsequently incoming ATM cells that would otherwise be destined to failed input module $260_1$ to spare input module $260_2$ instead. Inasmuch as header translation processing occurs in the interface modules which precedes the cross-connect, it makes no difference as to which input module(s) these subsequently occurring cells are routed. Whatever input module(s), such as module $260_2$, actually receives these cells will merely route them, in turn, to their proper destination output modules. Once these operations occur, spare input module $260_2$ is instructed by switch control module 290 to actively process incoming ATM cells thereby substituting its capacity for that of failed module $260_1$. Thereafter, input module $260_1$ can be physically removed from switch fabric 250 for repair and/or replacement without causing any further loss of cells within the switch fabric.

Alternatively, in the event that output module $270_1$ fails, as indicated by the "X" drawn through it, this failure condition is also subsequently detected by switch control module 290. As a result, module 290 instructs cross-connect 220 to change its circuit switched connections from paths 1845 and 1865 to paths 1850 and 1870, (indicated by dashed lines) respectively, in order to route outgoing ATM cells over the STS-48 lines from spare output module $270_2$ in lieu of from failed output module $270_1$. In addition, subsequent incoming ATM cells for virtual circuits that were routed through failed output module $270_1$ also need to be re-routed within switch fabric 250 away from this failed module and applied instead to output module $270_2$. This re-routing is accomplished, as noted above, by changing an appropriate entry in the logical-to-physical output module address translation table used within each header processing unit located in the interface units so as to substitute the physical output module address (L') of standby output module $270_2$ for the corresponding address of failed module $270_1$. Doing so establishes a correspondence between the logical address (L) previously used for output module $270_1$ and the physical output module address (L') of output module $270_2$. Since this change needs to be made in the logical-to-physical routing tables in every header translation unit, switch control module 290 broadcasts this change, via leads 293, to all the header translation units. In addition, each time virtual circuits are to be added or dropped from service, module 290 changes the appropriate header conversion tables within the affected header processing units, as needed. Once these operations occur, spare output module $270_2$ is instructed by switch control module 290 to actively process outgoing ATM cells thereby substituting its capacity for that of failed output module $270_1$. Thereafter, output module $270_1$ can be physically removed from switch fabric 250 for repair and/or replacement without causing any further loss of cells within the switch fabric.

To provide the required functionality in the event of a failure of an input or output module, cross-connect 220 does not need to be capable of providing STS-48 circuit switching on a full 512-by-512 basis; rather, the cross-connect only needs to circuit switch all the incoming and outgoing STS-48 lines to and from a few standby input or output modules, respectively.

Figure 19B:
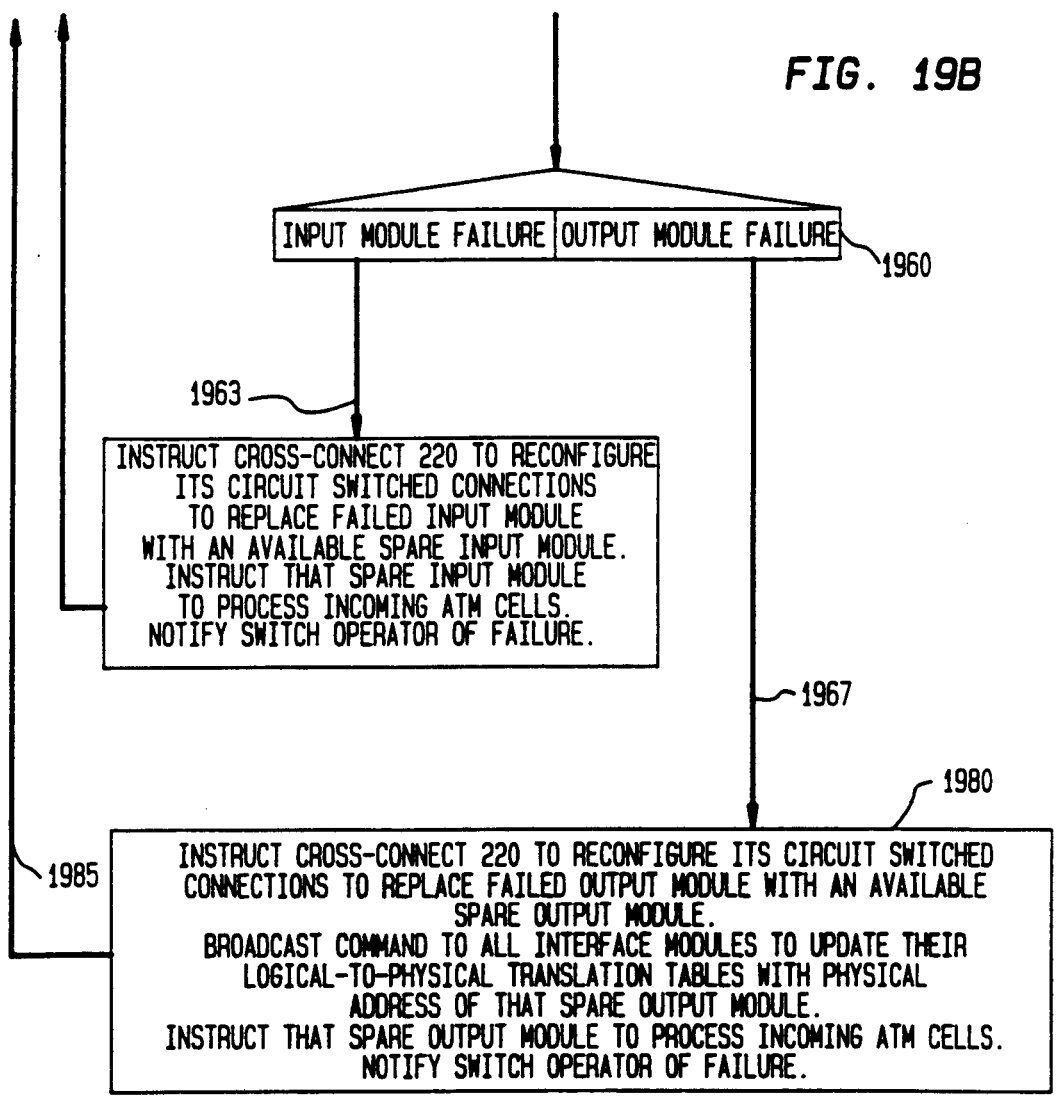

A high level flowchart of Fault Recovery Process 1900 which is executed by switch control module 290 in the event of a failure in an input or output module or in a cross-point switch plane is collectively depicted in FIGS. 19A and 19B; the correct alignment of the drawing sheets for these figures is shown in FIG. 19.

Upon entry into routine 1900, execution proceeds to block 1910. This block, when executed, periodically generates commands (instructions) both to the interface modules to insert pre-defined diagnostic ("test") ATM cells into switch fabric 250 and to the switch fabric to permit these test cells to be inserted therein. Once such commands are provided to invoke such a diagnostic operation, execution then proceeds to block 1920 which, when executed, examines the response message(s) which the switch control module receives from the switch fabric and/or the interface modules. After having examined the message and determined its validity, execution proceeds to decision block 1930. If the response message is not an error message, i.e. the message is not associated with a failure condition, then execution proceeds, via NO path 1937 emanating from this decision block, back to block 1910 to await the commencement of the next diagnostic operation.

Alternatively, if the response message is a valid error message, thereby indicating that a failure condition occurring within the switch has been detected, execution proceeds from decision block 1930, via YES path 1933, to decision block 1940. Decision block 1940 routes execution either over path 1943 if the error message originated with an interface module failure or over path 1947 if that message originated with an output module. Should the latter situation occur, then a cross-point plane has failed. In this case, execution proceeds to block 1950. This block, when executed, sends a command to contention resolution unit 510 to indicate an arbitration loss to all the input modules for the particular staggered time interval that would ordinarily be serviced by the failed cross-point plane. This, in turn, would prevent the input modules from using this failed plane. Block 1950 then causes an appropriate notification to be displayed to the switch operator to initiate appropriate repair or replacement of the failed cross-point plane. Thereafter, execution proceeds along path 1955 back to block 1910 to await the commencement of the next diagnostic operation.

Alternatively, in the event the response message originated from an interface module, thereby indicating a failure of an input or output module, execution proceeds from decision block 1940, along path 1943, to decision block 1960. Decision block 1960 routes execution either over path 1963 if the error message indicated that an input module has failed or over path 1967 if that message indicated that an output module has failed. In the event that an input module failed, execution proceeds, via path 1963, to block 1970. This block, when executed, transmits appropriate instructions to cross-connect 220 to re-configure its circuit switched connections, as illustratively described above, to replace the failed input module with an available spare input module and thereafter process incoming ATM cells through that spare module. Once this occurs, block 1970 causes an appropriate command to be issued to that spare input module instructing it to begin processing incoming ATM cells. Thereafter, block 1970 causes an appropriate notification to be displayed to the switch operator to initiate appropriate repair or replacement of the failed input module. Thereafter, execution proceeds along path 1975 back to block 1910 to await the commencement of the next diagnostic operation.

Now, in the event the error message indicated that an output module failed, then execution alternatively proceeds, via path 1967, to block 1980. This block, when executed, transmits appropriate instructions to cross-connect 220 to re-configure its circuit switched connections, as illustratively described above, to replace the failed output module with an available spare output module and thereafter process incoming ATM cells through that spare module. Once this occurs, block 1980 causes an appropriate instruction to be broadcast to all the interface modules in order to instruct each such module to update its logical-to-physical translation table by substituting the physical address of the spare output module for that of the failed output module. Thereafter, block 1980 causes a command to be issued to that spare output module instructing it to begin processing incoming ATM cells. Block 1980 then causes an appropriate notification to be displayed to the switch operator to initiate appropriate repair or replacement of the failed output module. Once block 1980 has fully executed, execution then proceeds along path 1985 back to block 1910 to await the commencement of the next diagnostic operation.

F. Optical Fiber Interconnect

As noted above, FIG. 20 is a block diagram of an alternate embodiment 2000 of the inventive broadband ISDN switch, particularly switch fabric 250, which utilizes a fiber optic interconnect to and from the cross-point switching planes in lieu of the metallic interconnect shown in FIG. 5. Use of such an optical interconnect advantageously reduces the interconnect density involving the switching planes and the input and output modules from 8,192 separate metallic conductors to 256 separate fibers. Apart from the optical interface circuitry, the remaining circuitry within each of input modules 2010, output modules 2090 and the cross-point switching planes 2050 is identical to that discussed above and specifically shown in FIGS. 5 and 8-14. Thus, the following discussion will only address the optical interconnect.

As shown, rather than using metallic wiring, the outputs of each input module are connected by a separate optical fiber to a common input of every cross-point switching module. Specifically, optical fibers $2030_1, 2030_2, \ldots, 2030_k$, which collectively form fibers 2030, connect input modules $2010_1, 2010_2, \ldots, 2010_k$ to cross-point switching modules $2050_1, \ldots, 2050_2, \ldots, 2050_m$ Each of the outputs on any one input module transmits optical packets on a different corresponding one of "m" (illustratively 32 in value) different optical wavelengths. The same numerical input of every one of the 32 cross-point planes detects incoming packets at the wavelength on which those packets were transmitted by the input modules. Thus, each of the optical fibers is carrying a frequency multiplexed signal having 32 different optical wavelengths. Similarly, the outputs of each cross-point switching plane are connected by a separate optical fiber to a common input of every output module. Specifically, optical fibers $2070_1, 2070_2, \ldots, 2070_k$, which collectively form fibers 2070, connect switching planes $2050_1, 2050_2, \ldots, 2050_m$ to output modules $2090_1, \ldots, 2090_2, \ldots, 2090_k$. Each of the "m" common numerical outputs across all 32 switching planes transmits optical packets on a different corresponding one of "m" different optical wavelengths to form a frequency multiplexed optical signal, having 32 different wavelengths, on every fiber within fibers 2070. With this in mind, each of the inputs on any one output module detects optical packets that have transmitted on a corresponding one of "m" different optical wavelengths. With such an interconnect arrangement, the number of interconnect lines on either side of the cross-point switching planes is advantageously reduced from 8192 to 256.

Clearly, by now, those skilled in the art realize that although the inventive switch has been described as performing B-ISDN switching at the STS-3c rate (approximately 150 Mbit/second), B-ISDN switching at higher rates can be provided while still preserving the sequencing of input cells. Such higher speed switching can be readily obtained by dedicating an appropriately sized group of successive switch input and output ports to associated incoming and outgoing high speed trunks. Specifically, to handle an STS-12 trunk, which carries ATM cell traffic at four times the STS-3c rate or at approximately 600 Mbit/second, a group of four successive input ports appearing on one input module would be dedicated to an incoming STS-12 trunk. A 1-to-4 demultiplexor would precede these input ports and convert an incoming STS-12 serial bit-stream into four STS-3c streams. Each of these streams would feed a different corresponding one of these four input ports. The individual outputs from a group of four successive output ports on a common output module would be multiplexed together to feed an outgoing STS-12 trunk. In addition, the output module would also need to be configured to provide a single logical queue for these four output ports and the associated input lines to this module. Inasmuch as incoming STS-12 ATM cells, which are provided to the input ports of the associated input module, are sequentially entered in a regular order into a single internal queue within that module, are also read from a single corresponding logical queue in a common output module in the same order and are also multiplexed and demultiplexed in the same fashion, the inventive switch advantageously preserves the ordering of the bits on the STS-12 trunk entirely through the switch even at multiples of the STS-3c rate. Inasmuch as each input module illustratively provides 32 separate input ports, high speed switching can be provided at up to 32 times the STS-3c rate, i.e. at the STS-96 rate, by demultiplexing incoming cell traffic from, for example, a single incoming STS-96 trunk across all 32 input ports of a single input module. Similarly, outgoing cell traffic from all 32 output ports on a single output module would be multiplexed together to form a single outgoing STS-96 trunk. In addition, a single logical queue would be established within the output module to service all these output ports and their associated input lines. Even higher switching speeds than STS-96 can be accommodated by the inventive switch if the capacity of the input and output modules were to be increased beyond 32 input and output ports, respectively, and by appropriately configuring the logical queue in the proper output module.

Furthermore, each of the cross-point switching planes can be replaced by any one of a wide variety of self-routing electronic packet switching devices that has the same number of input and output ports as the switching plane. For example, a Batcher-Banyan switch of size k-by-k can be used in lieu of each cross-point plane. In this case, owing to the different architecture of the Batcher-Banyan switch from a crossbar network, the prepended routing header of each ATM cell must carry the physical output module address (L') for that cell and not the next sequential cell.

Moreover, the self-routing switching provided by each of the cross-point switching planes can also be implemented optically rather than electronically. Specifically, for example, each cross-point switching plane could be replaced by a k-by-k optical star coupler and a set of tunable lasers and optical receivers. A k-by-k optical star coupler has "k" input optical fibers and "k" output optical fibers both of which are interconnected in a pre-defined manner such that optical power originating in any one input fiber is broadcast in approximately equal amounts to all the output fibers. Each output optical fiber is connected from the star coupler to a wavelength sensitive optical receiver situated in an output module. As such, each output module will have "m" such receivers, each tuned to a common single wavelength. Since the "k" output fibers emanating from each star coupler, e.g. the first star coupler, the second star coupler and so on, feed a common optical input, e.g. the first input, the second input and so on, respectively, of all the output modules, all the receivers on each output module are tuned to a different, corresponding but fixed one of "k" different optical wavelengths. Each input fiber, on the other hand, is connected from a star coupler to a tunable laser in an input module. The laser can be tuned to produce optical radiation at any one of the "k" wavelengths. As such, the laser can send a signal to output module "i", for all "k", by merely tuning its laser to the fixed wavelength associated with this particular output module. The input modules are connected to the contention resolution unit to resolve contending requests on illustratively a staggered phased basis, as described above. In operation, after each contention resolution cycle occurs during a staggered time interval, each input module that has won contention then during that interval tunes its laser to the wavelength associated with the output module to which its current HOQ ATM cell is destined. Thereafter, during this interval, that input module transmits this cell over this wavelength, via an input optical fiber and through a corresponding star coupler, to this output module.

The corresponding star coupler is given by the relative phasing of the staggered time interval. The contention resolution unit guarantees that only one input module will attempt to transmit an ATM cell to any given output module at a time through any one star coupler. Inasmuch as optical star couplers are much faster than electronic switches, the number "m" of such couplers can be significantly smaller than the number of electronic cross-point switching circuits needed to provide the same total switch capacity.

Although various embodiments which incorporate the teachings of the present invention have been shown and described in detail herein, those skilled in the art can readily devise many other varied embodiments that still incorporate these teachings.

We claim:

1. In apparatus for a packet switching system having "k" substantially identical input modules each providing "n" separate incoming lines and each having "m" separate outputs and "k" substantially identical output modules each having "m" separate inputs and providing "n" separate outgoing lines, said system also having "m" substantially identical k-by-k cross-point switching planes each having a plurality of switching elements and being connected to a corresponding one of the outputs of each of the input modules and to a corresponding one of the inputs to each of said output modules, wherein the corresponding output from every one of the input modules has the same numerical ranking and the corresponding input to every one of the output modules has the same numerical ranking ("k", "m", and "n" being pre-defined integer values), the method comprising the steps of:

appending a routing header to each input packet appearing over each of a plurality of input packet lines so as to form a corresponding incoming packet;

delivering said corresponding incoming packet to one of "m" outputs of one of said "k" input modules, wherein said routing header in said corresponding incoming packet appearing on said one output contains a routing address for a subsequent incoming packet that is to appear on said one output, said routing address having first and second routing address fields respectively containing an address of one of the "k" output modules and an address of one of the "n" outgoing lines provided by said one output module;

establishing, in response to said routing addresses contained in a first group of said incoming packets appearing on the corresponding output from all of said input modules, the configuration of said each cross-point switching plane prior to arrival on said corresponding output of all of said input modules of a second group of said incoming packets having input packets that are to be routed through said each cross-point plane in accordance with said routing addresses in said first group of incoming packets; and setting, in response to said establishing step, the states of said switching elements as defined by said configuration prior to routing said second group of incoming packets through said each cross-point plane.

2. The method in claim 1 wherein, in any one of said groups of incoming packets, each incoming packet in said one group appears on the corresponding one output from a different one of said input modules and all of said incoming packets in said one group respectively occur substantially simultaneously on the corresponding output of all of said input modules.

3. The method in claim 2 wherein said first group of incoming packets occurs one packet in advance of said second group of incoming packets.

4. The method in claim 3 wherein said each input packet is an incoming asynchronous transfer mode (ATM) cell.

5. The method in claim 4 wherein said appending step comprises the step of translating a value of a virtual channel identifier (VCI) field in said each input packet to form said routing address in said corresponding incoming packet.

6. The method in claim 5 wherein said translating step further comprises the steps of:

first translating the VCI field value in said each input packet into first and second physical routing addresses;

adding said first and second physical routing addresses to a front of said each input packet so as to form a corresponding first packet; and transferring, in response to a stream of said first packets having corresponding input packets that are to be routed through a common incoming line to said switching circuitry, a value of the first physical routing address from each one of said first packets as the value of the first physical routing address to a successive corresponding one of said first packets so as to form corresponding ones of said incoming packets for application over said common incoming line to said switching circuitry.

7. The method in claim 6 wherein said first translating step comprises the steps of:

second translating the VCI field value into a first logical routing address; and third translating the first logical routing address into the first physical routing address.

8. Apparatus for a packet switching system comprising a plurality of incoming lines for receiving incoming packet cells, each of said incoming packet cells including data and header information, a plurality of outgoing lines for providing outgoing packets, a plurality of switching elements for routing incoming packets to said outgoing lines, means responsive to said header information of each incoming packet cell for inserting, before each said packet cell, additional internal header routing information identifying a particular switching element for that packet cell, means responsive to said additional internal header routing information for replacing a portion of said additional header routing information with a routing identification for the next subsequent incoming packet cell, and means for establishing the configuration of said switching element for each incoming packet as determined by the additional internal routing information for that packet cell and the routing identification determined by said means responsive to said additional internal routing information for the immediately prior incoming packet cell.

9. Apparatus in accordance with claim 8 wherein the header information of each incoming packet cell includes a virtual channel identification and said means for inserting information before said cell include means for translating said virtual channel information field into a subsequent virtual channel information field.

10. Apparatus in accordance with claim 8 wherein said switching elements comprise individual cross-point elements and said cross-point elements are arranged in cross-point switching planes.

11. Apparatus for a packet switching system comprising a plurality of incoming lines for receiving incoming packet cells, each of said incoming packet cells including data and header information,
- a plurality of outgoing lines for providing outgoing packets,
- a plurality of switching elements for routing incoming packets to said outgoing lines,
- input modules means connected to the inputs of said switching elements and output module means connected to the outputs of said switching elements, each of said output module means having a plurality of output ports,
- interface module means responsive to said header information of each incoming packet cell for inserting before each said packet cell additional internal header routing information identifying a specific output module means for that packet cell and a specific output port on said output module means for the packet cell,
- means responsive to said additional header routing information for replacing said information identifying said specific output module means for that packet cell with information identifying the specific output module means for the next packet cell, and
- means for establishing the configuration of said switching elements for each incoming packet as determined by the additional internal header routing information identifying said specific output module means from the immediately previous packet cell and said specific output port of said output port means from that packet cell.

12. The method of routing incoming packet cells appearing on incoming lines through switching means to outgoing lines, each of said incoming packet cells including data and header information, comprising the steps of
- responsive to the incoming packet cell header information inserting before each packet cell additional internal header routing information,
- responsive to the inserted internal header routing information determining for each packet cell replacement information with respect to operation of the switching means for the next subsequent packet cell, and
- operating the switching means for each packet cell responsive to both the inserted internal header routing information for that packet cell and the replacement information from the immediately prior packet cell.

13. The method in accordance with claim 12 further comprising the step of replacing a portion of the header information with information related to a subsequent switching means while inserting said additional internal header routing information before each packet cell.

14. The method in accordance with claim 12 wherein each incoming packet cell is an incoming asynchronous transfer mode packet cell.

* * * * *